United States Patent
Housand et al.

(12)

(10) Patent No.: US 6,359,681 B1
(45) Date of Patent: Mar. 19, 2002

(54) COMBINED LASER/FLIR OPTICS SYSTEM

(75) Inventors: Brien J. Housand; Gene D. Tener; Susan J. Jesse, all of Orlando; William A. Pearson, Geneva; G. Edward Newberg, Winter Springs; John F. Weaver, deceased, late of Orlando, by Barbra Weaver, leagal representative; Timothy A. Hill, Windermere; Helmuth Bauer, Orlando; Bhikhubbai L. Patel, Orlando; Ward D. Robertson, Orlando; John J. Donahue, Casselberry; Jeffrey L. Cole, Orlando; Harvey J. Montgomery, Winter Springs; Eric F. Schildwachter; John R. Booth, both of Orlando, all of FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/463,410

(22) PCT Filed: Apr. 1, 1997

(86) PCT No.: PCT/US97/06256

§ 371 Date: Aug. 9, 2000

§ 102(e) Date: Aug. 9, 2000

(87) PCT Pub. No.: WO97/41460

PCT Pub. Date: Nov. 6, 1997

Related U.S. Application Data

(60) Provisional application No. 60/014,447, filed on Apr. 1, 1996.

(51) Int. Cl.[7] .............................. G01B 11/26; G01J 5/02; G02B 27/00; G05B 1/06; G01R 31/08; H02H 7/08

(52) U.S. Cl. .................. 356/4.01; 250/342; 356/141.3; 359/558; 359/568; 359/601; 318/638; 324/522; 361/23

(58) Field of Search .............................. 356/4.01, 141.3, 356/141.1, 153; 250/332, 342, 201.7; 359/558, 568, 601; 348/353, 354, 572, 574, 607, 576, 205, 241, 242, 252, 625, 144, 164; 318/638; 361/23; 324/522

(56) References Cited

U.S. PATENT DOCUMENTS 3,698,812 A 10/1972 Nelson
3,947,759 A 3/1976 Briggs (List continued on next page.)

Primary Examiner—Stephen C. Buczinski
(74) Attorney, Agent, or Firm—Burns, Doane, Swecker & Mathis, LLP

(57) ABSTRACT

In a FLIR/laser based targeting and imaging system, the ability to recognize, detect, locate, and/or track targets in an area of interest is significantly improved by reducing the fixed and dynamic alignment errors between the IR LOS and the laser LOS. Fixed alignment errors are reduced with an improved internal boresight module and corresponding boresight method. Dynamic alignment errors are reduced with an opto-electric subsystem that employs a single pitch bearing and a common pitch/yaw afocal for both the laser energy and the IR energy. A segmented window in the system housing includes a circular EMI grid pattern which significantly reduces the amount of off-axis EMI entering the optical pathways, and improved signal processing techniques are employed to enhance the quality of the IR image after the image has been digitized.

157 Claims, 33 Drawing Sheets

U.S. PATENT DOCUMENTS

| | | |
|---|---|---|
| 3,953,667 A | 4/1976 | Layton et al. |
| 4,155,096 A | 5/1979 | Thomas et al. |
| 4,268,861 A | 5/1981 | Schreiber et al. |
| 4,330,212 A | 5/1982 | Miller |
| 4,349,838 A | 9/1982 | Daniel |
| 4,407,464 A | 10/1983 | Linick |
| 4,497,065 A | 1/1985 | Tisdale et al. |
| 4,551,708 A | 11/1985 | Welburn |
| 4,561,775 A | 12/1985 | Patrick et al. |
| 4,574,191 A | 3/1986 | Conrad |
| 4,701,602 A | 10/1987 | Schaefer et al. |
| 4,771,437 A | 9/1988 | Powell et al. |
| 4,805,123 A | 2/1989 | Specht et al. |
| 4,828,376 A | 5/1989 | Padera |
| 4,929,083 A | 5/1990 | Brunner |
| 4,932,755 A | 6/1990 | Holdridge et al. |
| 4,945,502 A | 7/1990 | Kwon et al. |
| 4,979,136 A | 12/1990 | Weiman et al. |
| 5,252,974 A | 10/1993 | Gulczynski |
| 5,266,790 A | 11/1993 | Markle et al. |
| 5,345,304 A | 9/1994 | Allen |
| 5,506,675 A | 4/1996 | Lopez et al. |
| 5,550,669 A | 8/1996 | Patel |

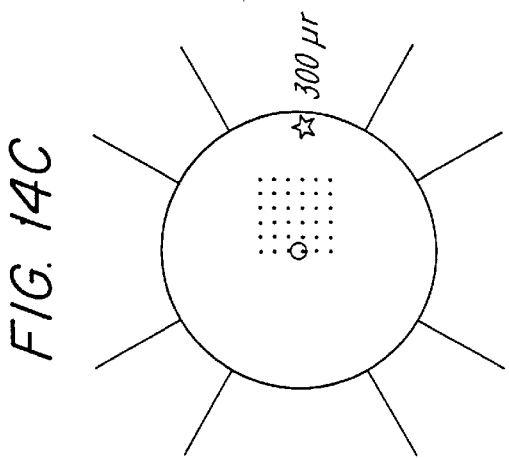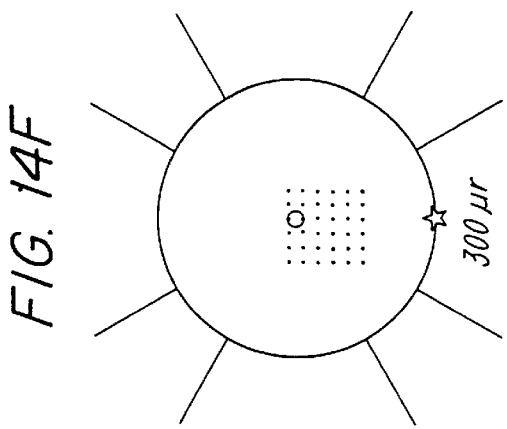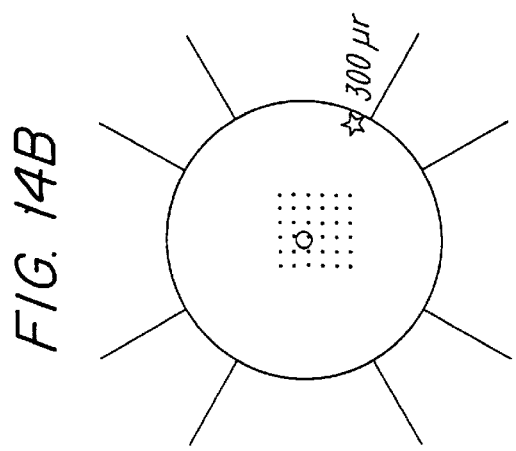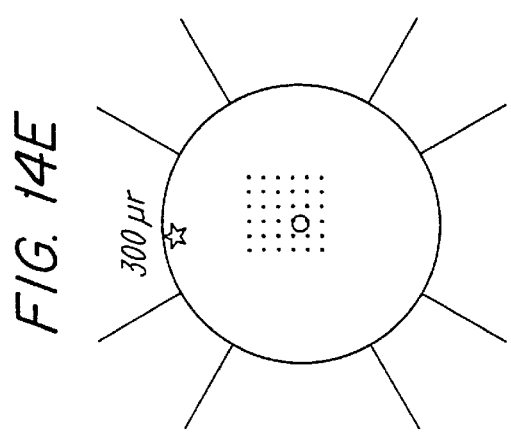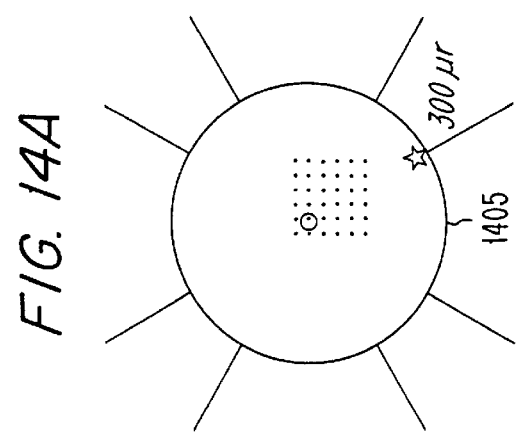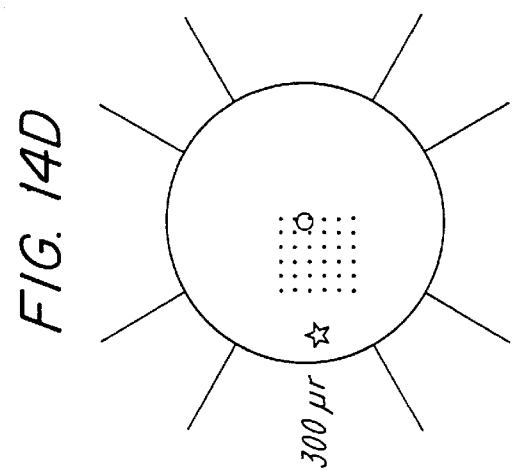

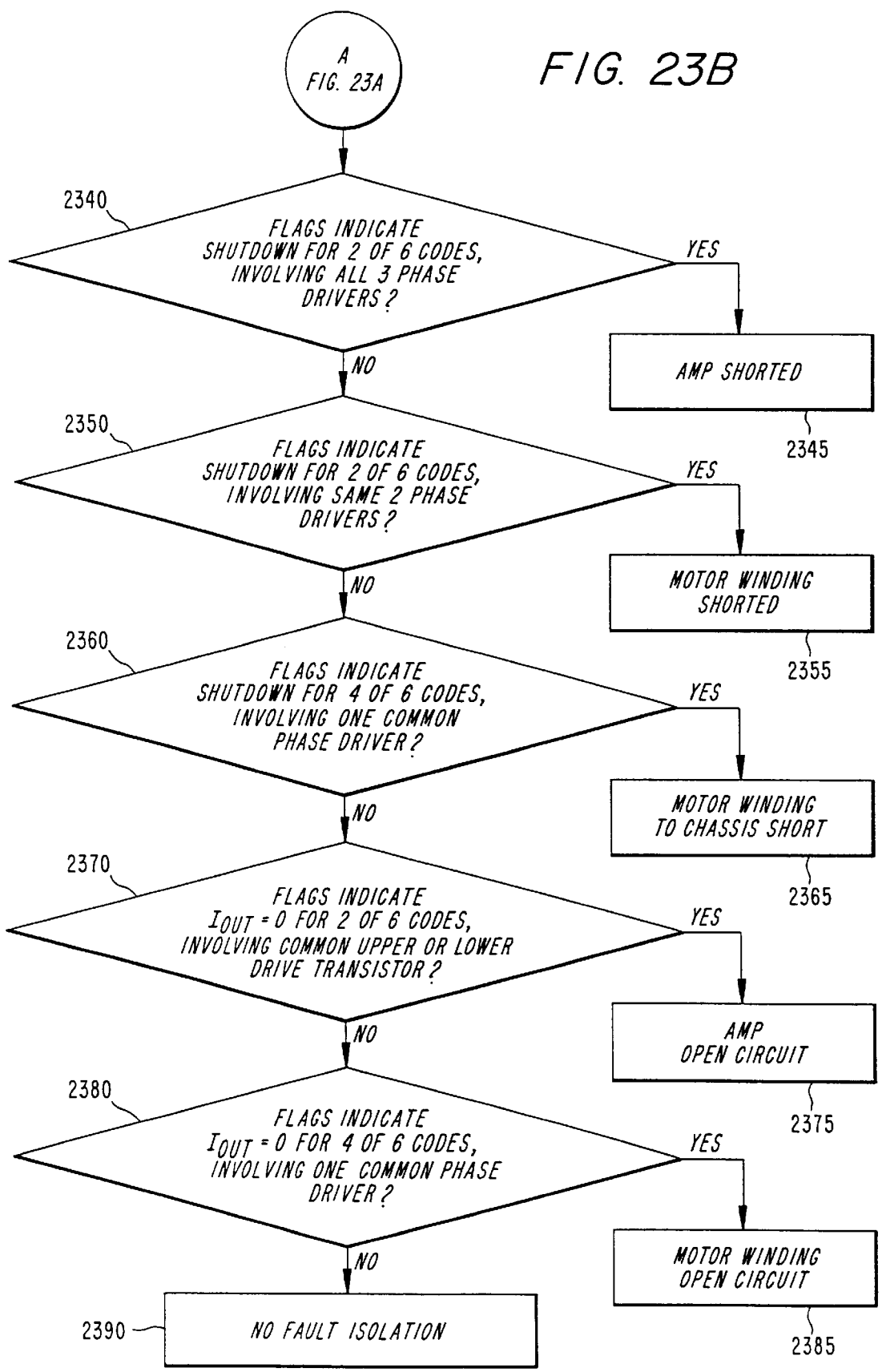

COMBINED LASER/FLIR OPTICS SYSTEM

This appln is a 371 of PCT/US97/06256 filed Apr. 1, 1997 which claims benefit of Prov. No. 60/014,447 filed Apr. 1, 1996.

BACKGROUND

The present invention relates to a combined forward-looking infrared/laser sensor. More particularly, the present invention relates to a targeting and imaging system that combines a mid-wave forward-looking infrared (FLIR) subsystem and a laser subsystem, including a laser range receiver (LRR) and a laser spot tracker (LST).

FLIR systems employ an array of infrared (IR) detectors for generating an image based on the IR emissions from a particular area of interest (AOI). In military applications, for example, the AOI may contain targets such as tanks, trucks, and/or other military vehicles or military hardware. These targets emit heat; therefore, they are typically warmer than their surrounding environment. Consequently, they can be distinguished in an IR image generated by a FLIR system.

The use of lasers in conjunction with FLIR systems is generally well known in the art. For example, lasers can be used to designate specific targets which are visible in a FLIR image. In one prior FLIR/laser system, laser energy is swept across a target that is visible in the FLIR image and used for the purpose of generating a 3-D image of the target. The 3-D image can, in turn, be used for target recognition and/or target classification (U.S. Pat. No. 5,345,304). In another prior FLIR/laser system, a laser is used for determining the range of a target from the FLIR/laser system's host platform (U.S. Pat. No. 4,771,437). In yet another prior FLIR/laser system, a laser is used to determine the relative position and velocity of targets (U.S. Pat. No. 4,574,191). In addition, lasers have been used for the purpose of directing laser guided munitions to a desired target visible in a FLIR image.

In each of the aforementioned prior FLIR/laser systems, the ability of the FLIR/laser system to accurately recognize, detect, locate and/or track targets is dependent upon the ability of the system to maintain an accurate alignment between the FLIR and laser. Any fixed misalignment between the FLIR line-of-sight (LOS) and the laser LOS will result in laser overspill. As illustrated in FIG. 1, laser overspill is defined as the unintended amount of laser energy 110 that misses the target 105 and reflects off the background. Laser overspill is likely to result in range measurement error, as illustrated by $R_{err}$ in FIG. 2. False range information, in turn, will result in less accurate target recognition, detection, location, and velocity information, as well as less accurate weapon guidance data.

Boresighting is a common term of art which refers to the process of aligning the LOS of a given system. Prior designs, such as the Low Altitude Night Terrain—following Infrared Navigation (LANTIRN) system, employ boresighting processes to minimize fixed alignment errors between the FLIR LOS and the laser LOS. Boresighting processes typically involve optical and/or mechanical realignment of, for example, the FLIR LOS and the laser LOS. Moreover, boresighting processes may be manual or they may be automatic. As stated, boresighting processes are generally well known in the art.

Unfortunately, the alignment error between, for example, a FLIR LOS and a laser LOS is not necessarily a fixed error. In military applications, FLIR/laser based systems are typically installed on moving platforms, such as tactical aircraft (e.g., an F-15 or an F-16). These platforms subject the FLIR/laser based system to large mechanical forces and vibrations. These forces and vibrations directly act upon the optical components which govern the FLIR LOS and the laser LOS. Moreover, FLIR LOS and laser LOS displacements about the pitch axis appear to have the most detrimental affect on system performance (i.e., the ability to accurately recognize, detect, locate and/or track targets).

As illustrated in FIG. 3, prior designs such as LANTIRN employ a separate FLIR optics pitch bearing 205 and laser optics pitch bearing 210, as well as a separate FLIR aperture 215 and laser aperture 220. Consequently, the aforementioned mechanical forces and vibrations acting upon the FLIR/laser based system will cause the FLIR LOS and the laser LOS to nutate about the pitch axis independent of each other, resulting in LOS jitter and a dynamic (i.e., continuously changing) FLIR LOS-to-laser LOS alignment error in addition to any exiting fixed alignment error. Although the boresighting processes mentioned previously can be used to correct fixed alignment errors, they are generally ineffective with respect to correcting dynamic alignment errors.

Yet another problem associated with prior systems such as LANTIRN, which may significantly contribute to LOS alignment errors, is the fact that FLIR images rotate about the roll axis as a function of gimbal pitch angle. To compensate for this anomaly, prior designs such as LANTIRN counter-rotate the entire FLIR detector assembly. However, FLIR detector assemblies are relatively large, and rotating a large mass to counter rapidly changing gimbal pitch angles has many disadvantages. First and foremost, it is very difficult to counter-rotate a large mass with sufficient response time to compensate for high speed pitch rotations. The inability to compensate for high speed pitch rotations can result in additional FLIR LOS-to-laser LOS alignment errors. Second, the wires which connect to the FLIR detector array elements must pass through a rotating interface. Rotating the interface and the wires passing through the interface significantly impacts system reliability.

SUMMARY

The present invention is a high resolution, gimbaled mid-wave FLIR/laser based system which comprises an electro-optic subsystem that is designed to minimize FLIR LOS-to-laser LOS alignment errors, including fixed alignment errors and dynamic alignment errors, so as to provide more accurate target recognition, detection, location and/or tracking information. If used in conjunction with a military weapon delivery system, these performance enhancements translate into greater survivability for the host platform which can now release its weapons at longer (i.e., safer) standoff ranges in hostile environments.

In addition, the present invention comprises a number of other subsystems and subsystem capabilities which support and further enhance the effectiveness of the electro-optics subsystem. For example, the present invention comprises a single processing subsystem which provides a number of important and novel image processing and image preprocessing functions including: a "dead" detector cell replacement function, a scene-based pattern removal function, a 2-D sharpen filter, a dynamic range control function, and a 2× image enhancement function which employs a unique subpixel dithering process.

The present invention also comprises a novel fault isolation subsystem. The fault isolation subsystem is capable of distinguishing fault conditions which arise in the amplifier portions of the various servo systems from fault conditions which arise in the servo motor portion of the servo systems.

Thus maintenance personnel need only remove and replace the defective portion of a servo system without having to remove and replace the entire servo system.

Finally, the present invention comprises a novel electromagnetic interference (EMI) grid. This grid more thoroughly prevents undesired energy from entering the system and interfering with electrical signals. The grid also prevents undesired energy generated by the system to radiate, thereby interfering with the operation of other systems in close proximity.

It is an object of the present invention to provide a high resolution, FLIR/laser based targeting and imaging system.

It is another object of the present invention to provide a high resolution FLIR/laser based system that minimizes alignment errors between the FLIR LOS and the laser LOS.

It is yet another object of the present invention to minimize alignment errors, caused by FLIR LOS and laser LOS jitter by providing a single pitch bearing and a common aperture for both the FLIR optics and the laser optics.

It is still another object of the present invention to minimize alignment errors, caused by the rotation of the FLIR image about the roll axis when the pitch/yaw gimbal is rotated about the pitch axis, by counter-rotating a deroll prism optic rather than the FLIR detector assembly.

It is another object of the present invention to filter undesirable electromagnetic energy from the IR energy entering the system aperture.

It is still another object of the present invention to provide a number of signal processing functions which further enhance the quality of the FLIR image.

Finally, it is an object of the present invention to provide a fault detection process that accurately isolates fault conditions and limits the removal and replacement of hardware that is otherwise functioning properly.

The aforementioned and other objects of the present invention are achieved by a targeting and imaging system that comprises a forward-looking infrared (FLIR) optical subsystem which receives infrared (IR) energy from an area of interest (AOI), and which generates an IR image of the AOI. The system also includes a laser optical subsystem for generating laser energy which illuminates at least one object in the AOI, and which receives laser energy reflected by the at least one object. Furthermore, the laser optical subsystem and the FLIR optical subsystem share a common pitch bearing.

The aforementioned and other objects of the present invention are also achieved by a targeting and imaging system that comprises a forward-looking infrared (FLIR) optical system for receiving infrared (IR) energy from an area of interest (AOI), and a FLIR optical imager for generating an IR image with the IR energy received from the AOI. The FLIR optical imager is arranged to receive the IR energy from the FLIR optical system. The system also includes a laser transmitter, a laser receiver, and laser optics for directing laser energy from the laser transmitter to a desired target located in the AOI, and for directing laser energy returning from the desired target in the AOI to the laser receiver. Furthermore, the FLIR optical system and the laser optics share a common pitch bearing, such that all optical elements individually subject to pitch rotations are commonly shared by the FLIR optical system and the laser optics.

The aforementioned and other objects of the present invention are also achieved by a targeting and imaging system that comprises forward-looking infrared (FLIR) optics for steering an infrared (IR) line-of-sight (LOS) towards a desired area of interest (AOI), for receiving IR energy from the AOI, for focusing the IR energy, and for generating an optical image of the AOI. The system also includes a laser transmitter, a laser range receiver (LRR), a laser spot tracker (LST), and laser optics for steering a laser LOS, such that the transmitted laser energy illuminates at least a portion of the AOI, for receiving laser energy, and for directing the received laser energy into the LRR and the LST. In addition, the FLIR optics means and the laser optics means share a single pitch bearing, and the IR energy and the laser energy pass through a common aperture.

The aforementioned and other objects of the present invention are also achieved by a targeting and imaging system that includes LOS correction means for adjusting an IR LOS and a laser LOS, and for minimizing LOS alignment errors between the IR LOS and the laser LOS.

The aforementioned and other objects of the present invention are also achieved by a targeting and imaging system that includes fault isolation means for isolating an electrical fault in a servo system comprising a servo motor and an amplifier.

The aforementioned and other objects of the present invention are also achieved by a targeting and imaging system that includes a boresight subsystem.

The aforementioned and other objects of the present invention are also achieved by a targeting and imaging system that includes a signal processing subsystem.

The aforementioned and other objects of the present invention are also achieved by a targeting and imaging system that is contained within a housing that includes a window through which IR and laser energy passes.

BRIEF DESCRIPTION OF THE DRAWINGS

The objects and advantages of the invention will be understood by reading the following detailed description in conjunction with the following drawings:

FIGS. 14A through 14F show the grid pattern used for aligning the laser spot;

FIGS. 23A and 23B are flowcharts depicting the three-phase motor, PWM amplifier fault isolation process;

DETAILED DESCRIPTION

The present invention relates to a targeting and imaging system that includes an opto-electric subsystem, an EMI grid, a fault isolation subsystem, and a signal processing subsystem. The opto-electric subsystem includes a high resolution, gimbaled, mid-wave (3–5 micron) or long-wave (8–12 micron subsystem) FLIR; a laser range receiver (LRR) for ranging and target designation; and a laser spot tracker (LOS) for positive target identification. The FLIR subsystem also provides two optical fields-of-view (FOV), including a 1.2° FOV and a 3.8° FOV with a 2×enhanced mode, and a 4× and an 8× electronic zoom mode. Other key features of the present invention include commonality of optical elements to minimize dynamic alignment errors between the FLIR LOS and the laser LOS, an isolated optical bed to minimize differential bending and maximize boresight retention, and an internal boresight subsystem to minimize fixed alignment errors between the FLIR LOS and the laser LOS.

The terms "optic" and "optical" are typically associated with sight or vision. However, hereinbelow, the terms "optic" and "optical" are more broadly associated with electromagnetic radiation in general, and/or devices that are sensitive to such electro-magnetic radiation, even though the electro-magnetic radiation (i.e., IR energy and laser energy) may not be visible to the eye.

In addition, the terms FLIR or IR image, optical image and digital image appear below. The term IR image refers to the IR energy pattern generated by the FLIR optics. The term optical image refers to an array of analog, electronic signals which together provide an electronic representation of the IR image. The analog, electronic signals are generated by an array of IR detector elements which respond to the IR energy pattern of the IR image. The term digital image refers to an array of digital values, also known as pixel values. Together, the array of pixel values provide a digital representation of the optical image, wherein each pixel value is associated with a corresponding analog signal value in the optical image. One of ordinary skill in the art will readily understand that the optical image and the digital image are not visible images; instead, each is but an array of analog and digital values respectively. However, one skilled in the art will also readily understand that a visible image can be produced from the optical and digital images with the appropriate display hardware.

Optic-electrical Subsystem

Figure 1:
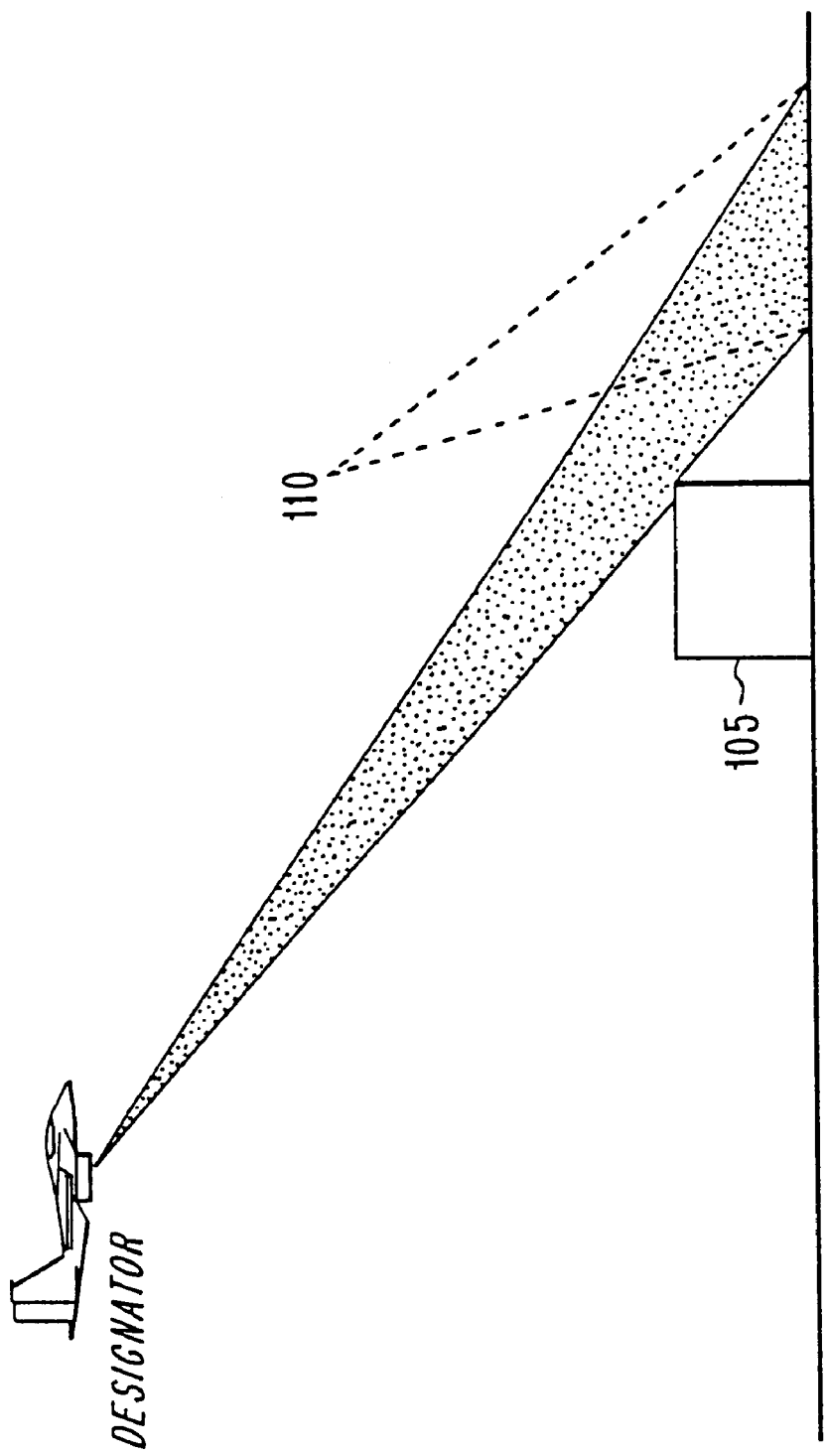
FIG. 1 illustrates the concept of laser overspill.
Figure 2:
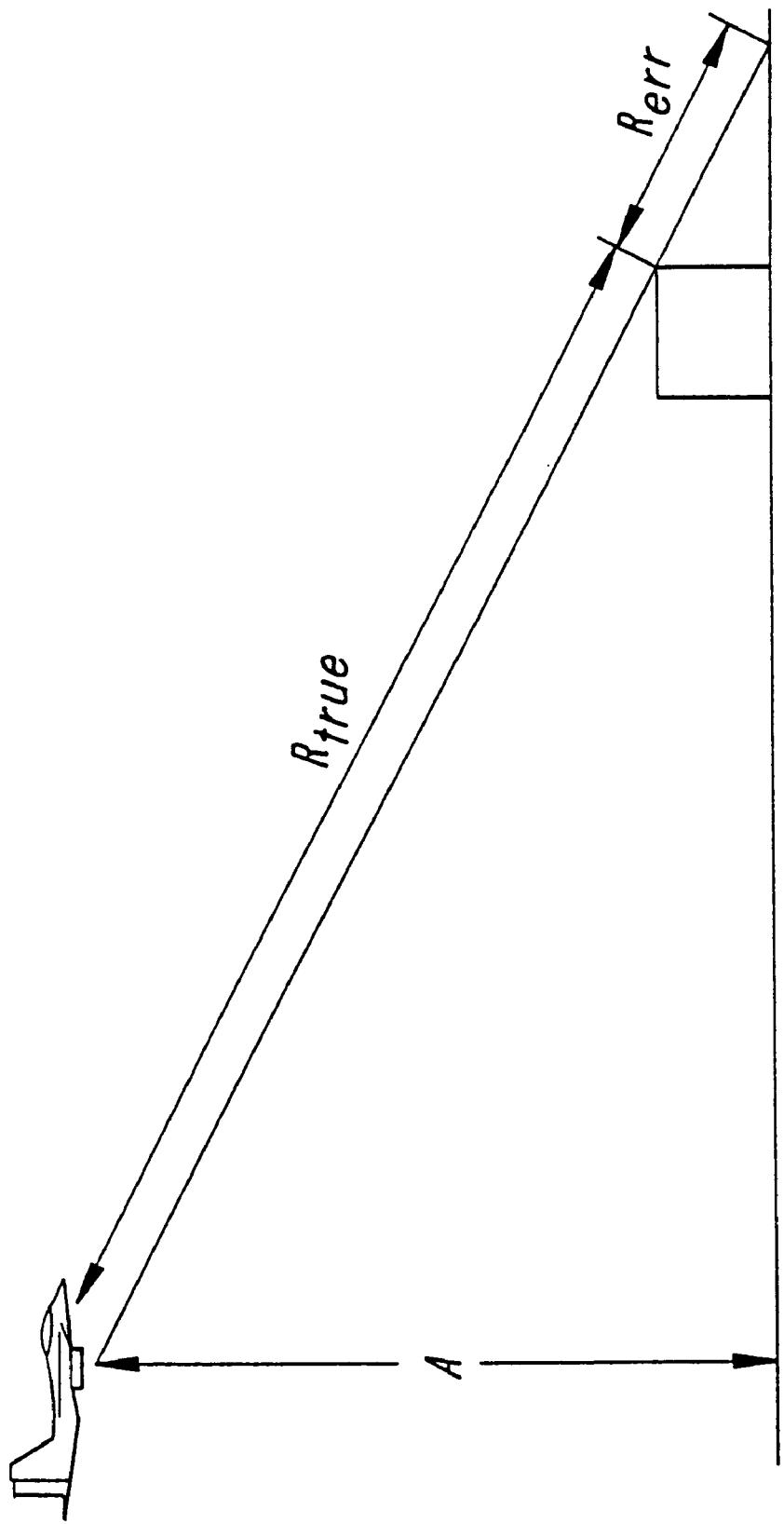
FIG. 2 illustrates the concept of range measurement error due to laser overspill.
Figure 3:
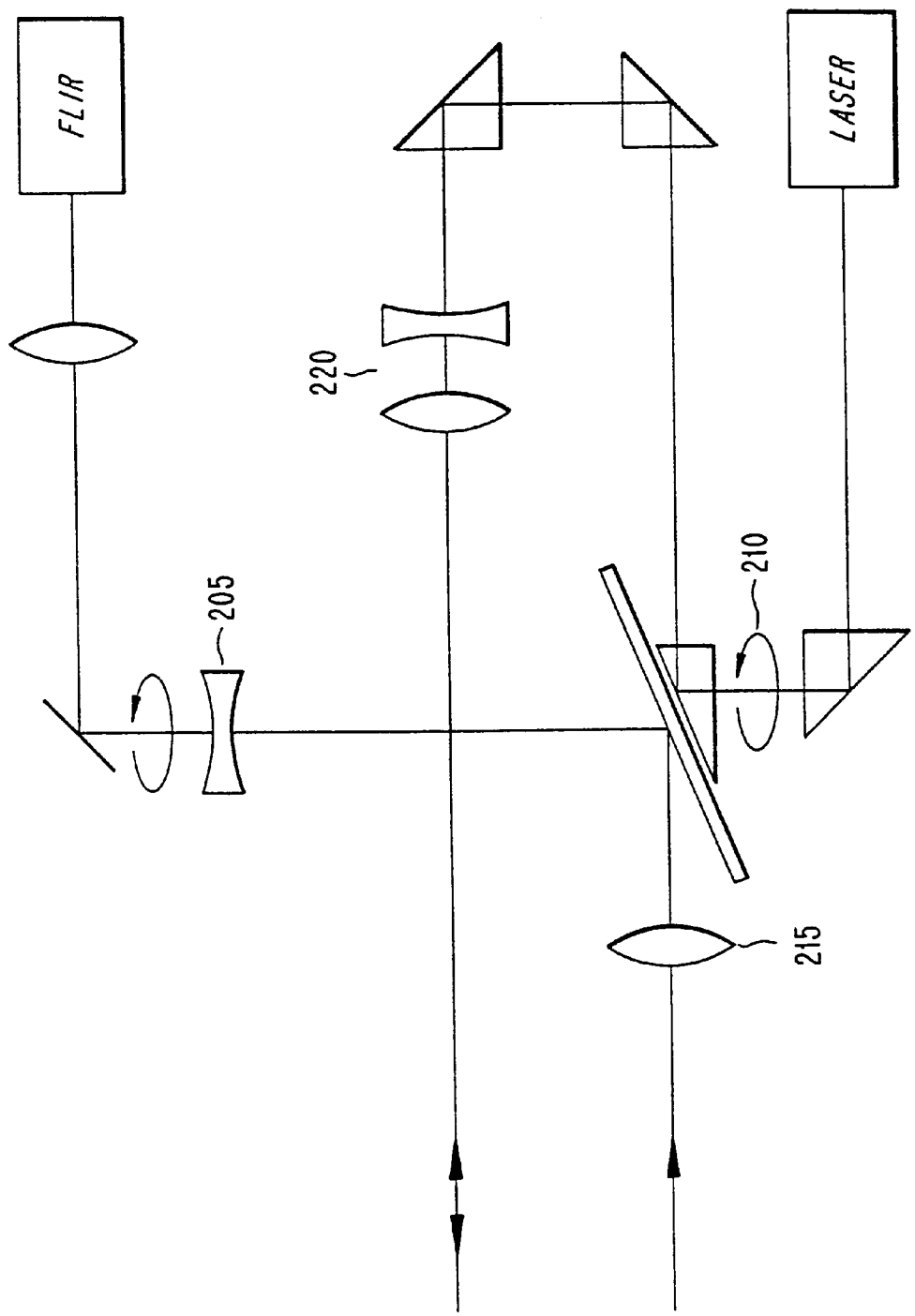
FIG. 3 illustrates the optical design of a FLIR/laser system in accordance with the prior art.
Figure 4:
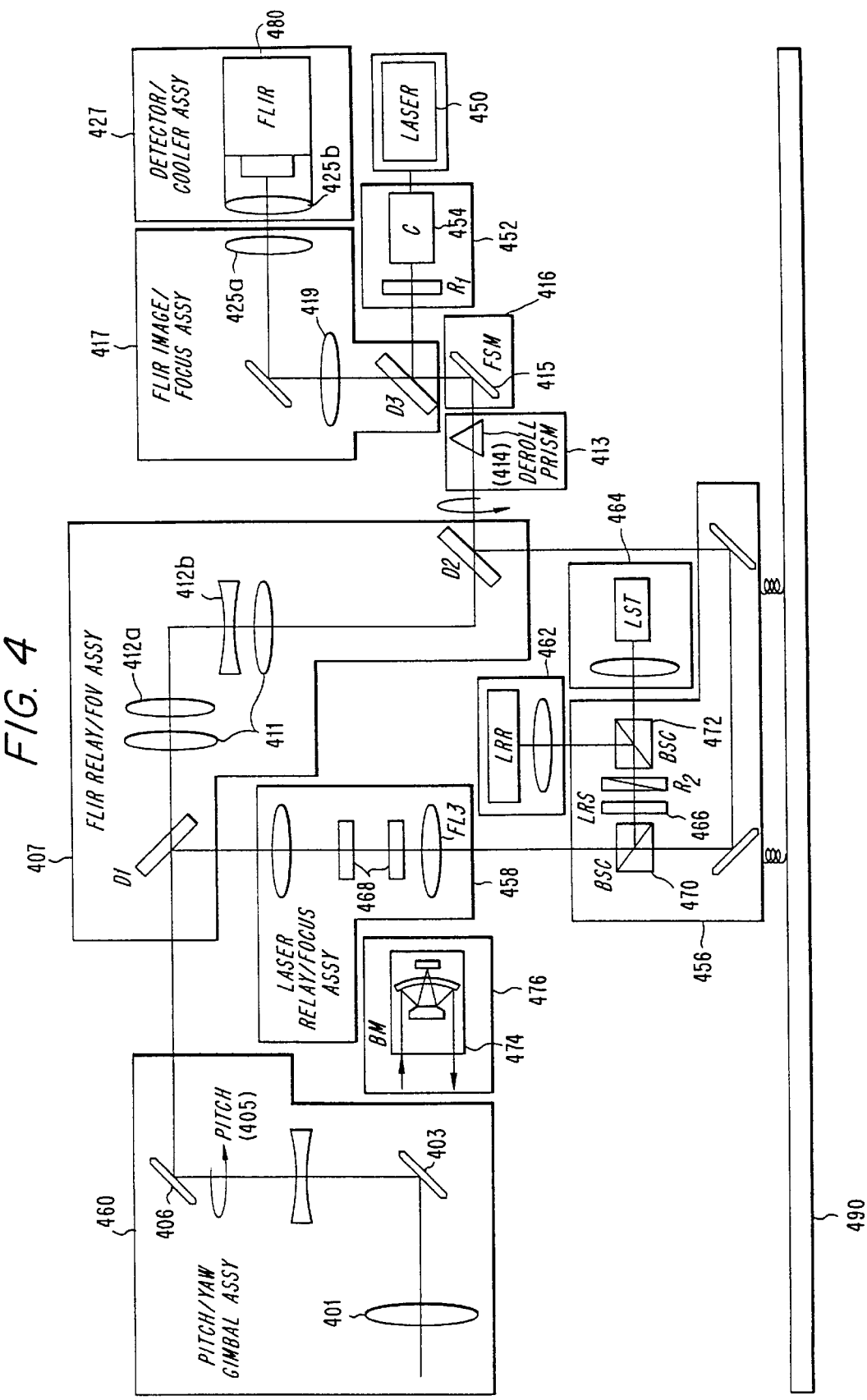
FIG. 4 shows the opto-electrical subsystem of a preferred embodiment of the present invention.
Figure 5:
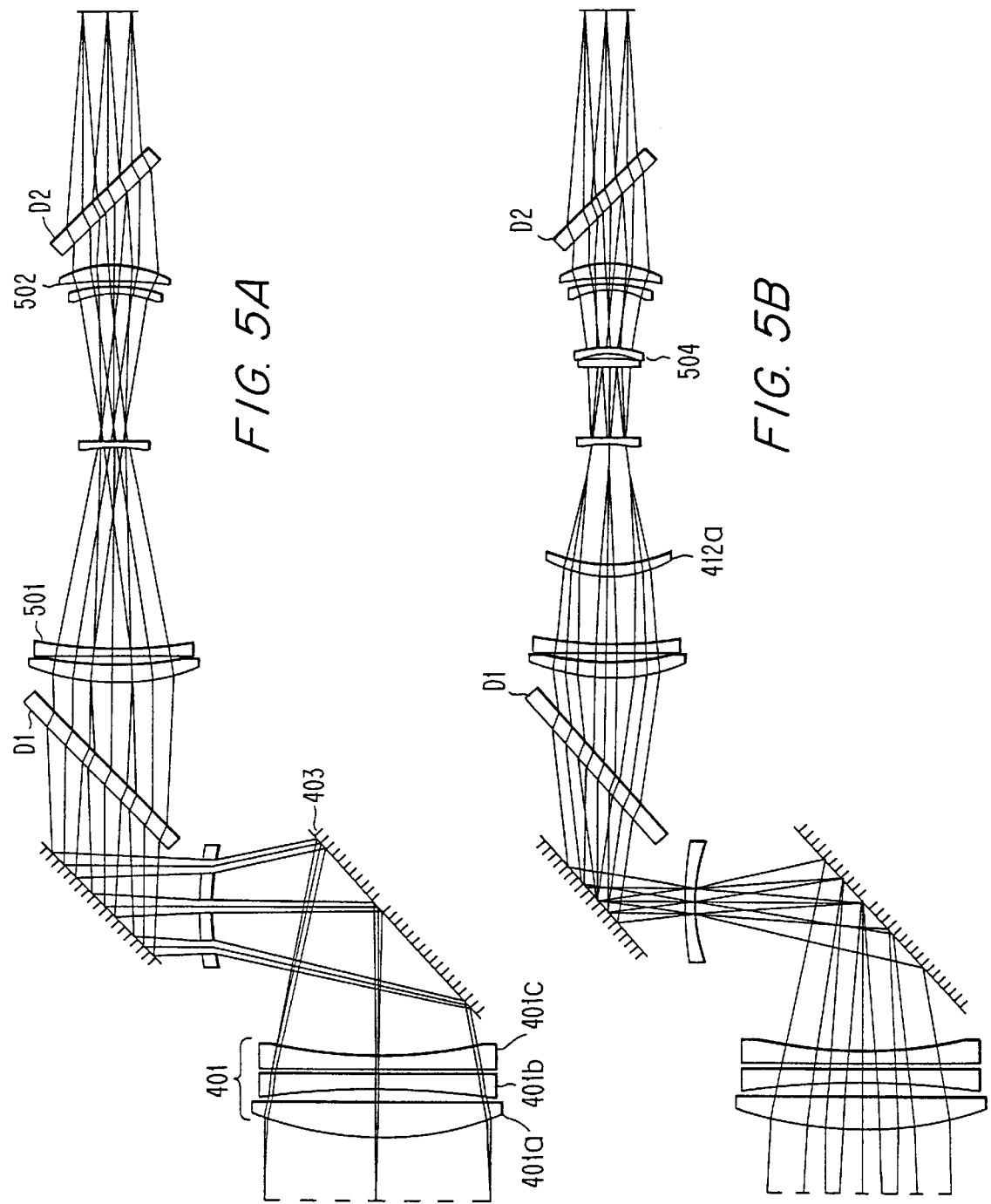
FIG. 5A depicts the optical configuration of the FLIR relay/FOV assembly in the NFOV mode.
FIG. 5B depicts the optical configuration of the FLIR relay/FOV assembly in the WFOV mode.

In a preferred embodiment of the present invention, as illustrated in FIG. 4, IR energy enters a segmented target acquisition window (not shown), and is collected by a common pitch/yaw gimbal afocal 401. The common pitch/yaw gimbal afocal 401, or common aperture, is referred to as "common" because the same aperture is utilized to transmit and/or receive IR energy as well as laser energy. The common aperture 401 is actually a set of lenses comprising one positive lens 401a and two negative lenses 401b and 401c, as illustrated in FIG. 5A. This set of lenses equalizes the index of refraction for both the IR energy and the laser energy, thereby making it feasible to utilize a single aperture for both the laser energy and IR energy. Having a single aperture for both the laser energy and the IR energy significantly reduces both fixed and dynamic alignment errors between the FLIR LOS and the laser LOS.

The common aperture 401 reduces the diameter of the IR energy beam as it enters the system and directs it toward a turning mirror 403. The turning mirror 403 then directs the IR energy beam down the pitch-axis centerline 405. A turning mirror 406 then redirects the laser energy and the IR energy parallel to the system longitudinal axis where it encounters a Dichroic DI located within the FLIR relay/FOV assembly 407. Dichroic D1 separates the incoming energy based on spectral content. Dichroic D1 accomplishes this by transmitting energy having wavelengths that are greater than ~2.7 microns (e.g., IR energy) and reflecting energy having wavelengths that are shorter than ~2.0 microns (e.g., laser energy).

The FLIR Relay/FOV assembly 407 contains a number of fixed lenses 411a and 411b, and a number of movable lenses 412a and 412b. These lenses act upon the IR energy so as to decrease or increase the IR beam diameter depending upon whether the FLIR relay/FOV assembly 407 is in the narrow FOV (NFOV) mode or the wide FOV (WFOV) mode, respectively, as will be explained in greater detail below. The IR energy then passes through a dichroic D2 which transmits the IR energy in the same manner as dichroic D1.

The IR energy next encounters a deroll assembly 413. The deroll assembly 413 includes a deroll prism 414 and a servo motor (not shown) for rotating the deroll prism 414. The deroll prism 414 internally reflects the IR beam an odd number of times, for example, three times, and causes the IR energy to exit the deroll prism 414 in the same direction that it entered the deroll prism 414. When the deroll prism 414 is rotated by the servo motor, about an axis defined by the IR optical beam, it has the effect of counter-rotating the FLIR image at a 2:1 ratio (e.g., +22.5 degrees of deroll prism 414 rotation results in −45 degrees of IR image rotation) to counter the rotation of the FLIR image caused by changes in pitch angle, as explained above. This is referred to as the doubling-effect. The deroll prism 414 will be described in greater detail below.

A fast steering mirror (FSM) 415, contained within a FSM assembly 416, then reflects the IR energy beam through a dichroic D3 located in the FLIR imager/focus assembly 417. The FSM 415 is used for fine LOS stabilization and removal of motion induced image blur associated with gimbal scanning and ground rush optical flow. The FSM 415 will also be described in greater detail below.

The FLIR imager/focus assembly 417 includes an imager afocal 419 which translates along linear bearings to compensate for variations in focus over variations in temperature and altitude. Thus, the imager afocal 419 is capable of adjusting the focus of the IR energy over a range of temperatures and altitudes.

The FLIR imager/focus assembly 417 is connected to the FLIR detector/cooler assembly 427. To facilitate FLIR detection and imaging, the lens set comprising lenses 425a and 425b collimates the IR energy as it passes through the FLIR imager/focus assembly, FLIR detector/cooler assembly interface. By collimating the IR energy, the IR image is far less sensitive to small alignment errors between the FLIR imager/focus assembly 417 and the FLIR detector/cooler assembly 427.

As previously mentioned, the FLIR relay/FOV assembly 407 provides both a NFOV and a WFOV for the area of interest. In the NFOV mode, the FLIR relay/FOV assembly 407 employs a first set of lenses 501 and a second set of lenses 502, as illustrated in FIG. 5A. Note, the first lens set 501 and the second lens set 502 appear as single lenses 411a and 411b in FIG. 4. Both the first lens set 501 and the second lens set 502 represent achromatic doublets (i.e., a positive and a negative lens pair), and they are both fixed with respect to the IR optical path. Individually, the first lens set 501 focuses the IR energy; the second lens set 502 recollimates the IR energy. Together, the first lens set 501 and the second lens set 502 provide a maximum afocal magnification and hence, a minimum FOV. Note there are no moving optical elements in the FLIR Relay/FOV assembly 407 when in the NFOV mode. Optical elements that move are more likely to cause alignment errors, and in the NFOV, boresight retention and integrity are at their most critical.

In the WFOV mode, the FLIR relay/FOV assembly 407 employs the first lens set 501 and the second lens set 502, described above, as well as a single lens 412a and a third lens set 504, as illustrated in FIG. 5B. Again, it should be noted that the third lens set 504 appears as a single lens 412b in FIG. 4. Unlike the first lens set 501 and the second lens set 502, the single lens 412a and the third lens set 504 are not fixed with respect to the FLIR optical path. Instead, they are rotated into the FLIR optical path when the FLIR relay/FOV assembly 407 transitions to the WFOV mode and out of the FLIR optical path when the FLIR relay/FOV assembly 407 transitions back to the NFOV mode. The single lens 412a and the third lens set 504 are rotated into and out of the FLIR optical path by a WFOV switch (not shown). The single lens 412a and the third lens set 504, along with the fixed lenses described above, produce a minimum afocal magnification resulting in a large FOV.

Both the fixed lenses and the rotating lenses are located about an intermediate focal plane along the IR optical path such that a real entrance pupil and a real exit pupil are generated in both the NFOV mode and the WFOV mode. This, in turn, permits the IR energy to pass through the same common aperture 401 in the pitch/yaw gimbal assembly 460 whether the system is operating in the NFOV mode or the WFOV mode without effecting the less than 2.0 micron wavelength functions.

FIG. 4 also shows the optical path for the laser energy. During the transmission of laser energy, collimated laser energy exits the laser transmitter 450 and enters the compensator assembly 452. The compensator assembly contains a compensator unit 454 and a pair of Risley prisms R1. The compensator unit 454 adjusts the phase relationship between orthogonal polarization states of the incident laser beam, the purpose of which is to ensure that a sufficient amount of laser energy is transmitted through the beam splitting cube 470 as the deroll prism 414 is rotated as explained above. Collimated laser energy then passes from the compensator unit 454 through the Risley prisms R1, which are used to steer the laser LOS. The compensator assembly 452 will be described in greater detail below.

The laser energy exits the compensator assembly 452 and is reflected by Dichroic D3 towards the FSM 415. As explained above, the FSM 415 minimizes jitter of both the laser LOS and the FLIR LOS, further helping to ensure that the laser energy is accurately directed to the desired target.

The laser energy then passes into the deroll prism 414, where it is internally reflected as was the IR energy as explained above. After exiting the deroll prism 414, the laser energy is reflected by dichroic D2 through the combined optics assembly (COA) 456 and the laser relay/focus assembly 458. Eventually, the laser energy encounters dichroic D1, which reflects the laser energy into the pitch/yaw gimbal assembly 460, which in turn directs the laser energy along a common pitch axis, through the common aperture 401, and in the direction of the desired target.

Laser energy returning from the desired target enters the sensor through the segmented window (not shown) before passing through the common aperture 401. It then follows the same optical path as the IR energy (i.e., along a common pitch axis) until reaching D1, which reflects the laser energy through the laser Relay/focus assembly 458 and into the COA 456. The COA 456 then redirects the return laser energy into either the laser range receiver (LRR) 462 or the laser spot tracker (LST) 464 depending on the state of the LST/LRR switch (LRS) 466.

The laser subsystem components including the laser transmitter 450, the compensator assembly 452, the COA 456, the LRR 462, the LST 464, and the laser relay/focus assembly 458 will now be described in greater detail.

In a preferred embodiment, the laser transmitter 450 is a diode-pumped solid state ND:YAG laser. Diode pumped transmitters are preferable over flashlamp pumped lasers with the same optical output power because diode pumped transmitters are more reliable, require less power, and have longer life spans. The laser transmitter 450 uses an optical parametric oscillator to generate a 1.57 micron training wavelength in addition to a 1.064 micron tactical wavelength. It is possible to obtain components so that the output of the laser transmitter 450 has a beam quality (i.e., brightness) of better than 9 mm-mrad measured at the laser output port and is also capable of transmitting greater than 90 mJ at 1.064 microns and 26 mJ at 1.57 microns. Moreover, the laser transmitter output is driven by a Pulse Inter-Period Modulation (PIM) code or at a pulse repetition frequency (PRF) of up to 20 Hz, with a pulse width of 20 nanoseconds.

The LRR 462 consists of a low noise InGaAs receiver responsive to both the 1.064 micron tactical wavelength and the 1.57 micron training wavelength. The LRR 462 is remotely located from the laser and uses a low level backscatter of the outgoing laser pulse as a trigger for its timing circuitry. The LRR 462 is remotely located from the laser transmitter 450 and polarization isolated by the COA 456 to prevent the outgoing laser energy from speculiarly reflecting into the LRR 462. The energy level of the outgoing laser pulse is many orders of magnitude higher than the energy level of the return laser pulse. And, if the energy of the outgoing laser pulse, or even a very small percentage of the outgoing laser energy, reflects into the LRR 462, the LRR will become saturated and incapable of detecting the return pulses in time. The LRR 462 is capable of ranging from about 0.25 nautical miles to greater than about 20 nautical miles at an accuracy of +/−3 meters.

In a preferred embodiment of the present invention, the LST 464 uses a quad cell silicon detector to acquire laser spot tracks.

The laser relay/focus assembly 458 provides two functions. First, it optically relays the transmitted and received laser energy between dichroic D1 and the COA 456. Second, it maintains laser energy focus over temperature and altitude by translating a set of focus lenses FL3. The laser relay/focus assembly 458 translates the focus lens set FL3 along linear bearings using a motor driven lead screw and by monitoring position feedback with a potentiometer. Laser energy is actually focused inside a vacuum cell (not shown) that is built into the laser relay/focus assembly housing. The laser energy passes into and out of the vacuum cell through a set of vacuum cell windows 468.

The compensator assembly 452, as stated above, contains a pair of Risley prisms R1 and a compensator unit 454, and it performs three primary functions. First, the compensator assembly 452 is capable of shifting the laser LOS to adjust the laser-to-FLIR boresight. Second, the compensator assembly 452 is capable of adjusting the polarization of the laser energy in order to compensate for perturbations introduced by the deroll prism 414. Third, the compensator assembly is capable of adjusting the polarization of the laser energy so as to alternate the intensity of the laser energy during the internal boresighting procedure as will be explained in greater detail below. Tasks are accomplished by the compensator unit 454.

Figure 6:
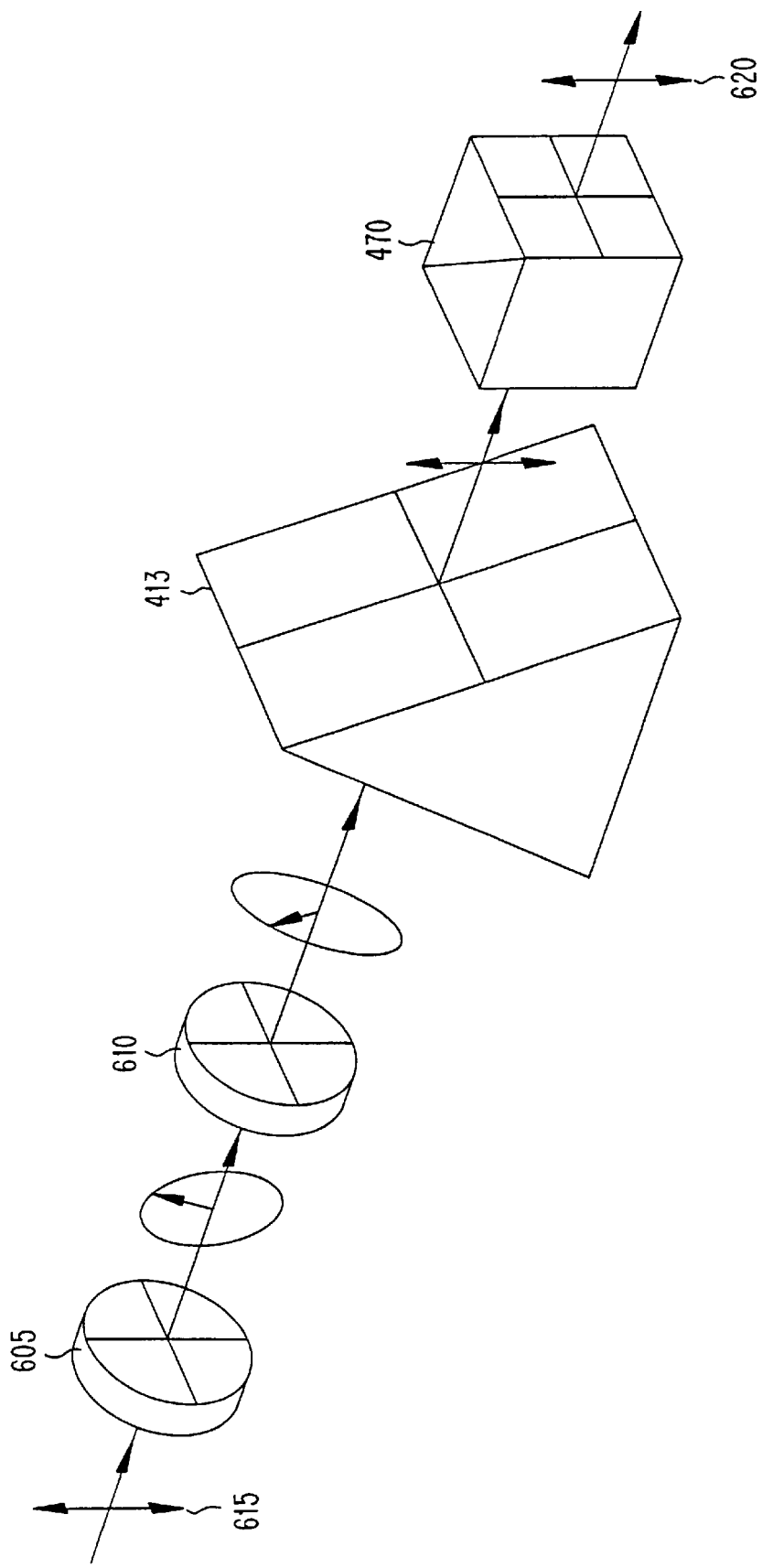
FIG. 6 illustrates the polarization of laser energy in the laser compensator unit.

As illustrated in FIG. 6, the compensator unit 454 contains two optical waveplates, a $\lambda/4$ waveplate 605 and a $\lambda/2$ waveplate 610, which are individually rotated as a function of deroll angle (i.e., the angle of the deroll prism 414), under the control of a microprocessor-based circuit (not shown) which monitors deroll angle. Both the $\lambda/4$ waveplate 605 and the $\lambda/2$ waveplate 610 are individually mounted in an identical ball-bearing-supported, gear-driven housing, and each has its own drive mechanism composed of a servo motor and a position feedback resolver.

FIG. 6 illustrates that an outgoing laser beam 615 is linearly polarized when it leaves the laser transmitter 450. However, to ensure that the laser beam is linearly polarized when it exits the deroll prism 414, the $\lambda/4$ waveplate 605 can be rotated to vary the ellipticity of the laser beam polarization, and the $\lambda/2$ waveplate 610 can be rotated to, in turn, rotate the orientation of the ellipse. By ensuring that the laser beam is linearly polarized when it exits the deroll prism 414, the laser beam will be linearly polarized when it passes through the polarizing beam splitter cube 470, thus ensuring that the energy level of the transmitted laser beam will be sufficient to illuminate the desired target. It is important to note, that the order in which the laser beam encounters the $\lambda/4$ waveplate 605 and the $\lambda/2$ waveplate 610 is important.

The COA 456 is an electromechanical/optomechanical assembly that redirects the return laser energy beam into the LRR 462 or the LST 464. The COA 456 also helps to maintain a proper laser-to-LRR boresight and a proper laser-to-LST boresight.

When the laser energy returns to the system from the desired target, it is randomly polarized. In the COA 456, the randomly polarized laser energy is redirected into a $\lambda/2$ waveplate 466 by a polarizing beamsplitter 470. In the preferred embodiment, the $\lambda/2$ waveplate 466 rotates the polarization of the laser energy such that the laser energy is adjusted for the LRR detector, the LST detector, or divided between the same. Thus, the $\lambda/2$ waveplate 466 serves as an LRR/LST switch.

After the $\lambda/2$ waveplate 466 polarizes the laser energy, a pair of Risley prisms R2, the same as the pair of Risley prisms R1, is employed to shift the laser LOS within the COA 456, thereby adjusting the laser-to-LRR or the laser-to-LST boresight. Both the Risley pair R1 and the $\lambda/2$ waveplate 466 have their own drive mechanisms comprising a servo motor and a position feedback resolver.

After passing through the pair of Risley prisms R2, the laser energy encounters a polarizing beamsplitter 472. The polarizing beamsplitter 472 redirects the laser energy into the LRR 462, the LST 464, or both depending upon the rotation state of the $\lambda/2$ waveplate 466 (i.e., the LRR/LST switch).

Figure 7:
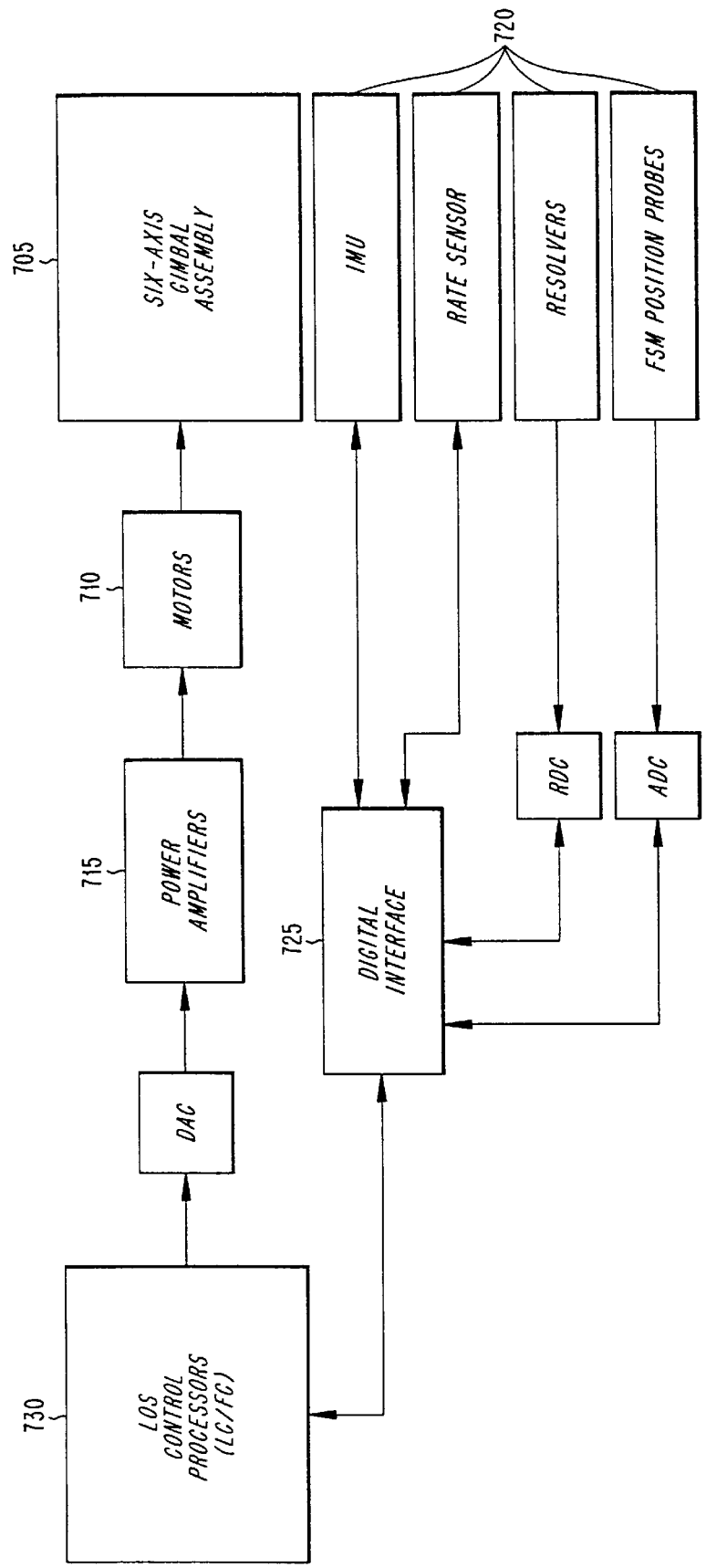
FIG. 7 is a block diagram of the LOS/servo subsystem.

In order to stabilize, correct and control the laser LOS and the FLIR LOS, the present invention employs a LOS/servo subsystem. The LOS/servo subsystem helps to minimize dynamic jitter for both the FLIR LOS and laser LOS. FIG. 7 is a diagram of the LOS/servo subsystem, which includes a six-axis gimbal assembly 705, a number of single, dual and three phase servo motors 710, power amplifiers 715, various rate and position sensors 720, a digital interface 725, and a digital processor 730.

The six-axis gimbal assembly 705 includes the pitch/yaw gimbal assembly 460, a roll gimbal (not shown), the deroll assembly 413, and the FSM 415. The pitch/yaw gimbal assembly 460, the deroll assembly 413, and the FSM 415 are all mounted on a passively isolated optical bed 490 that is supported by the roll gimbal. The isolated optical bed 490 attenuates high-frequency vibrations and minimizes structural bending (i.e., low to mid frequency vibrations), all of which might significantly contribute to LOS and dynamic alignment errors.

Figure 8:
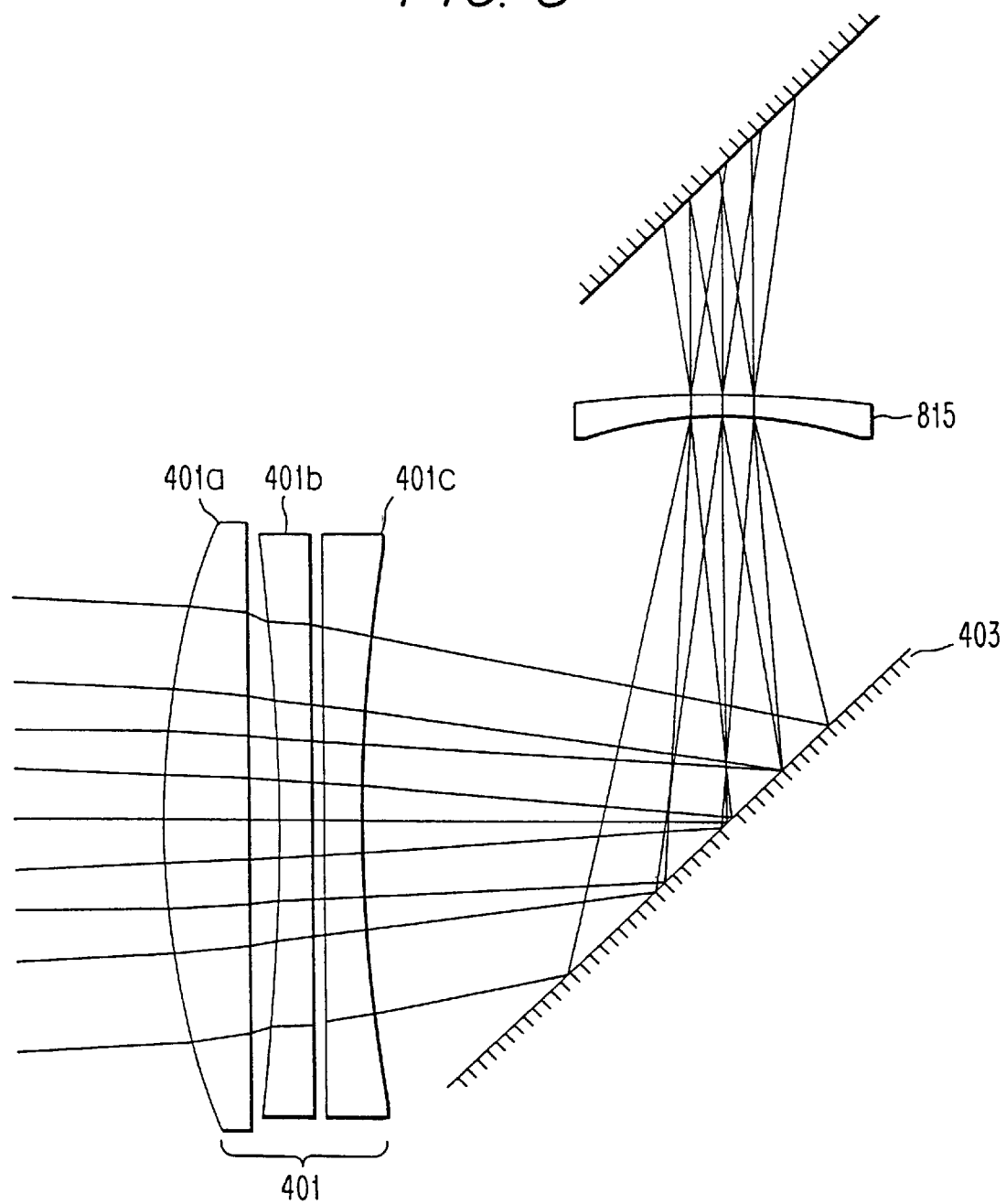
FIG. 8 shows the optical configuration of the common pitch/yaw afocal and gimbal mirror in the pitch/yaw gimbal assembly.

The pitch/yaw gimbal assembly 460, in turn, comprises an inner gimbal (i.e., a yaw gimbal) that includes a set of lenses 401a, 401b and 401c, as illustrated in FIGS. 5A and 8, and a gimbaled mirror 403. Note, the lens set comprising lenses 401a, 401b and 401c is shown as a single lens 401 in FIG. 4. Lenses 401a, 401b and 401c are the optical elements which make up the common pitch/yaw afocal (i.e., the common aperture mentioned above). The inner gimbal provides limited rotational movement about the yaw axis (approximately 5 degrees). The pitch/yaw gimbal assembly 460 also has an outer gimbal (i.e., a pitch gimbal), which contains a fourth lens 815. The outer gimbal provides a full 360° of rotation about the pitch axis 405. In addition, there is only one pitch axis interface between the pitch/yaw gimbal assembly 460 and the host platform, and therefore, a common set of pitch bearings for the laser optics and for the FLIRoptics. The pitch/yaw gimbal assembly 460 utilizes two separate servo motors (not shown).

The roll gimbal and the deroll assembly 413 provide LOS pointing and image roll stabilization respectively. More specifically, the deroll assembly 413 provides fine roll stabilization and horizontal stabilization for the FLIR image as the system rotates about the roll axis and/or the gimbal assembly rotates about the pitch axis. Image deroll is actually accomplished by a deroll prism 414, mounted in a cylindrical housing that rotates on low-friction, preloaded, duplex bearings. The rotating assembly is driven by a direct-drive, pancake torque motor and position is sensed through a pancake resolver, mounted coaxially with the motor.

Figure 9:
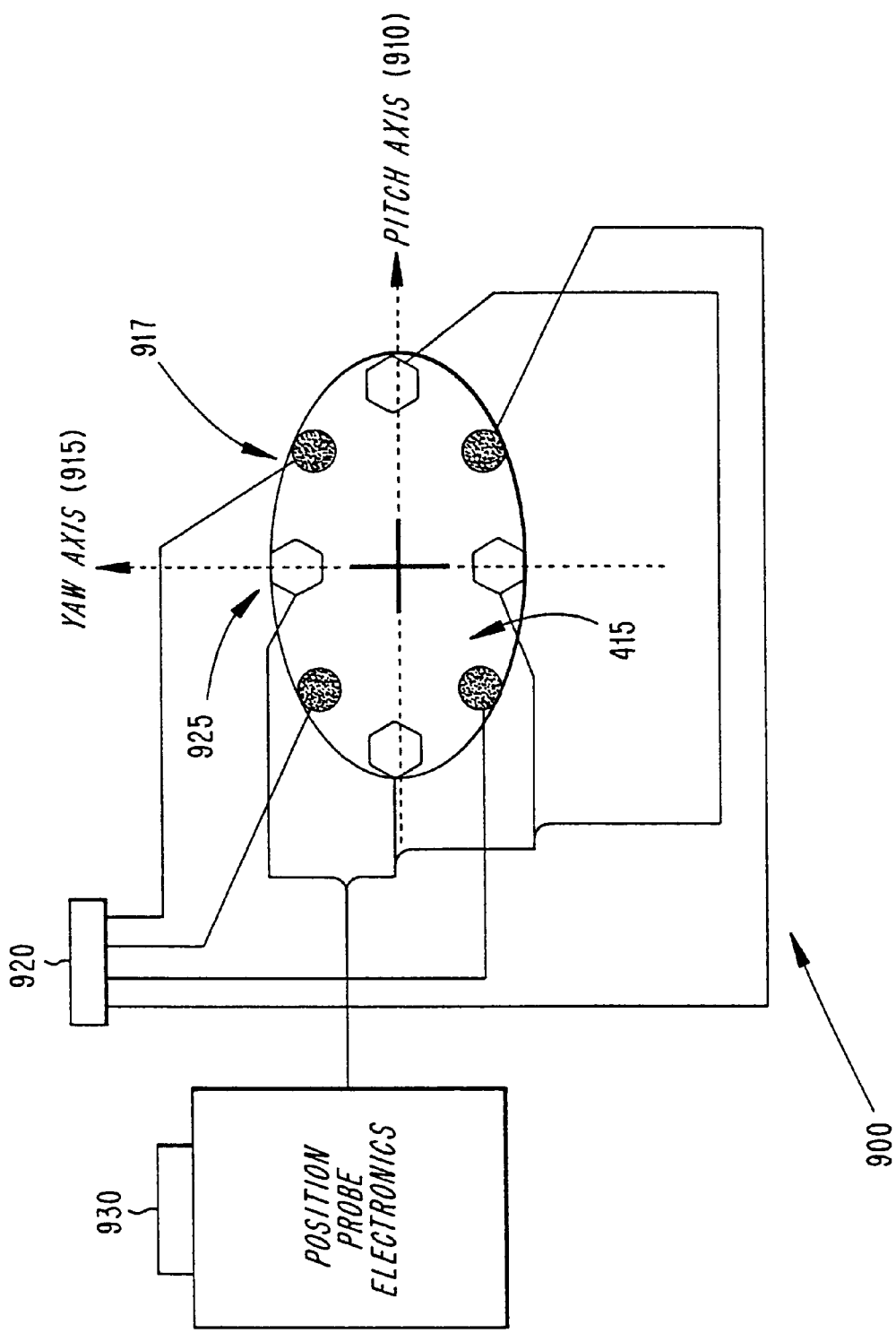
FIG. 9 depicts the fast steering mirror assembly.

The FSM assembly 416 is comprised of position probe electronics 930 and the electromechanical assembly 900. The FSM electromechanical assembly 900 is an electromechanical device which rotates a FSM 415 about the pitch axis 910 and the yaw axis 915 as illustrated in FIG. 9 (see also, U.S. Pat. No. 5,550,669). In a preferred embodiment, the FSM 900 provides fine stabilization for the FLIR LOS and the laser LOS. This is accomplished by measuring the pitch and yaw gimbal motion with the IMU 720 and by applying a position correction command to the FSM position servo motors 917. The FSM servo motor position commands are, in turn, controlled by a FSM servo electronics assembly 920. FSM position feedback is provided by a set of position probes 925 and a position probe electronics assembly 930.

The LOS control sensors 720 provide digital information to the LOS control software residing in the LOS control processor 730. The LOS control processor generates LOS control signals to control both the FLIR LOS and the laser LOS. The LOS control sensors 720 include an angular roll rate sensor which provides digital roll rate information; resolvers which provide gimbal angle position; position probes which provide position information for the FSM 415; and an inertial measurement unit (IMU) assembly (not shown). The IMU assembly is comprised of a three-axis fiber-optic gyro (FOG) and a three-axis accelerometer. The IMU provides incremental angle information, as a function of inertial angular rate, and incremental velocity information, as a function of inertial linear acceleration.

While the LOS servo subsystem helps to minimize dynamic alignment errors, the present invention contains an internal boresight module (BM) 474, to minimize fixed alignment errors between the various internal lines of sight, as illustrated in FIG. 4. The BM 474 is optically connected to the pitch/yaw gimbal assembly 460 and, along with a boresight control algorithm, is used for aligning the internal lines of sight with respect to each other. The internal lines of sight include the FLIR NFOV LOS, the FLIR WFOV LOS, the laser transmitter LOS, the LRRLOS, and the LST LOS.

Figure 10:
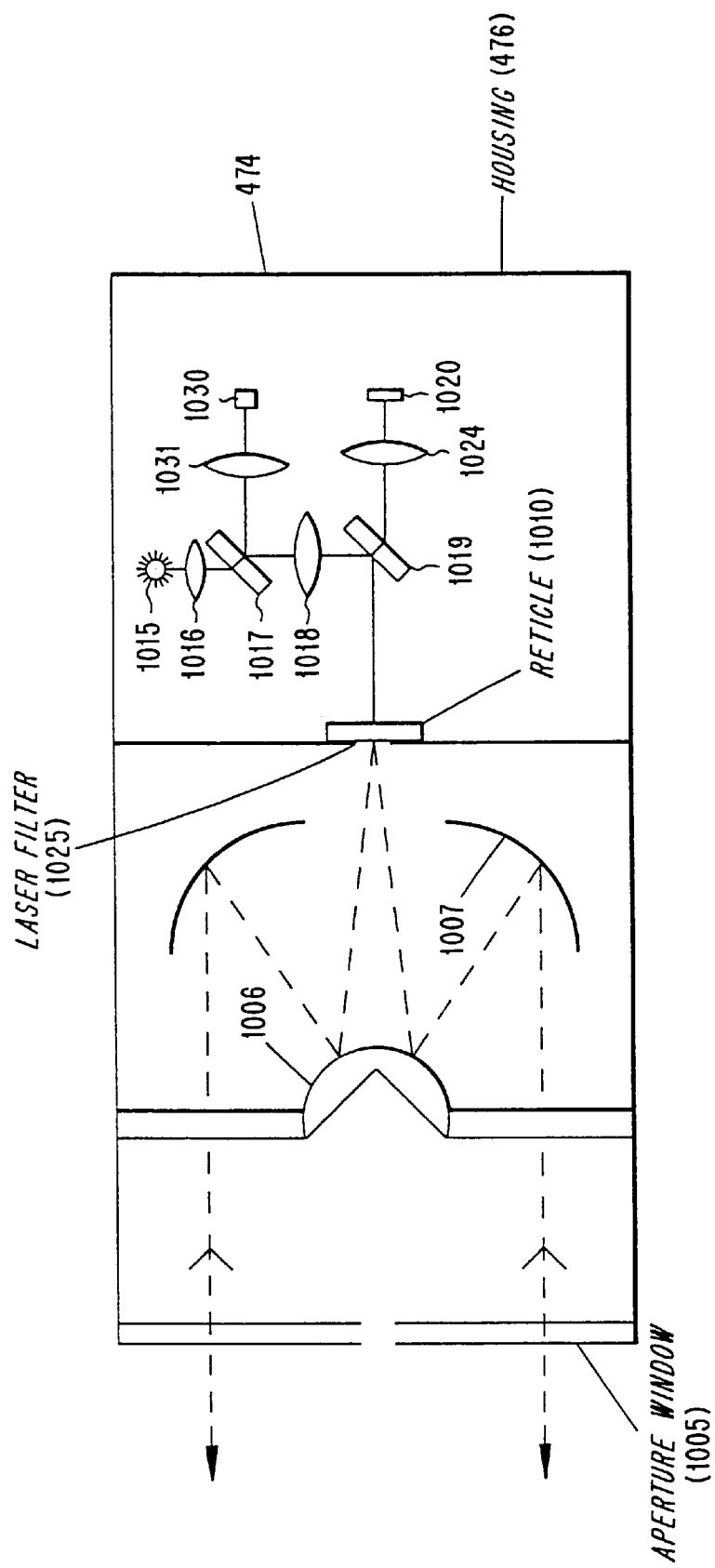
FIG. 10 shows the boresight module.

FIG. 10 shows the BM 474 in greater detail. The BM 474, which is contained inside a housing 476, includes an aperture window 1005 through which IR and laser energy pass. The BM 474 also contains a Cassegrain optical system, including a primary and a set of secondary mirrors 1006 and 1007 respectively, for directing the IR and laser energy into and out of the BM 474. In addition, the BM 474 includes a reticle 1010; a laser filter 1025, which prevents laser energy from passing through certain openings in the reticle 1010; an IR/visible light source 1015; a laser detector 1020; and a laser source 1030.

During the FLIR LOS alignment procedure, described in greater detail below, the IR/visible light source 1015 emits both IR energy and visible light energy, which pass through a diffuser 1016, a dichroic 1017, and an optical lens 1018. The energy then reflects off of a second dichroic 1019, through the reticle 1010, wherein it is directed out of the BM 474 by the primary and secondary mirrors 1006 and 1007.

During the laser LOS alignment procedure, described in greater detail below, laser energy from the laser transmitter 450 is directed into the BM 474 by the primary and secondary mirrors 1006 and 1007. The laser energy then passes through the reticle 1010 and into the laser detector 1020 via the dichroic 1019 and an optical lens 1024.

During the LRR and the LST boresight procedure, the laser source 1030 emits laser energy, which passes through an optical lens 1031. The laser energy then reflects off of the dichroic 1017, passes through the optical lens 1018, reflects off of the second dichroic 1019, passes through the reticle 1010 and out of the BM 474. In a preferred embodiment, the laser source 1030 is a laser emitting diode (LED).

Figure 11:
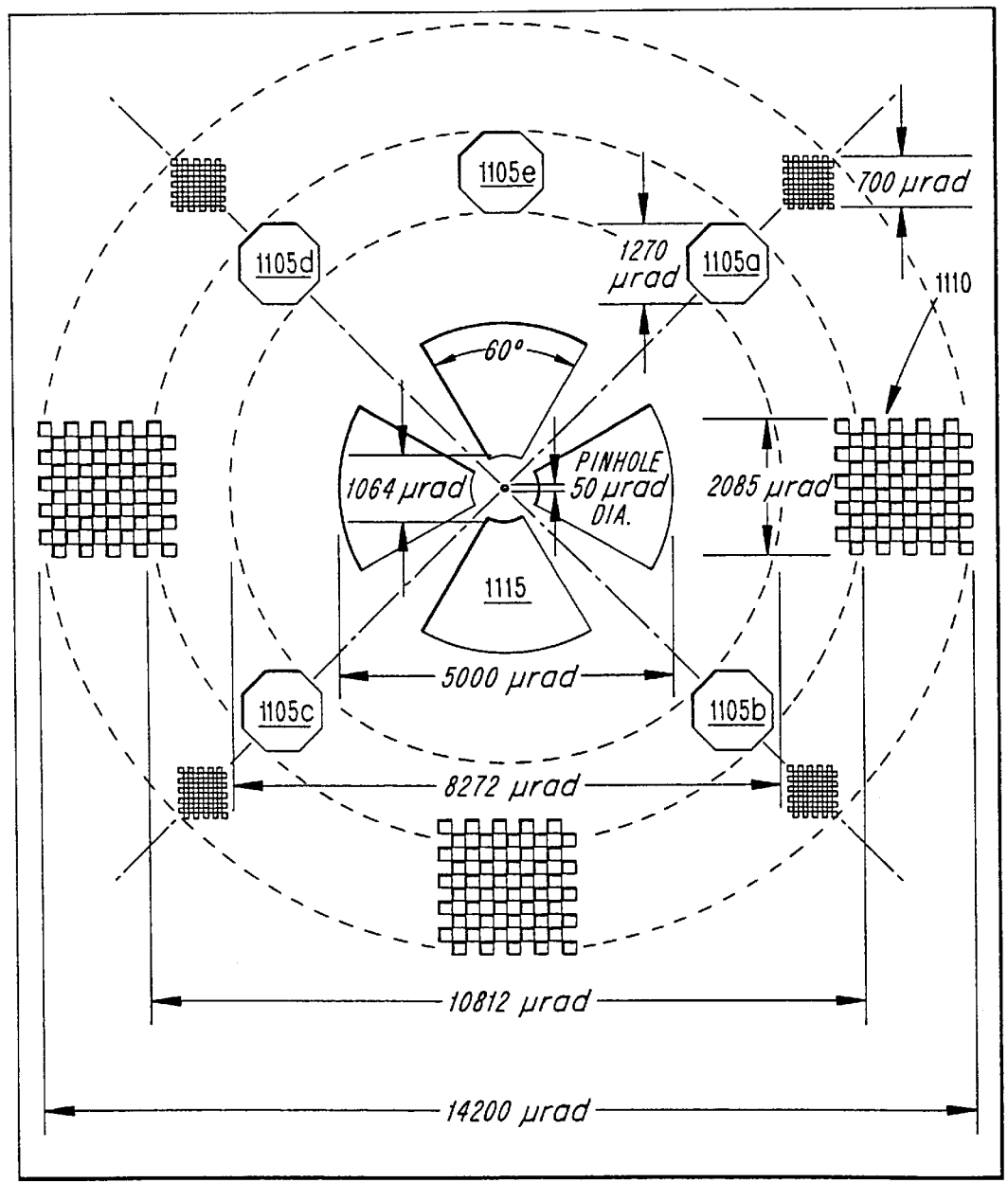
FIG. 11 shows the boresight reticle pattern.

The reticle 1010 contains a reticle pattern 1100, as illustrated in FIG. 11. The reticle pattern 1100, includes a number of unusually shaped openings, through which either laser or IR energy pass during the various LOS alignment processes. As shown in FIG. 11, the various openings are symmetrically arranged around a 1064 microradian circular region. At the very center of this circular region is a 60 microradian hole, which is coincident with the center of the reticle pattern 1100.

The first set of openings in the reticle pattern 1100 include five octagonal shaped openings 1105a–e. These openings allow IR energy to pass through the reticle 1010 during the FLIR LOS alignment procedure. As will be explained below, the first four openings 1105a–d are used for symmetrically aligning the FLIR LOS with respect to the center of the FLIR focal plane array. The fifth opening 1105e is used for rotationally aligning the FLIR LOS with respect to the FLIR focal plane array.

The reticle pattern 1100 also has a number of checkerboard-like openings 1110. The checkerboard-like openings are used in conjunction with special signal processing software. This software, in turn, controls the procedure for focusing the FLIR image prior to the FLIR alignment process. The larger checkerboard-like openings are specifically used for focusing the WFOV FLIR image, while the smaller checkerboard-like openings are used for focusing the NFOV FLIR image. The signal processing software which utilizes the checkerboard-like openings will be described in more detail below.

Finally, the reticle pattern 1100 contains four wedge shaped openings 1115. Unlike the octagonal shaped openings described above, the wedge shaped openings 1115 allow laser energy from the laser transmitter 450 to pass through the reticle 1010 during the laser LOS alignment procedure.

Figure 12:
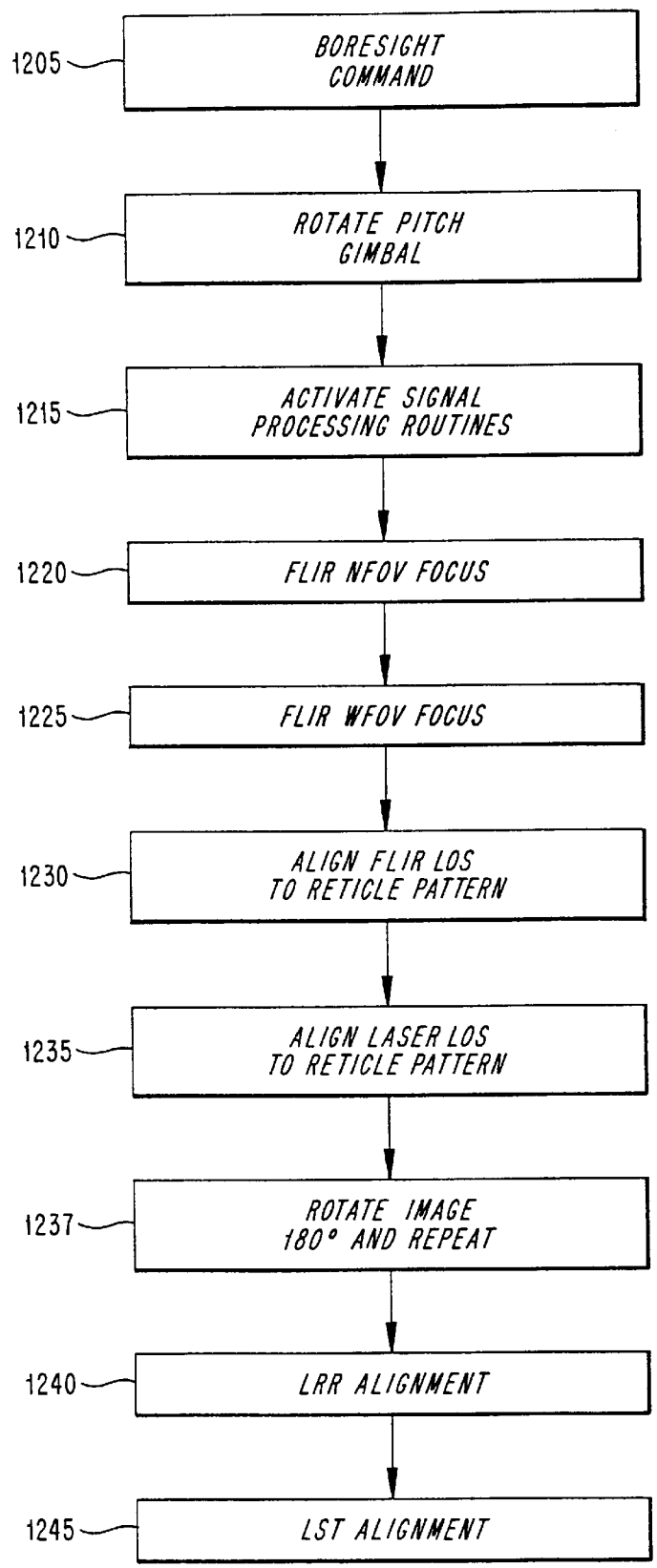
FIG. 12 is a block diagram of the boresight process.

The method for boresighting the FLIR LOS, the laser transmitter LOS, then LRRLOS and the LST LOS will now be described in greater detail hereinbelow with reference to FIG. 12. To begin, a boresight command is generated in accordance with block 1205. The pitch gimbal then rotates 165° as shown in block 1210. By rotating the pitch gimbal 165 degrees, the BM 474 becomes an integral part of the FLIR optical path and the laser optical path. Next, the signal processing routines that control the servo motors which, in turn, move the various IR and laser optics during the boresight procedure are activated in accordance with block 1215. The NFOV FLIR image and the WFOV FLIR image are then brought to focus on the focal plane array 480 in the FLIR detector/cooler assembly 427, in accordance with blocks 1220 and 1225 respectively. The FLIR LOS alignment procedure begins once the NFOV and the WFOV FLIR images are focused, in accordance with block 1230. The FLIR LOS is aligned with the center of the focal plane array 480 using the IR/visible light source 1015, the reticle pattern 1100 and, more specifically, the octagonal shaped openings 1105a–e in the reticle pattern 1100 as described above. The FLIR LOS alignment procedure is specifically accomplished by first illuminating the IR/visible light source 1015. The IR and visible light energy pass through the five octagonal shaped openings 105a–e in the reticle pattern 1100. The energy passing through each of the five octagonal shaped openings 1105a–e will cause five corresponding regions on the focal plane array 480 to become illuminated. With the roll servo locked, the signal processing routines mentioned above command the pitch and yaw servos to, in turn, rotate the pitch and yaw gimbals until the first four illuminated regions on the focal plane array 480, corresponding to the first four octagonal shaped openings 1105a–d, are symmetrically located about the center of the focal plane array 480. Then, with the pitch and yaw servos holding their positions, the signal processing routines and the deroll servo use the fifth illuminated region on the focal plane array 480, corresponding to the fifth octagonal shaped opening 1105e, to perform a roll alignment of the reticle pattern 1100 with respect to the focal plane array 480, thus completing the alignment of the FLIR LOS to the BSM.

Figure 13:
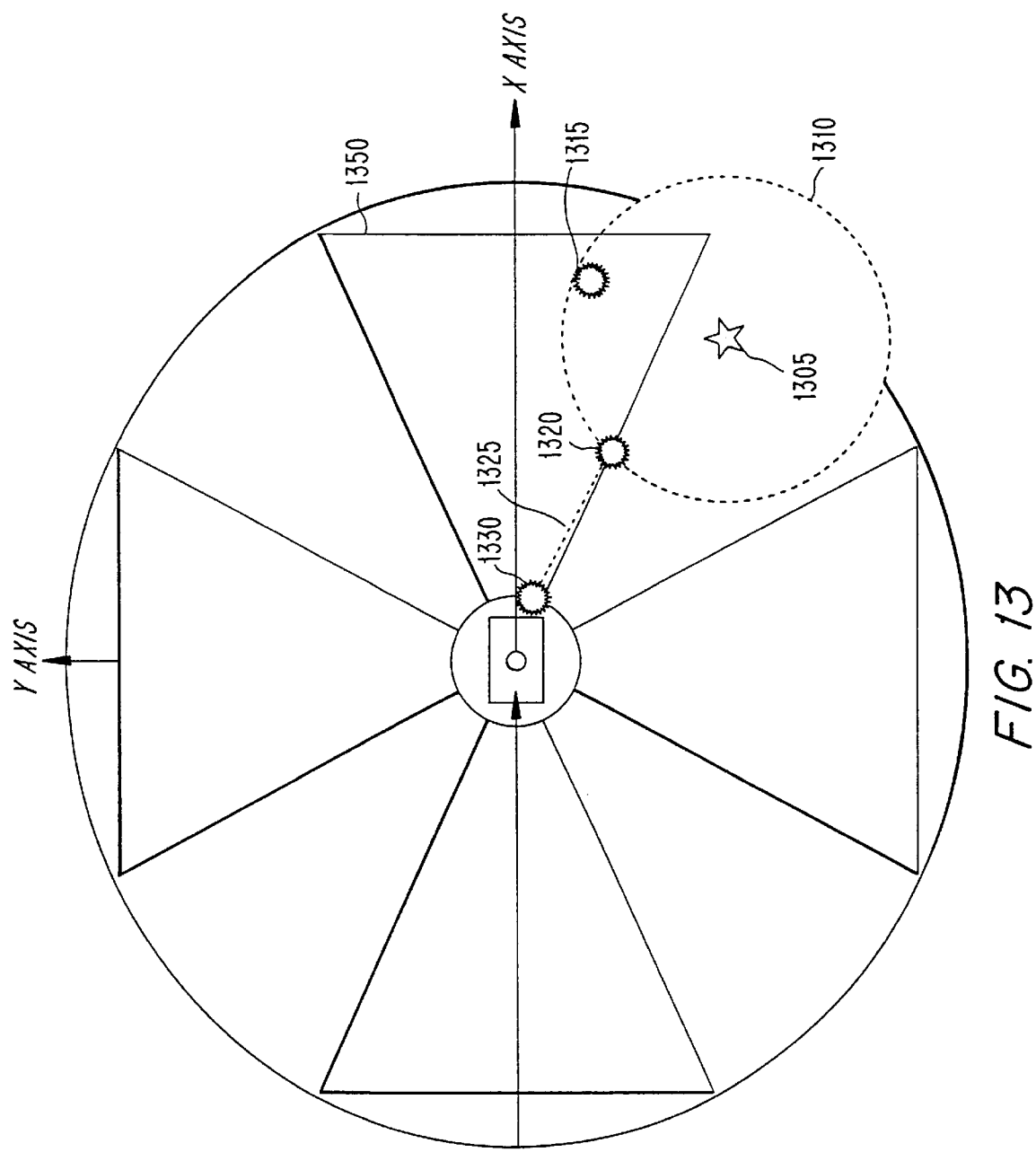
FIG. 13 shows a portion of the boresight reticle pattern used for aligning the laser spot.

Once the FLIR LOS is aligned, the laser LOS is aligned as illustrated by block 1235. To align the laser LOS, the laser transmitter 450 begins generating a continuous stream of pulses at a nominal rate of 20 Hz. As explained above, the laser filter 1025 only allows the laser energy from the laser transmitter 450 to pass through certain openings in the reticle pattern 1100, specifically, the 60° wedge shaped openings 1115 and the 60 microradian hole at the center of the reticle pattern 1100. When the laser transmitter 450 begins transmitting, the laser spot may not coincide with one of the four wedge shaped openings 1115, as illustrated by position 1305 in FIG. 13. In order to align the laser spot with one of the four wedge shaped openings 1115, the boresight algorithm commands the pair of Risley prisms R1 to move the laser spot into different positions within a search pattern 1310. Eventually, the laser spot will coincide with one of the wedge shaped openings 1115, as illustrated by position 1315. This will result in a detection by the laser detector 1020. Next, the boresight algorithm commands the Risley pair R1 to move the laser spot to the nearest radial edge of the corresponding wedge shaped opening, as illustrated by position 1320. Based upon the angle of the radial edge, the boresight algorithm can determine the direction in which the laser spot must move in order to reach the 60 microradian hole at the center of the reticle pattern 1100. In FIG. 13, the direction of movement of the laser spot is illustrated by the laser spot positions 1320, 1325 and 1330 in sequence.

When the laser spot reaches the inner edge of the corresponding wedge shaped opening, it will be approximately 500 microradians from the center of the reticle pattern 1100. The boresight algorithm then commands the Risley pair R1 to move the laser spot to a number of grid positions in accordance with one of a number of possible rectangular grid patterns, as illustrated in FIGS. 14A through 14F, wherein each rectangular grid pattern encompasses a portion of the 1064 microradian circular region at the center of the reticle pattern 1100, including the 60 microradian hole at the very center. The particular grid pattern used will depend upon the angle of the radial edge which was used as a guide to move the laser spot toward the center of the reticle pattern 1100. In the example above, the laser spot traveled toward the center of the reticle along the lower edge of the wedge shaped opening 1350, such that when the laser spot reached the inner edge of the wedge-shaped opening 1350, it was located at a position 1405 as illustrated in FIG. 14A. Consequently, the rectangular grid pattern illustrated in FIG. 14A will be used as a guide to fine-tune the alignment of the laser spot with respect to the center of the reticle pattern 1100.

Before the Risley pair R1 moves the laser spot to each of the grid pattern positions associated with, for example, the grid pattern shown in FIG. 14A, the boresight algorithm commands the polarization compensator 454 to attenuate the amount of laser energy being transmitted into the BSM. The laser energy is attenuated to prevent the focused laser energy from damaging the reticle and to adjust the energy level so it lies in a range which is detectable by the laser detector 1020. After attenuating the laser energy, the Risley pair R1 then moves the laser spot to each grid pattern position. The position corresponding to the maximum laser energy detection, as detected by the laser detector 1020, will be identified as the best laser LOS boresight alignment position.

The image illuminated on the focal plane array 480 is then rotated 180 degrees, in accordance with block 1237. This is accomplished by rotating the deroll prism 90 degrees. The FLIR LOS alignment procedure, according to blocks 1230, and the laser LOS alignment procedure, according to block 1235, are then repeated. By repeating these procedures, the boresight algorithm calibrates out any alignment errors between the FLIR LOS and the laser LOS due to the fact the IR energy and the laser energy travel along partially different optical paths.

Since the IR energy passes through the octagonal openings 1105, which are, in turn, symmetrically positioned around the 60 microradian hole at the center of the reticle pattern 1100, the alignment of the laser LOS to the 60 microradian hole results in a precise alignment between the FLIR LOS and the laser LOS. The laser LOS to FLIR LOS boresight algorithm described above is accurate to within 42 microradians with a laser beam divergence of 120 microradians or less.

Finally, the LRR 462 and the LST 464 are aligned in accordance with blocks 1240 and 1245 respectively. To align the LRR 462 and the LST 464, the laser transmitter 450 is turned off and the laser diode 1030 is turned on. The laser energy emitted by the laser diode 1030 is transmitted through the 60 microradian hole located at the center of the reticle pattern 1100. The energy from the laser diode 1030 then passes along the laser optical path, and into the COA 456. The COA 456 then directs the laser energy into the LRR 462. The LRR LOS is aligned by rotating the pair of Risley prisms 466. The COA 456 then directs the laser energy into the LST 464 and the LST LOS is similarly aligned.

Figure 15:
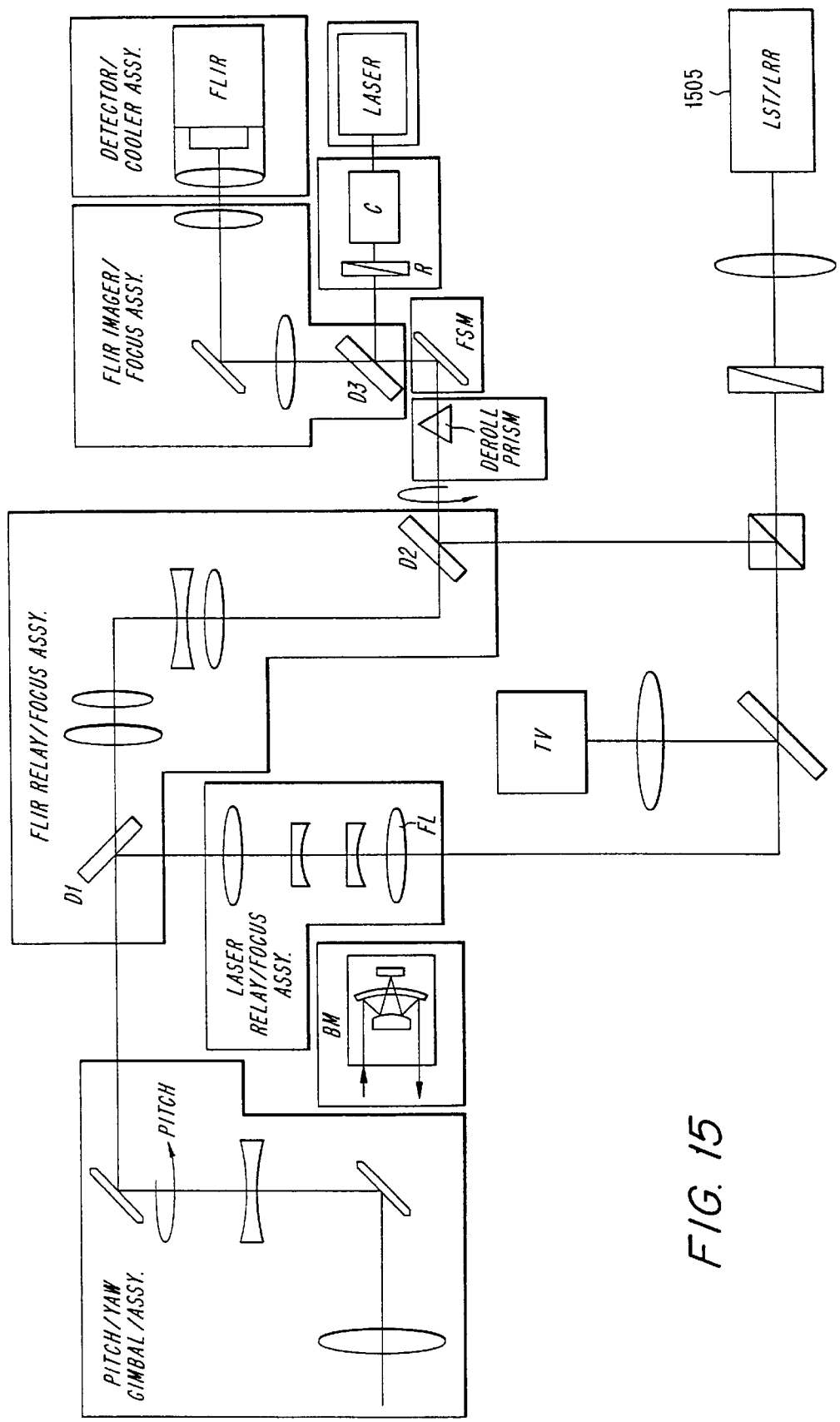
FIG. 15 shows an alternative embodiment of the present invention which employs a combined LST/LRR.

In an alternative embodiment, as illustrated in FIG. 15, the electro-optical subsystem employs a combined LST/LRR assembly 1505. When the LST and the LRR are part of one combined unit, there is no longer any need to alternately direct laser return energy into the LRR and the LST. Therefore, in the alternative embodiment the COA 456 is greatly simplified. More specifically, LRR/LST switch 466, BSC 472, and two mirrors are removed thereby reducing the complexity of the COA 456. In addition, by combining the LRR and the LST, there is no longer a need to separately boresight the LRR and the LST. Also, by combining the LRR and the LST, and by eliminating the LRR/LST switch 466, the BSC 472, and the two aforementioned mirrors, there is additional space available for a television camera 1510, which can be used for presenting a near IR image of the AOI.

Figure 16:
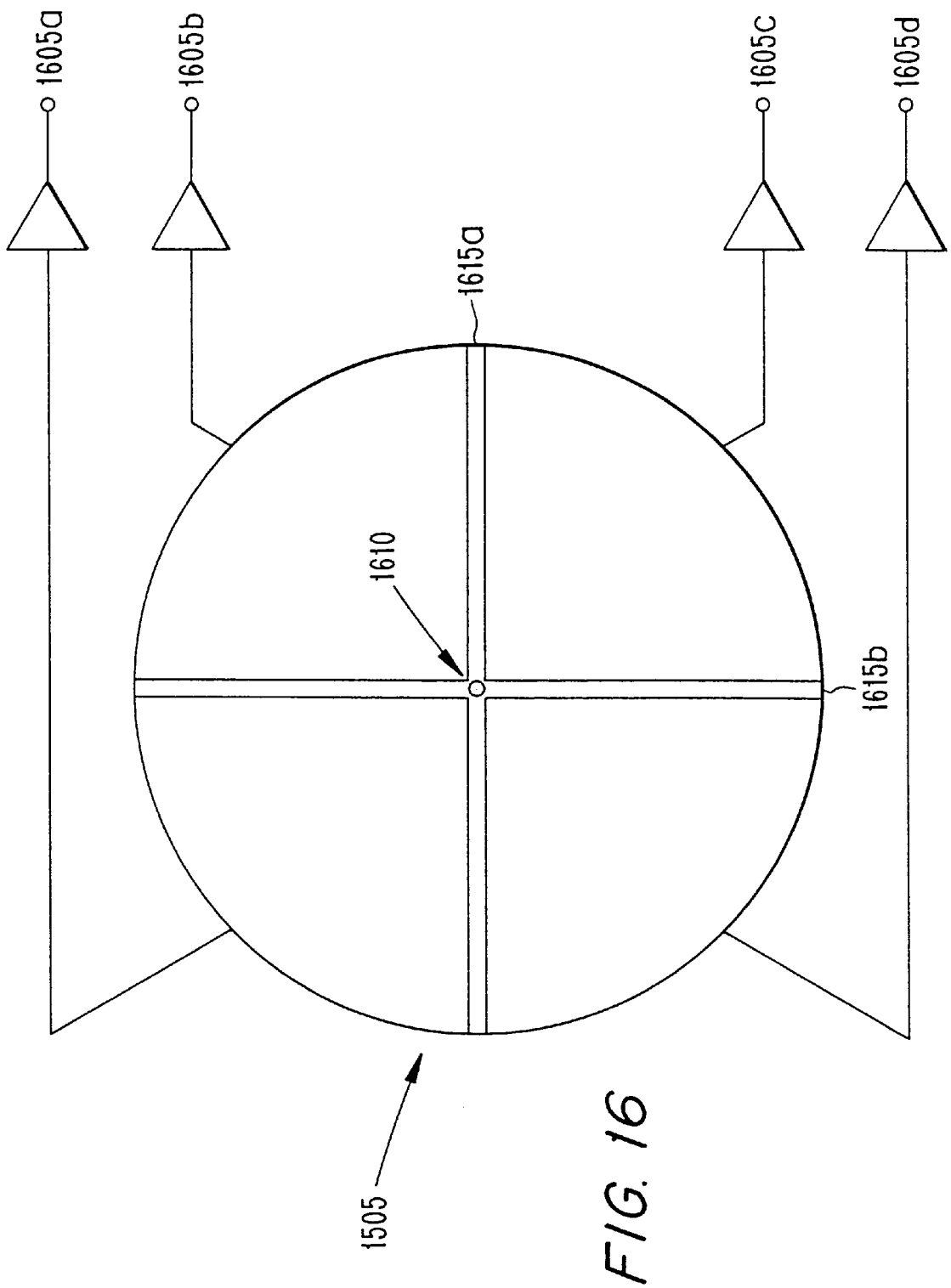
FIG. 16 illustrates the combined LST/LRR.

FIG. 16 shows the configuration of the combined LRR/LST assembly 1505. The LST is preferably a quad-cell, photosensitive device, wherein each cell outputs an electrical signal 1605a through 1605d each being proportional to the amount of laser energy illuminating the corresponding cell. Quad-cell LSTs are generally well known by those of ordinary skill in the art. The LRR 1610 is a pin diode positioned directly in the center of the quad-cell device, at the intersection of two high-impedance buffer regions 1615*a* and 1615*b,* which electrically isolate the quad-cells from each other. The LST quad cell with the integrated LRRpin diode are housed within a hybrid. Pre- and post-amplification circuitry for both the LST and LRRsensors are co-located within this hybrid.

Segmented Window & EMI Grid

Figure 17:
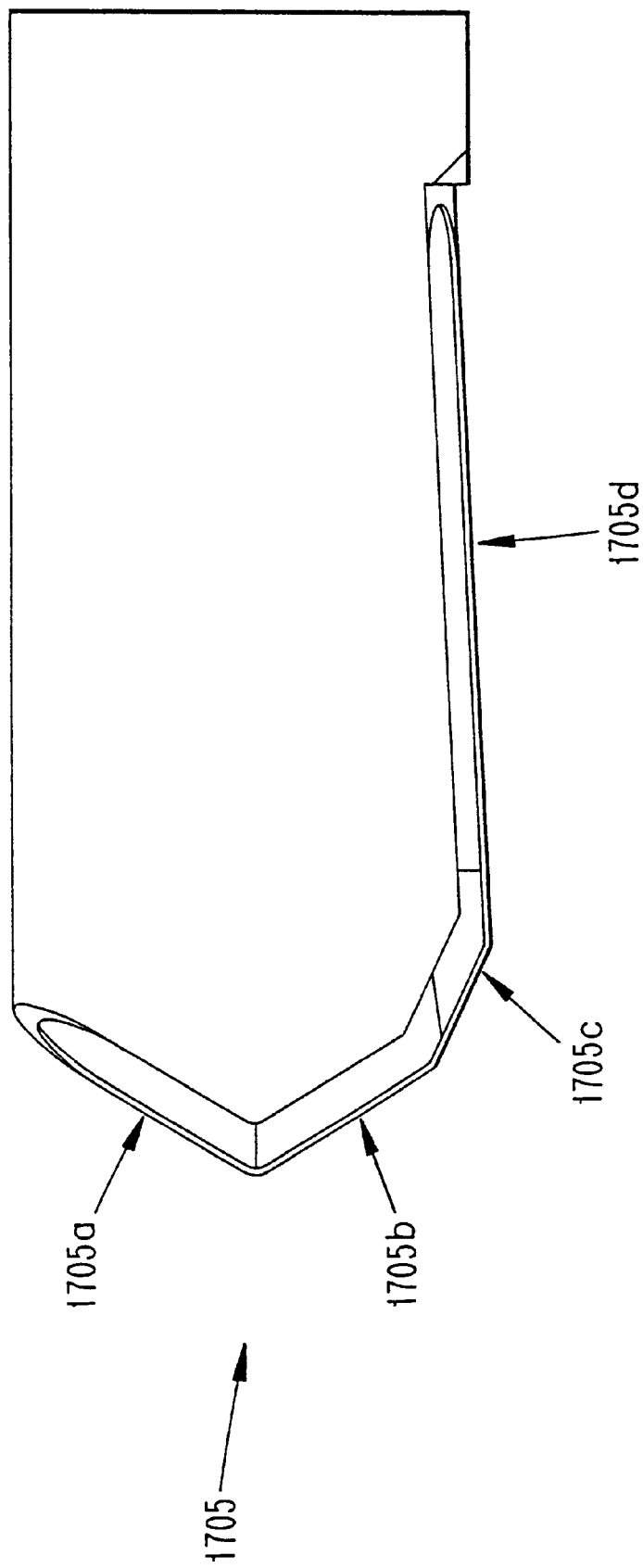
FIG. 17 shows the segmented window.

In a preferred embodiment, the opto-electric subsystem described above is housed inside a pod assembly, the forward portion of which (i.e., the shroud) is illustrated in FIG. 17. The pod assembly is connected to the host platform. For example, the pod assembly may be suspended from a pylon on the wing of a tactical aircraft such as an F-15, F-16, or an F-18. While the shroud assembly physically protects the opto-electronic equipment described above, laser energy and IR energy pass into and out of the shroud assembly through a segmented window 1705.

The window has four segments or panels, 1705*a* through 1705*d*. The segments are designed to optimize the aero-optical performance of the system. For example, these segments or panels reduce or prevent energy from reflecting back into the opto-electronic sensor described above. Also, the panels optimize the modular transfer function (MTF) versus gimbal angle at the mission critical pitch angles of 0° and 20° at 20,000 AGL. Furthermore, the window panels also support sensor scanning from +35° to −155° in pitch. 360° in roll and ±5° yaw. In addition, the segmented window is employed in lieu of a shroud follower, which requires more hardware and exhibits a larger radar cross-section (RCS) and aerodynamic drag coefficients.

The four window panels consist of a substrate material and three required coatings: an electromagnetic interference coating, a durable anti-reflection (DAR) coating, and an interior anti-reflection (IAR) coating. A number of different materials could be used for the substrate. For example, "Cleartran" (multi-spectral ZnS) is commonly used for this purpose. While exhibiting good multispectral characteristics, it is not very durable. In contrast, sapphire is very durable and it exhibits good transmissivity characteristics in the midwave range (i.e., ~3–4.5 microns). Therefore, in a preferred embodiment, sapphire is used for the substrate material.

Each of the aforementioned panels also contain an EMI grid. In general, the EMI grid reduces the exposure of the sensor and the sensor electronics to large EM fields which may be present in an operational environment. For example, the EMI grid may be used to minimize or eliminate EM energy effects on the system electronics (e.g., the IMU, FLIR analog electronics, FSM probes), which are susceptible to this type of radiation, emanating from sources (i.e., radar) located on the host platform (e.g., F-16, F-18). The grid may also minimize EM energy from the electronics located within the pod assembly which could adversely effect electronics located on the host platform.

Figure 18:
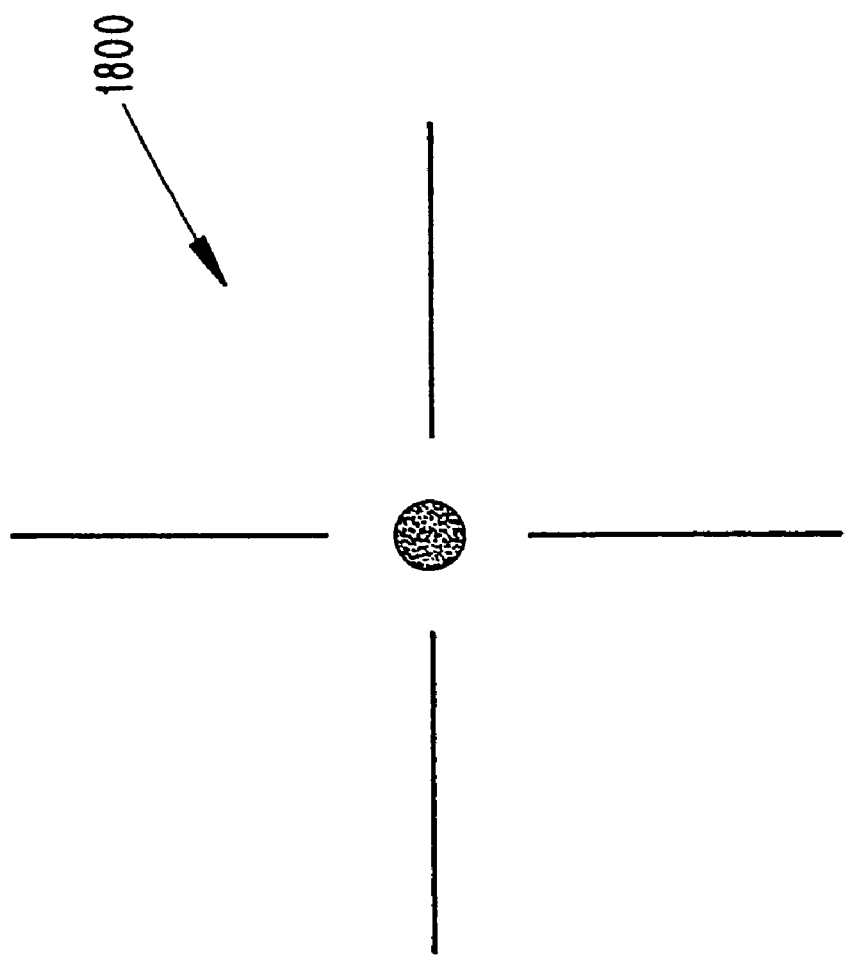
FIG. 18 illustrates a typical energy artifact that interferes with FLIR image when an EMI grid according to the prior art is used.

In general, EMI grids are well known to those of skill in the art. However, prior EMI grids employ square or polar (concentric) patterns. These prior EMI grid patterns generate unacceptable artifacts on the FLIR image. For example, a square grid pattern concentrates energy along four lines radiating from the off-axis light source and often produces an energy artifact 1800 as illustrated in FIG. 18. This energy appears on the FLIR image as illustrated and is unacceptable.

Figure 19:
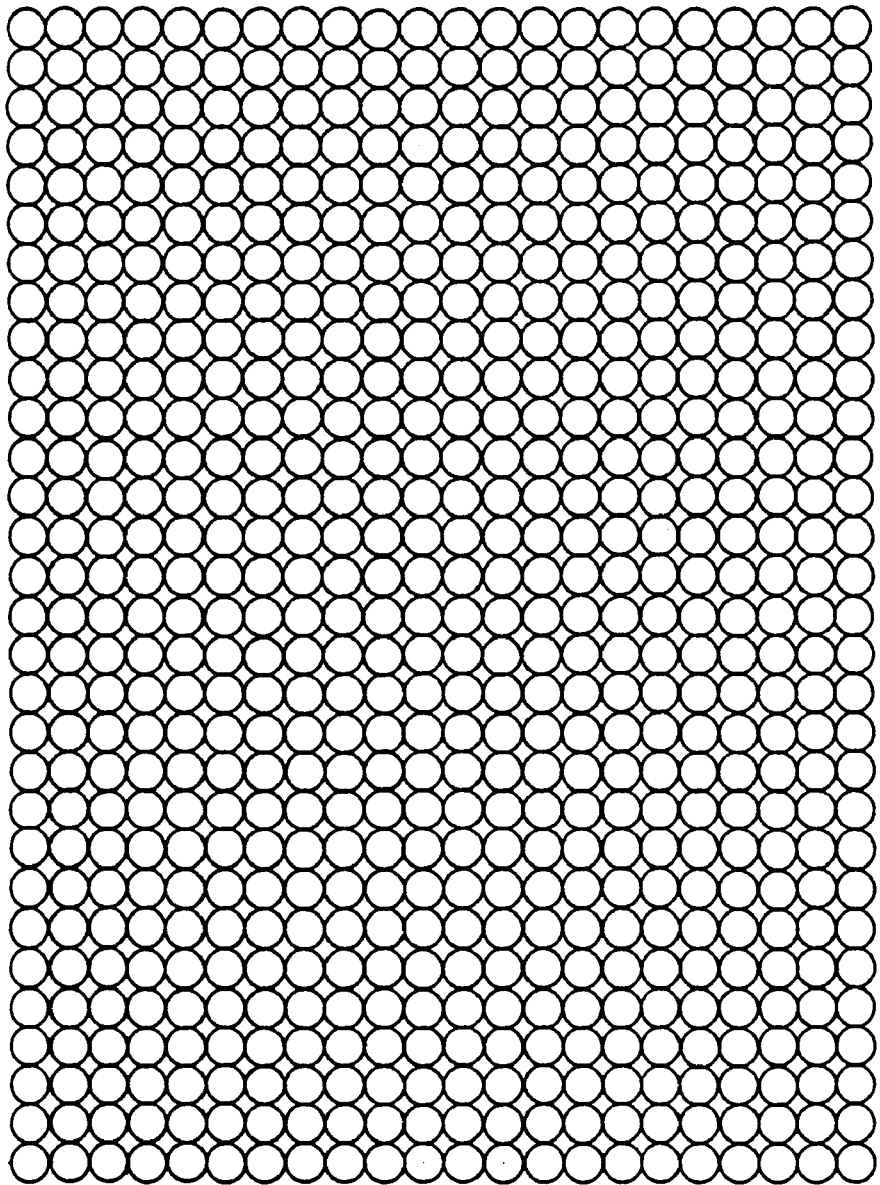
FIG. 19 shows a preferred embodiment of an EMI grid in accordance with the present invention.

In a preferred embodiment, an EMI grid pattern comprising an array of circles is employed as illustrated in FIG. 19. This EMI grid pattern conducts or diffracts stray light energy radially, rather than along specific axes, thus reducing or eliminating unwanted light energy artifacts on the FLIR image. In the arrangement of FIG. 19, each circle preferably has a line width of 5 micrometers and a diameter of 320 micrometers. The repetition offset (i.e., the distance between the center of two adjacent circles) is 315 micrometers where there is a 100 percent overlap of the circular lines at the circle tangent points.

The specific EMI grid dimensions described above represent but one exemplary embodiment of the EMI grid. Those of ordinary skill in the art will appreciate that other dimensions may be employed without exceeding the intended scope of the EMI grid pattern described above.

The EMI grid of the present invention is attached to the segmented window panels in much the same way as in the prior art. First, three metal layers are applied to the window: an inner adhesion layer, a middle conduction layer, and an outer protection layer. Different metals may be used for each layer; however, chrome is typically used for the inner layer, gold for the middle layer, and titanium for the outer layer. A "mask" is placed over the window material, and then exposed to ultraviolet light. The ultraviolet light removes the metal layers from those areas not protected by the mask. When the mask is removed, the EMI grid is affixed to the window.

Fault Isolation

The electro-optics subsystem comprises a number of servo systems. Each servo system contains one or more amplifiers and a single, dual or three phase servo motor. These servo systems provide the power and the mechanical force necessary to rotate and/or translate various lenses, prisms, mirrors, and waveplates in the electro-optics subsystem. The servo systems include a dual-phase, brushless DC motor and pulse width modulated (PWM) amplifier servo systems (i.e., the pitch servo system and the deroll servo system). Also included is a three-phase, brushless DC motor, PWM amplifier servo system (i.e., the roll servo system). Further included are several single-phase motor, linear amplifier servo systems (i.e., the various laser and FLIR focusing assembly servo systems, the thermal reference servo system, the FSM servo system, the risley prism servo systems, the yaw servo system, and the control, inlet, and exit airflow servo systems).

In order to detect the existence of fault conditions in any one of the above-identified servo systems, the present invention provides a fault isolation capability that can determine whether the fault conditions have occurred in the amplifier portion of a given servo system or in the motor portion of the given servo system. By isolating a fault to the amplifier portion or the motor portion of the given servo system, the need to remove and/or replace the entire servo system is avoided. Instead, only the amplifier or motor portion containing the fault condition need be removed and/or replaced. Prior art has required test loads and a means for switching the loads in and out of circuit. This technique does not require test loads.

Figure 20:
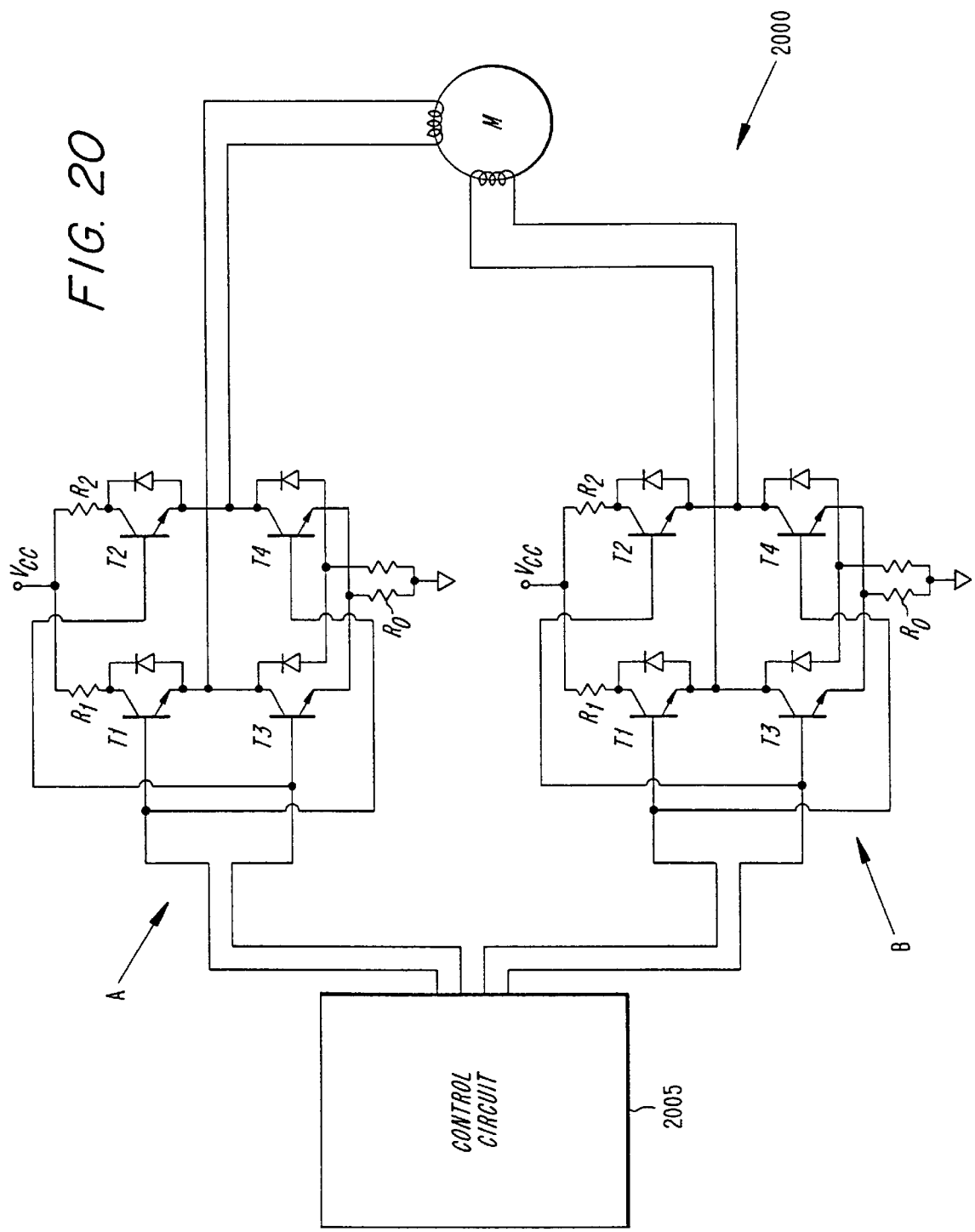
FIG. 20 is a diagram of a dual-phase motor, PWM amplifier servo system.

FIG. 20 is a diagram of a dual-phase, brushless DC motor, PWM amplifier servo system circuit 2000. Under ordinary conditions, the circuit 2000 controls the commutation of the current through the windings of the dual-phase motor M, which in turn control the rotation of the motor shaft. More particularly, the dual-phase, brushless DC motor, PWM amplifier servo system circuit 2000 comprises two PWM amplifiers A and B. Each of these amplifiers A and B has two upper drive transistors T1 and T2, and two lower drive transistors T3 and T4. To commutate the current through the motor windings thus causing the shaft of the dual-phase motor M to rotate, one skilled in the art will readily understand that it is necessary to pair the upper drive transistors in each amplifier with the lower drive transistor located on the other side of the same amplifier. For example, in amplifier A, transistor T1 will be paired with transistor T4, and transistor T2 will be paired with transistor T3. Similarly, in amplifier B, transistor T1 will be paired with transistor T4 and transistor T2 will be paired with transistor T3. Then, by alternately activating each pair of drive transistors (a technique known as complimentary switching), first in amplifier A and then in amplifier B, the dual-phase motor, PWM amplifier servo system circuit 2000 can maintain a constant torque on the shaft of motor M.

The dual-phase motor, PWM amplifier servo system circuit 2000 also includes a control circuit 2005. The control circuit 2005 specifically controls the timing of the complementary switching process (i.e., when each drive transistor pair is activated) to control load current using a standard feedback configuration. In the present invention, the control circuit 2005 is implemented with a field programmable gate array (FPGA); however, one skilled in the art will readily understand that the control circuit 2005 can be implemented using other forms of logic without departing from the spirit of the invention.

In addition, each amplifier A and B, in the dual-phase motor, PWM amplifier servo system circuit 2000, contains two upper current sensing resistors R1 and R2. The upper current sensing resistors R1 and R2 monitor the amount of current flowing through the upper drive transistors T1 and T2 respectively. Furthermore, each amplifier A and B contains a lower current sensing resistor Ro. The lower current sensing resistor Ro is utilized for monitoring the current flowing through the lower drive transistors T3 and T4. It is important to note that in the present invention, amplifiers A and B contain insulated gate bipolar transistors (IGBTs). IGBTs are utilized, in part, because their utilization simplifies the design of the control circuit 2005, given a 270 volt source Vcc, as one skilled in the art will readily understand. However, one skilled in the art will also recognize that solid state switches such as MOSFETs and bipolar transistors could be employed.

In general, the dual-phase, PWM amplifier servo system fault isolation process works as follows. Complimentary switching of transistor pairs is disabled. The control circuitry 2005 activates a pair of drive transistors, for example T1 and T4 in amplifier A. The control circuitry 2005 will then deactivate this drive transistor pair and, in turn, activate and deactivate each of the other drive transistor pairs: T2 and T3 in amplifier A, T1 and T4 in amplifier B, and T2 and T3 in amplifier B. Under normal operating conditions (i.e., when there is no fault condition present), the activation of each drive transistor pair will cause a specific amount of current to flow through the corresponding upper current sensing resistor R1 or R2, through the corresponding upper drive transistor T1 or T2, through the corresponding servo motor winding, through the corresponding lower drive transistor T3 or T4, and eventually through the lower current sensing resistor Ro. If, in fact, there are no fault conditions present, a known voltage drop will always develop across the upper current sensing resistor R1 or R2 and across the lower current sensing resistor Ro. However, if a fault condition does exist, the amount of current flowing through the upper current sensing resistor R1 or R2, and/or across the lower current sensing resistor Ro will be significantly affected. By monitoring the amount of current flowing through these resistors as each of the above-identified drive transistor pairs is activated, the following single point fault conditions can be isolated, as will be described in greater detail below: motor winding short circuit, motor winding open circuit, amplifier short circuit, motor winding short-to-ground, amplifier open circuit.

Figure 21:
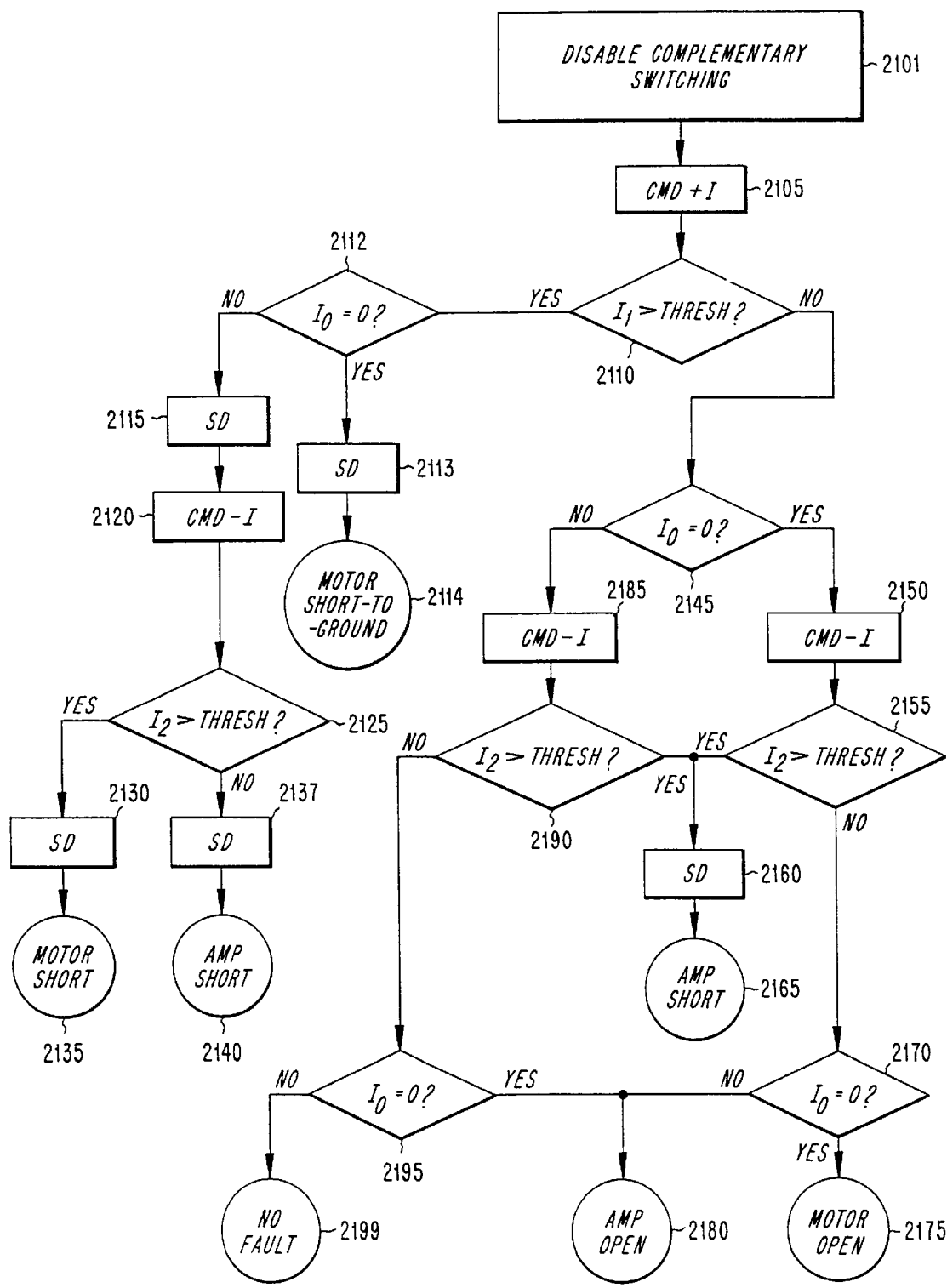
FIG. 21 is a flowchart depicting the dual-phase motor, PWM amplifier fault isolation process.

FIG. 21 is a flowchart which depicts the steps of the dual-phase motor, PWM amplifier fault isolation process, in accordance with a preferred embodiment of the present invention. In accordance with FIG. 21, the control circuit 2005 initiates the process by disabling the complementary switching as illustrated by block 2101. Once the complementary switching has been disabled, the control circuit 2005 is free to activate and deactivate the drive transistor pairs for the purpose of fault isolation.

After the complementary switching has been disabled, the control circuit 2005 generates a positive current command +I, as illustrated by block 2105. The positive current command activates the transistor pair comprising drive transistors T1 and T4. The control circuit 2005 then determines whether the magnitude of the current flowing through the upper current sensing resistor R1 is normal or whether it exceeds a normal amount, i.e., whether it exceeds a predetermined threshold value, as illustrated by decision block 2110. If the magnitude of the current flowing through the upper current sensing resistor R1 is excessive, in accordance with the "YES" path out of decision block 2110, the control circuit 2005 determines whether the magnitude of the current flowing through the lower current sensing resistor RO is equal to zero, as illustrated by decision block 2112. If the current flowing through the lower current sensing resistor R0 is equal to zero, in accordance with the "YES" path out of decision block 2112, the control circuit 2005 will generate an amplifier SHUTDOWN command, as illustrated in block 2113. Since the control circuit 2005 determined the amount of current to be zero, the fault condition is identified as a motor winding short-to-ground, as illustrated by block 2114. If the control circuit 2005 determines that the current flowing through the lower current sensing resistor is not equal to zero, in accordance with the "NO" path out of decision block 2112, control logic 2005 will nevertheless generate an amplifier SHUTDOWN command, as illustrated by block 2115. However, it is still undetermined whether the fault condition causing the excessive amount of current through the upper current sensing resistor R1 is due to a short circuit in the motor winding or a short circuit in the amplifier. Therefore, the control circuit then generates a negative current command-I, as illustrated by block 2120, which activates the transistor pair comprising drive transistors T2 and T3. The control circuit 2005 now determines whether the magnitude of the current flowing through the upper current sensing resistor R2 is excessive, i.e., whether it exceeds the predetermined threshold, as illustrated by decision block 2125. If the amount of current flowing through the upper current sensing resistor R2 does exceed the threshold value, in accordance with the "YES" path out of decision block 2125, the control circuit 2005 will, once again, generate an amplifier SHUTDOWN command, as illustrated by block 2130. Since an excessive amount of current is drawn through both upper current resistors R1 and R2, the fault condition is identified as a servo motor winding short circuit, as illustrated by step 2135. If, however, the magnitude of the current flowing through the upper current sensing resistor R2 does not exceed the predetermined threshold value, in accordance with the "NO" path out of decision block 2125, i.e., if only one of the upper current sensing resistors draws an excessive amount of current, the fault condition is identified as an amplifier short circuit, as illustrated by step 2140.

If, after generating the positive current command +I, according to block 2105, the control circuit 2005 determines that the magnitude of the current flowing through the upper current sensing resistor R1 did not exceed the predetermined threshold, in accordance with the "NO" path out of decision block 2110, the control circuit 2005 then determines whether the magnitude of the current flowing through the lower current sensing resistor Ro is equal to zero, as illustrated by decision block 2145. If the magnitude of the current flowing through the lower current sensing resistor does equal zero, the control circuit 2005 then generates a negative current command −I, as illustrated by block 2150, and determines whether the magnitude of the current flowing through the upper current sensing resistor R2 exceeds the predetermined threshold value, as illustrated by decision block 2155. If the magnitude of the current flowing through the upper current sensing resistor R2 exceeds the predetermined threshold value, in accordance with the "YES" path out of decision block 2155, the control circuit 2005 will generate an amplifier SHUTDOWN command, as illustrated by block 2160. Since an excessive amount of current was detected through only one of the upper current sensing resistors, i.e., R2, the fault condition is identified as an amplifier short circuit, as illustrated by step 2165.

If, however, the magnitude of the current flowing through the upper current sensing resistor R2 does not exceed the predetermined threshold value, in accordance with the "NO" path out of decision block 2155, the control circuit 2005 will determine whether the magnitude of the current flowing through the lower current sensing resistor is equal to zero, as illustrated by decision block 2170. If the current flowing through the lower current sensing resistor Ro does equal zero, i.e., both R1 and R2 drawing normal amounts of current and Ro drawing no current when T1 and T4 are activated and when T2 and T3 are activated, the fault condition will be identified as a motor winding open circuit, as illustrated by step 2175. If the current flowing through the lower current sensing resistor Ro does not equal zero, in accordance with the "NO" path out of decision block 2170, i.e., both R1 and R2 are drawing normal amounts of current and Ro drawing no current only when T1 and T4 are activated, the fault condition is identified as an amplifier open circuit, as illustrated by step 2180.

If, however, the magnitude of the current flowing through the lower current sensing resistor Ro does not equal zero, in accordance with the "NO" path out of decision block 2145, the control circuit 2005 will generate a negative current command −I, as illustrated by block 2185, which activates the transistor pair comprising drive transistors T2 and T3. The control circuit 2005 then determines whether the magnitude of the current flowing through the upper current sensing resistor R2 exceeds the predetermined threshold, as illustrated by decision block 2190. If the magnitude of the current flowing through the upper current sensing resistor R2 exceeds the threshold, in accordance with the "YES" path out of decision block 2190, i.e., an excessive amount of current is flowing through only one of the upper current sensing resistors, the control circuit 2005 generates an amplifier SHUTDOWN command, as illustrated by block 2160, and the fault condition is identified as an amplifier short circuit, as illustrated by step 2165.

If, however, the magnitude of the current flowing through the upper current sensing resistor R2 does not exceed the predetermined threshold, in accordance with the "NO" path out of decision block 2190, the control circuit 2005 determines whether the magnitude of the current flowing through the lower current sensing resistor Ro is equal to zero, as illustrated by decision block 2195. If the magnitude of the current flowing through the lower current sensing resistor Ro is equal to zero, in accordance with the "YES" path out of decision block 2195, i.e., R1 and R2 are drawing a normal amount of current and the amount of current through Ro is zero only when T2 and T3 are active, the fault condition is identified as an amplifier open circuit, as illustrated by step 2180. If the magnitude of the current flowing through the lower current sensing resistor Ro does not equal zero, in accordance with the "NO" path out of decision block 2195, i.e., R1 and R2 are drawing a normal amount of current and Ro is not zero when either drive transistor pair is active, the control circuit 2005 will indicate that no single point fault condition is identified, as illustrated by step 2199.

As the fault isolation process described above pertains to but one phase of the dual-phase motor, PWM amplifier servo system, the aforementioned fault isolation process can be repeated for the second phase (i.e., to isolate faults between the second phase of the motor and the second amplifier). In fact, the aforementioned process can be repeated as many times as there are phases, in the case where three or more phase servo system is being employed. Table I summarizes the dual-phase, PWM amplifier fault isolation process, in accordance with a preferred embodiment of the present invention.

TABLE I

| +V | −V | FAULT CONDITIONS |
|---|---|---|
| SHUTDOWN | | AMPLIFIER SHORT |
| | SHUTDOWN | AMPLIFIER SHORT |
| SHUTDOWN | SHUTDOWN | MOTOR WINDING SHORT |
| NO CURRENT AT R0 | | AMPLIFIER OPEN CIRCUIT |
| | NO CURRENT AT R0 | AMPLIFIER OPEN CIRCUIT |
| NO CURRENT AT R0 | NO CURRENT AT R0 | MOTOR OPEN CIRCUIT |

Figure 22:
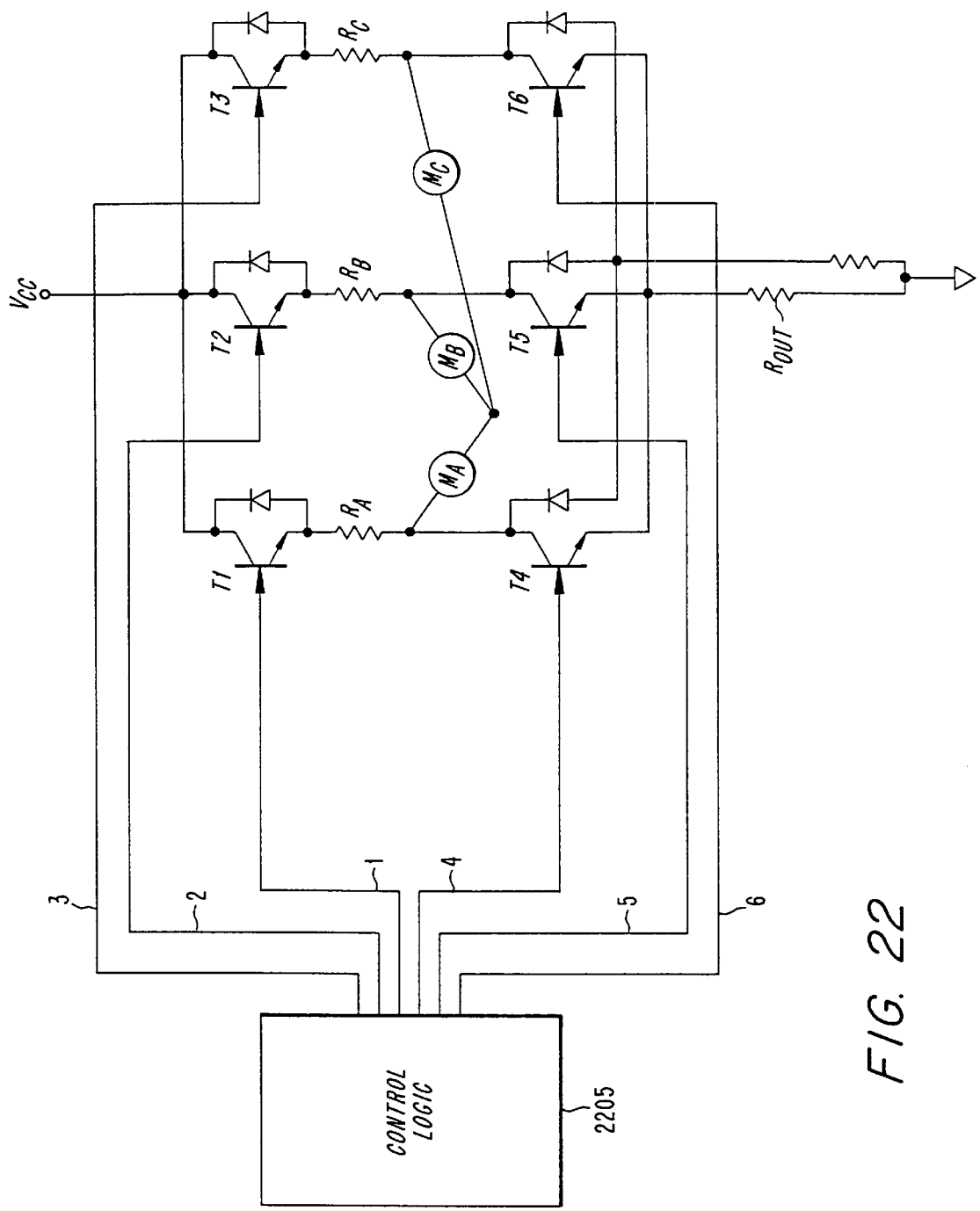
FIG. 22 is a diagram of a three-phase motor, PWM amplifier servo system.

FIG. 22 is a diagram of a three-phase motor, PWM amplifier servo system circuit 2200. The three-phase motor, PWM amplifier servo system circuit 2200 employs a PWM amplifier which has a phase driver A, comprising an upper drive transistor T1 and a lower drive transistor T4; a phase driver B, comprising an upper drive transistor T2 and a lower drive transistor T5; and a phase driver C, comprising an upper drive transistor T3 and a lower drive transistor T6. It is important to note that the drive transistors are IGBTs. Once again, however, one skilled in the art will recognize that other solid state switches such as MOSFETs and bipolar transistors could be employed. The three-phase motor, PWM amplifier servo system circuit 2200 also employs control logic 2205 which controls the activation of the following drive transistor pairs: T1 and T5, T1 and T6, T2 and T6, T2 and T4, T3 and T4, and T3 T5. As one skilled in the art will readily understand, the activation of the above-identified drive transistor pairs controls the current through each of the three windings $M_A$, $M_B$ and $M_c$ of three-phase motor M. By appropriately activating each of the above-identified drive transistor pairs, control logic 2205 can maintain a constant torque on the shaft of the three-phase motor M.

Control logic 2205 is controlled by software in a preferred embodiment of the present invention. Accordingly, control logic 2205 receives, from the software, a sequence of commutation codes, also referred to as Hall or phase encoder feedback codes by those of skill in the art. Each Hall code causes the control logic 2205 to activate the appropriate drive transistor control lines 1, . . . 6. For example, the Hall code responsible for activating the transistor pair comprising drive transistors T1 and T5 will force control logic 2205 to activate transistor control lines 1 and 5 regardless of the actual position of the motor's shaft.

Like the dual-phase motor, PWM amplifier servo fault isolation process described above, the three-phase motor, PWM amplifier servo fault isolation process, in accordance with the present invention, utilizes the existing servo system circuit 2200 hardware for fault isolation purposes. Accordingly, the three-phase motor, PWM amplifier servo system circuit 2200 also includes three upper current sensing resistors $R_A$, $R_B$ and $R_C$ and a lower current sensing resistor $R_{OUT}$. In general, fault isolation is accomplished by applying a known amount of source voltage $V_{CC}$ to the servo system circuit and then isolating single point fault conditions by analyzing the amount of current flowing through the upper current sensing resistors $R_A$, $R_B$, $R_C$ and/or the lower current sensing resistor $R_{OUT}$. The three-phase motor, PWM amplifier servo system fault isolation process can isolate the following single point fault conditions: motor winding open, motor winding shorted line-to-line, motor winding shorted line-to-ground, amplifier drive transistor open, amplifier drive transistor shorted; amplifier output bond wire open.

Figure 23A:
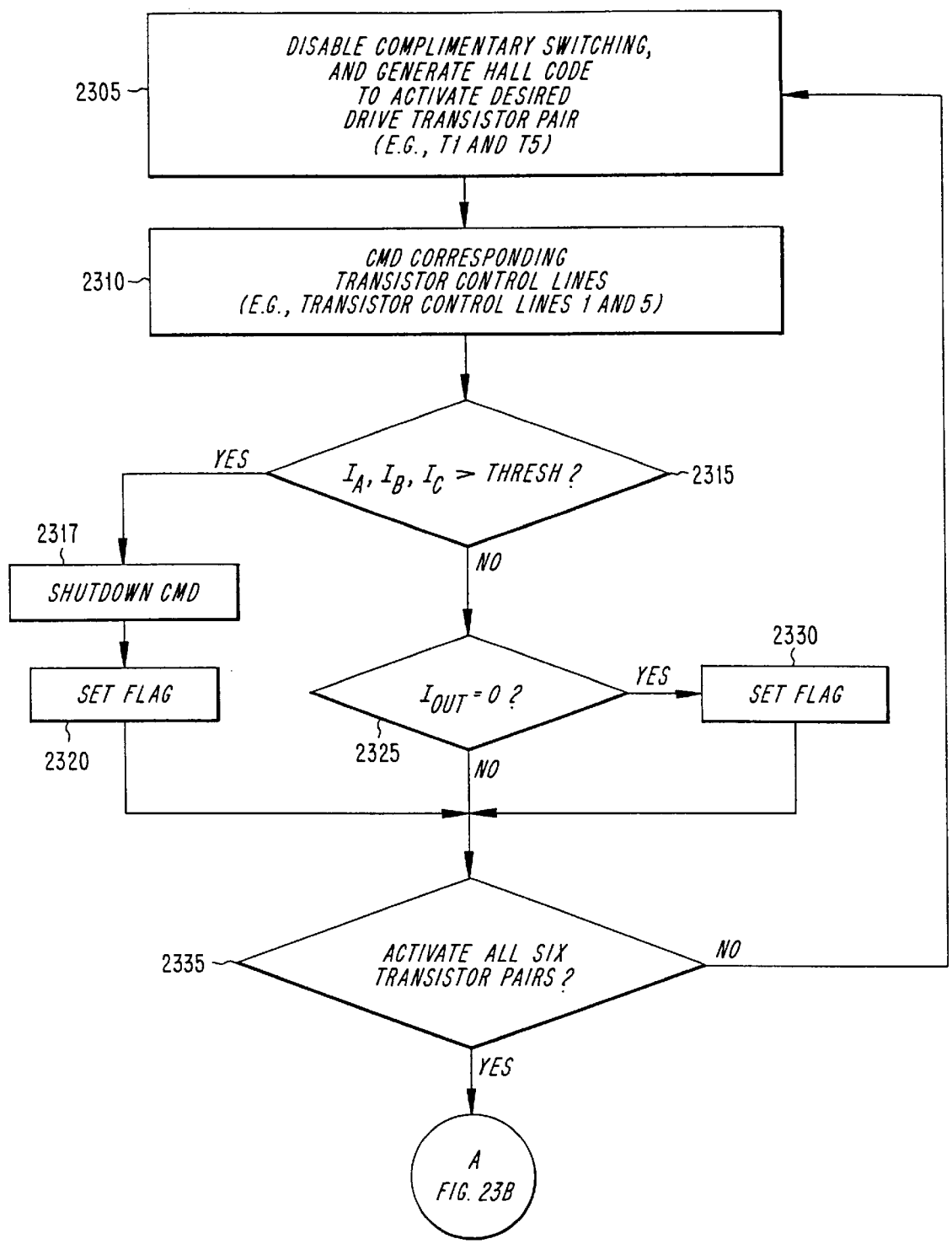

FIGS. 23A and 23B are flowcharts which illustrate the detailed steps of the three-phase motor, PWM amplifier fault isolation process, in accordance with a preferred embodiment of the present invention. In accordance with FIG. 23A, the control logic 2205 begins by overriding the Hall codes which are otherwise used to control the commutation of the current through the motor windings, and by generating a Hall code corresponding to a desired drive transistor pair (e.g., the upper drive transistor T1 and the lower drive transistor T5), as illustrated by block 2305. The Hall code will, in turn, cause the control logic 2205 to activate the appropriate transistor control lines corresponding to the desired drive transistor pair (e.g., transistor control lines 1 and 5), as illustrated by block 2310.

Next, control logic 2205 must determine whether the magnitude of the current flowing through the corresponding upper current sensing resistor (e.g., the current $I_A$, $I_B$ or $I_C$ through upper current sensing resistors $R_A$, $R_B$ or $R_C$ respectively) exceeds a predetermined threshold T, as illustrated in decision block 2315, wherein threshold T represents what would otherwise be an excessive amount of current. If the upper current sensing resistor is drawing an excessive amount of current, in accordance with the "YES" path out of decision block 2315, the control logic 2205 will generate a SHUTDOWN command, as illustrated by block 2317, and set the appropriate status flags as illustrated by block 2320, thus indicating that the activation of the present drive transistor pair (e.g., T1 and T5) resulted in a overcurrent condition.

If, however, the activation of the present drive transistor pair did not result in a SHUTDOWN, in accordance with the "NO" path out of decision block 2315, the control logic 2205 determines whether the activation of the drive transistor pair resulted in a NO CURRENT condition (i.e., zero current flowing through the output resistor $R_{OUT}$), as illustrated by decision block 2325. If the activation of the drive transistor pair results in a NO CURRENT condition, in accordance with the "YES" path out decision block 2325, the control logic 2205 will set the appropriate status flags, as illustrated by block 2330.

The next step is to determine whether all six of the aforementioned drive transistor pairs have been activated, as illustrated by decision block 2335. If all six drive transistor pairs have not been activated, in accordance with the "NO" path out of decision block 2335, the control logic 2205 will generate a different Hall code so as to activate the next desired drive transistor pair. Once all six drive transistor pairs have been activated, in accordance with the "YES" path out of decision block 2335, the status flags contain all of the information necessary to isolate the fault conditions as described below.

After all six drive transistor pairs have been activated, the status flags may indicate that an amplifier SHUTDOWN occurred when two of the drive transistor pairs were activated, and that the two affected drive transistor pairs included the same upper or the same lower drive transistor, as illustrated by decision block 2340. For example, the first transistor pair may have been the transistor pair comprising drive transistors T1 and T5, while the second transistor pair may have been the transistor pair comprising drive transistors T1 and T6, wherein both drive transistor pairs include upper drive transistor T1 from phase driver A. If the status flags indicate that this condition has occurred, in accordance with the "YES" path out of decision block 2340, the fault condition will be identified as an amplifier short circuit, as illustrated in block 2345. More specifically, the fault isolation process will identify the drive transistor causing the fault condition, for example, drive transistor T1 in the example above.

If, however, the status flags do not indicate that this condition has occurred, in accordance with the "NO" path out of decision block 2340, the status flags may instead indicate that SHUTDOWN occurred when two drive transistor pairs were activated, and that the same two phase drivers were involved in both instances, as illustrated by decision block 2350. For example, the status flags may indicate that SHUTDOWN occurred during the activation of the transistor pair comprising drive transistors T1 and T5 and that SHUTDOWN occurred during the activation of the transistor pair comprising drive transistors T2 and T4. In this example, only phase drivers A and B are affected. If the status flags indicate that this condition has occurred, in accordance with the "YES" path out of decision block 2350, the fault will be identified as a motor winding short circuit, as illustrated by block 2355. More particularly, the fault isolation process will identify the motor winding causing the fault condition, such as motor winding $M_A$–$M_B$ in the example above.

If the status flags do not indicate that the condition identified in decision block 2350 exists, as illustrated by the "NO" path out of decision block 2350, the status flags may indicate that SHUTDOWN occurred when four drive transistor pairs were activated, and wherein all four affected drive transistor pairs involve a common phase driver, as illustrated in decision block 2360. For example, the status flags may indicate that SHUTDOWN occurred during the activation of the transistor pairs comprising drive transistors T1 and T5, T1 and T6, T2 and T4, T3 and T4. In this example, upper drive transistor T1 or lower drive transistor T4, both involving phase driver A, are involved. If the status flags indicate that this condition has occurred, in accordance with the "YES" path out of decision block 2360, the fault condition will be identified as a motor winding-to-ground short circuit, as illustrated by block 2365. More specifically, the fault isolation process will identify the phase driver causing the fault condition, such as phase driver A in the example above.

If the status flags do not indicate that the condition identified in decision block 2360 exists, in accordance with the "NO" path out of decision block 2360, the status flags may indicate that a NO CURRENT condition occurred during the activation of two drive transistor pairs, and wherein the two affected drive transistor pairs involve the same upper or the same lower drive transistor, as illustrated by decision block 2370. For example, the status flags may indicate that a NO CURRENT condition occurred during the activation of the transistor pair comprising drive transistors T1 and T5 and during the activation of the transistor pair comprising drive transistors T1 and T6. In this example, both of the affected drive transistor pairs involve upper drive transistor T1. If the status flags indicate that this condition has occurred, in accordance with the "YES" path out of decision block 2370, the fault condition will be identified as an amplifier open circuit, as illustrated by block 2375. More specifically, the fault isolation process can identify the drive transistor causing the fault condition, such as drive transistor T1 in the example above.

If the status flags do not indicate that the condition identified in decision block 2370 exists, in accordance with the "NO" path out of decision block 2370, the status flags may indicate that a NO CURRENT condition occurred during the activation of four drive transistor pairs, and wherein all four drive transistor pairs involve a common phase driver. For example, the status flags may indicate that a NO CURRENT condition occurred during the activation of drive transistor pairs T1 and T5, T1 and T6, T2 and T4, T3 and T4. In this example, phase driver A is common to all four drive transistor pairs. If the status flags indicate that this condition has occurred, in accordance with the "YES" path out of decision block 2380, the fault condition will be identified as a motor winding open circuit, as illustrated by block 2385. More specifically, the fault isolation process can identify the motor winding that is causing the fault condition, such as motor winding $M_A$ in the example above.

If the status flags do not indicate that the condition identified in decision block 2380 exists, in accordance with the "NO" path out of decision block 2380, the fault isolation process will indicate that no single point fault condition has been isolated, as illustrated by block 2390.

Table II summarizes the three-phase motor, PWM amplifier fault isolation process, in accordance with a preferred embodiment of the present invention, wherein "SD" signifies a SHUTDOWN, and "NC" signifies a NO CURRENT condition. It is important to note that the three-phase motor, PWM amplifier servo system circuit 2200 is connected in a "WYE" configuration. However, one skilled in the art will readily understand that a similar fault isolation process can be implemented for a "DELTA" connected, three-phase motor, PWM amplifier servo control circuit, and same is considered to be within the spirit of the present invention.

TABLE II

| A→B | A→C | B→C | B→A | C→A | C→B | FAULT CONDITION |
|---|---|---|---|---|---|---|
|  |  |  | SD | SD |  | T4 (AMP A) SHORTED |
| SD | SD |  |  |  |  | T1 (AMP A) SHORTED |
| SD |  |  |  |  | SD | T5 (AMP B) SHORTED |
|  |  | SD | SD |  |  | T2 (AMP B) SHORTED |
|  | SD | SD |  |  |  | T6 (AMP C) SHORTED |
|  |  | SD |  | SD |  | T3 (AMP C) SHORTED |
| SD |  |  | SD |  |  | MOTOR WINDING $M_A$-$M_B$ SHORTED |
|  |  | SD |  |  | SD | MOTOR WINDING $M_B$-$M_C$ SHORTED |
|  | SD |  |  | SD |  | MOTOR WINDING $M_C$-$M_A$ SHORTED |
| SD | SD |  |  | SD | SD | MOTOR $M_A$-TO-GROUND SHORTED |
| SD |  | SD | SD |  | SD | MOTOR $M_B$-TO-GROUND SHORTED |
|  | SD | SD |  | SD | SD | MOTOR $M_C$-TO-GROUND SHORTED |
| NC | NC |  |  |  |  | T1 (AMP A) OPEN CIRCUIT |
|  |  | NC | NC |  |  | T2 (AMP B) OPEN CIRCUIT |
|  |  |  |  | NC | NC | T3 (AMP C) OPEN CIRCUIT |
|  |  |  | NC | NC |  | T4 (AMP A) OPEN CIRCUIT |
| NC |  |  |  |  | NC | T5 (AMP B) OPEN CIRCUIT |
|  | NC | NC |  |  |  | T6 (AMP C) OPEN CIRCUIT |
| NC | NC |  | NC | NC |  | WYE MOTOR WINDING $M_A$ OPEN |
| NC |  | NC | NC |  | NC | WYE MOTOR WINDING $M_B$ OPEN |
|  | NC | NC |  | NC | NC | WYE MOTOR WINDING $M_C$ OPEN |

Figure 24:
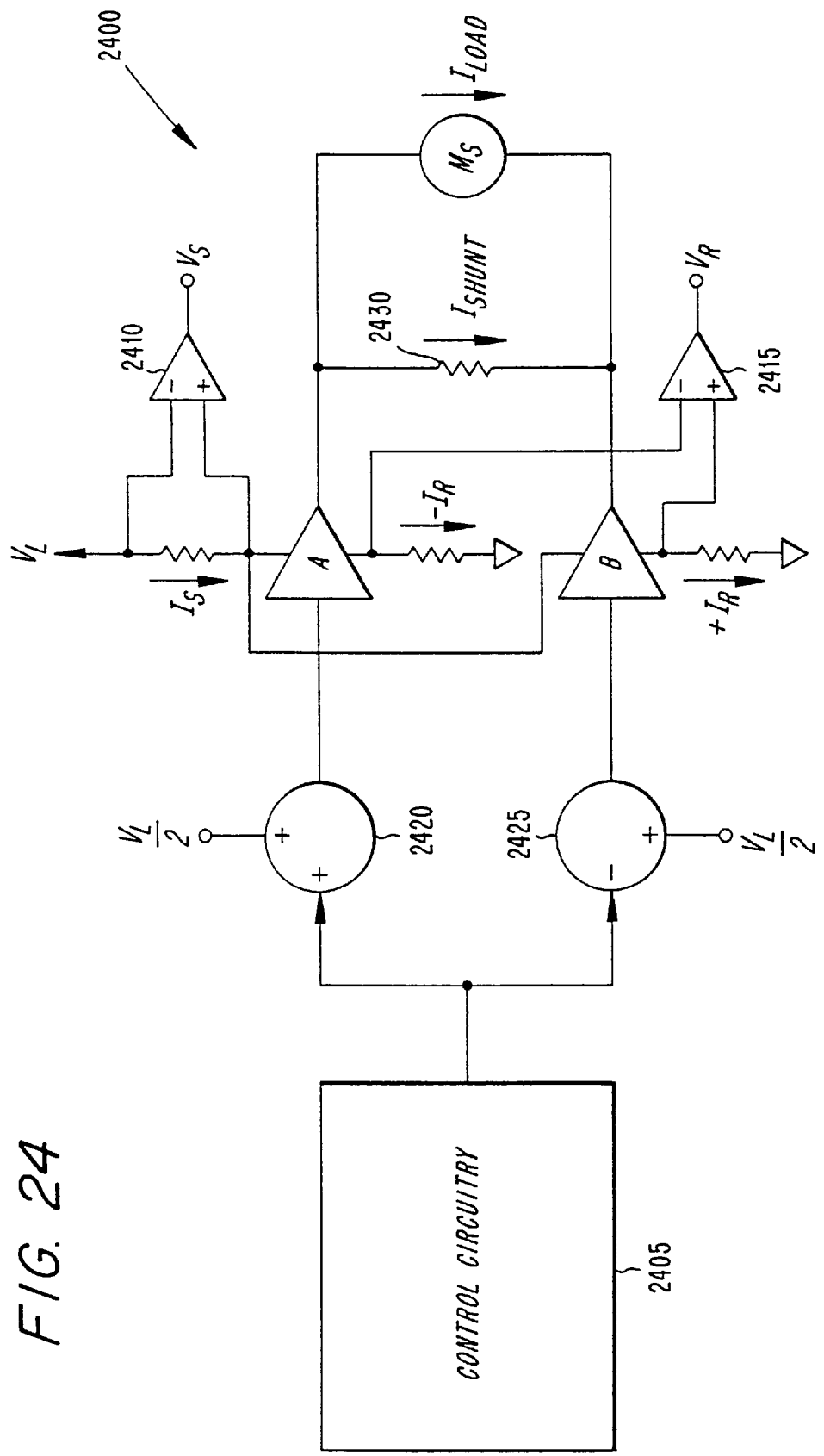
FIG. 24 is a diagram of a single-phase motor, linear amplifier servo system.

FIG. 24 is a diagram of a single-phase motor, linear amplifier servo system circuit 2400. Under ordinary operating conditions, the single-phase motor, linear amplifier servo system circuit 2400 controls the commutation of the current through the single-phase winding, which in turn controls the rotation of the shaft for the signal-phase motor $M_S$.

In a preferred embodiment of the present invention, the single-phase motor, linear amplifier servo system circuit 2400 employs a single supply, linear transconductance bridge amplifier configuration, including a monolithic, dual power operational amplifier. More specifically, the configuration includes a power supply $V_L$, wherein $V_L$ is equal to +28 volts in a preferred embodiment. The power supply $V_L$ causes a bidirectional load current $I_{LOAD}$ to flow through the winding of the single-phase motor $M_S$, wherein the load current $I_{LOAD}$ is linearly proportional to the amount of voltage applied at the input of operational amplifier A and operational amplifier B.

The signal-phase motor, linear amplifier servo system circuit 2400 works as follows. When the output voltage of amplifier A and the supply voltage are equal (e.g., equal to +28 volts) and the output voltage of amplifier B is equal to 0 volts, the load current $I_{LOAD}$ is at its maximum positive value. When the output voltage of amplifier B and the supply voltage are equal and the output voltage of amplifier A is equal to 0 volts, the load current $I_{LOAD}$ is at its maximum negative value. It logically follows, that the load current $I_{LOAD}$ is zero when the output voltage of amplifier A and amplifier B are equal (e.g., when the output of amplifier A and the output of amplifier B are both equal to $V_L/2$ volts). Moreover, the voltage across the single-phase motor $M_S$ can vary between 0 volts and +$V_L$ volts, and, consequently, the load current $I_{LOAD}$ will vary linearly with respect to this voltage. One skilled in the art will readily understand that the single-phase motor, linear amplifier servo system circuit 2400, therefore, can linearly vary the amount of torque applied to the shaft of the servo motor $M_S$ by varying the magnitude of the voltage command (i.e., the amount of voltage applied at the input of operational amplifier A and operational amplifier B).

Each of the linear amplifiers A and B, in FIG. 24, comprises an upper drive transistor (not shown) and a lower drive transistor (not shown), which are highly similar to the upper and lower drive transistors shown in FIG. 20. Accordingly, the upper drive transistor in linear amplifier A is primarily responsible for generating a positive load current $I_{LOAD}$ through single-phase motor $M_S$, while the lower drive transistor in linear amplifier B sinks the positive load current $I_{LOAD}$. Similarly, the upper drive transistor in linear amplifier B is primarily responsible for generating the negative load current $I_{LOAD}$ for the single-phase motor $M_S$, while the lower drive transistor in amplifier A sinks the negative load current $I_{LOAD}$.

Unlike the PWM amplifier servo assembly control circuits 2000 and 2200, the single-phase motor, linear amplifier servo system circuit 2400 includes an analog supply current sensing amplifier 2410 which generates a voltage $V_S$ that is proportional to the amount of supply current $I_s$ (i.e., the amount of current supplied to the operational amplifiers A and B); an analog return current sensing amplifier 2415 that generates a voltage $V_R$ that is proportional to the amount of return current $\pm I_R$ (i.e., $+I_R$ or $-I_R$); and a shunt resistor connected in parallel with the winding of the single-phase servo motor $M_S$, wherein the shunt resistor has a relatively large impedance value. These additional components make it possible to detect and isolate the following single point fault conditions: motor winding open circuit, motor winding shorted line-to-line, motor winding shorted line-to-ground, amplifier drive transistor open circuit, amplifier short circuit and amplifier output bond wire open circuit.

Figure 25:
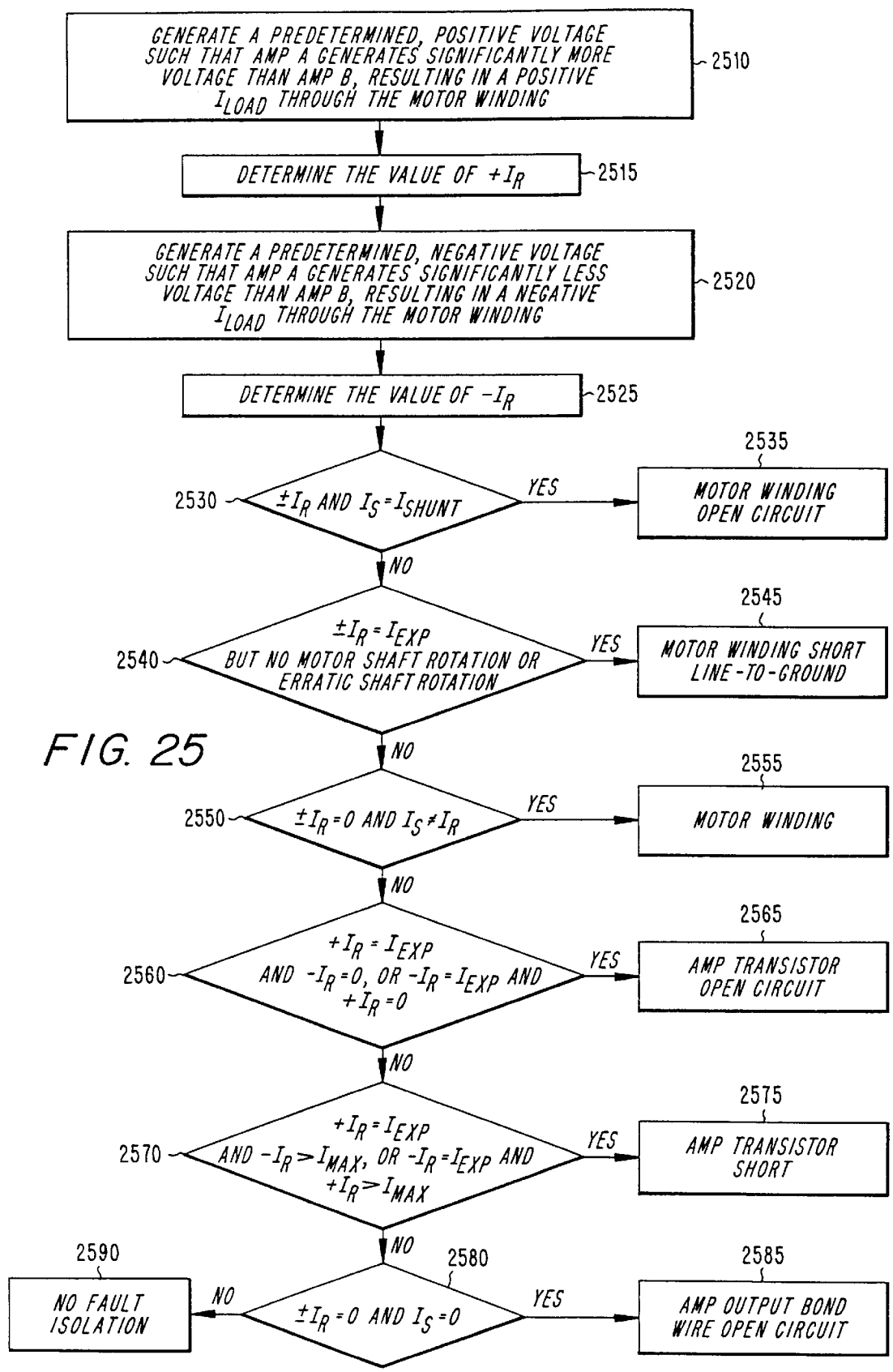
FIG. 25 is a flowchart depicting the single-phase motor, linear amplifier fault isolation process.

FIG. 25 is a flowchart which illustrates the detailed steps of the single-phase motor, linear amplifier servo fault isolation process. In accordance with FIG. 25, the control circuitry 2405 initiates the procedure by generating a predetermined amount of positive voltage, as illustrated by block 2510. This voltage is applied to adder 2420 and adder 2425. In a preferred embodiment, the amount of voltage generated is less than $V_L/2$ volts (i.e., the reference voltage level for adders 2420 and 2425), so that the input voltage for amplifier A is less than $+V_L$ volts and the input voltage for amplifier B is significantly less than $+V_L$ volts. Under ordinary operating conditions, this will produce a positive load current $I_{LOAD}$, as illustrated in FIG. 24, through the single-phase motor winding. Next, the return current $+I_R$ is measured, as illustrated by block 2515.

The control circuitry 2405 then generates a predetermined amount of negative voltage, as illustrated by block 2520. The negative voltage is similarly applied to adder 2420 and adder 2425. Amplifier B now receives an input voltage just under $+V_L$ volts and amplifier A receives an input voltage that is significantly less than $+V_L$ volts. Under ordinary operating conditions, this will produce a negative load current $I_{LOAD}$ through the single-phase motor winding. The return current $-I_R$ is now measured, as illustrated in block 2525.

The control circuitry 2405 then determines whether the magnitude of the return current $+I_R$ and the magnitude of the return current $-I_R$ are both less than a predetermined (i.e., expected) amount of return current $I_{EXP}$, as illustrated by decision block 2530, wherein the expected amount of return current $I_{EXP}$ is equal to the amount of return current one would expect when there are no fault conditions present. If the magnitude of $+I_R$ and $-I_R$ are both less than the magnitude of the expected amount of return current $I_{EXP}$, in accordance with the "YES" path out of decision block 2530, the fault condition will be identified as a motor winding open circuit, as illustrated by block 2535. The magnitude of return current $+I_R$ and the magnitude of return current $-I_R$ are less than $I_{EXP}$ because the motor winding open circuit condition will force the current that ordinarily flows through the motor winding to instead flow through the shunt resistor 2430 which has a large resistance (i.e., 1400 ohms in a preferred embodiment) compared with the resistive load of the motor $M_S$. Consequently, the shunt current $I_{SHUNT}$ causes a large voltage drop across the shunt resistor 2430. The large voltage drop across the shunt resistor 2430 reduces the voltage drop that would have otherwise occurred across the input of the analog current sensing amplifier 2415. This, in turn, reduces the magnitude of the return current $+I_R$ and similarly $-I_R$, such that the magnitude of the return current $+I_R$ and the magnitude of return current $-I_R$ are both less than the magnitude of the expected amount of return current $I_{EXP}$.

If, however, the magnitude of the return current $+I_R$ and the magnitude of the return current $-I_R$ are not less than the magnitude of the expected return current $I_{EXP}$, in accordance with the "NO" path out of decision block 2530, the control circuitry 2405 will determine whether the magnitude of the return current $+I_R$ and the magnitude of the return current $-I_R$ are both equal to $I_{EXP}$, while also determining whether there is no motor shaft motion or whether there is erratic motor shaft motion, as illustrated in decision block 2540. If these conditions are true, in accordance with the "YES" path out of decision block 2540, the fault condition will be identified as a motor winding line-to-line short circuit, as illustrated in block 2545.

If, however, the magnitude of the return current $+I_R$ and the magnitude of return current $-I_R$ are not equal to $I_{EXP}$, there is motor shaft rotation, and/or there is no erratic shaft rotation, in accordance with the "NO" path out of decision block 2540, the control circuitry 2405 will determine whether the magnitude of return current $+I_R$ and the magnitude of return current $-I_R$ are both equal to zero, while also determining whether the magnitude of the supply current $I_S$ is not equal to the amount of return current (i.e., whether $I_S$ is not zero), as illustrated by decision block 2550. If these conditions are true, in accordance with the "YES" path out of decision block 2550, the fault condition will be identified as a motor winding line-to-ground short circuit, as illustrated by block 2555.

If, however, the magnitude of the return current $+I_R$ and the magnitude of $-I_R$ are not equal to zero and/or the magnitude of the supply current $I_S$ is equal to zero, in accordance with the "NO" path out of decision block 2550, the control circuitry 2405 will determine whether the magnitude of return current $+I_R$ is equal to the magnitude of $I_{EXP}$ while the magnitude of the return current $-I_R$ is equal to zero, or whether the magnitude of the return current $-I_R$ is equal to the magnitude of $I_{EXP}$ while the magnitude of return current $+I_R$ is zero, as illustrated by block 2560. If either of these conditions is true, in accordance with the "YES" path out of decision block 2560, the fault condition will be identified as an amplifier drive transistor open circuit, as illustrated by block 2565.

If, however, the magnitude of the return current $+I_R$ is not equal to the magnitude of $I_{EXP}$ while the magnitude of $-I_R$ is equal to zero, or if the magnitude of the return current $-I_R$ is not equal to the magnitude of $I_{EXP}$ while the magnitude of $+I_R$ is equal to zero, the control circuitry 2405 will determine whether the magnitude of return current $+I_R$ is equal to the amount of expected return current $I_{EXP}$ while the magnitude of the return current $-I_R$ is greater than a predetermined, maximum amount of return current $I_{MAX}$, or whether the magnitude of the return current $-I_R$ is equal to $I_{EXP}$ while the magnitude of the return current $+I_R$ is greater than the predetermined maximum amount of return current $I_{MAX}$, as illustrated by block 2570. If either of these conditions is true, in accordance with the "YES" path out decision block 2570, the fault condition will be identified as an amplifier drive transistor short circuit, as illustrated by block 2575. In addition, the control circuitry 2405 will issue a protective amplifier SHUTDOWN command.

If, however, the magnitude of the return current $+I_R$ is not equal to $I_{EXP}$ and/or the magnitude of the return current $-I_R$ is greater than $I_{MAX}$, or if the magnitude of the return current $-I_R$ is not equal to $I_{EXP}$ and/or the magnitude of the return current $+I_R$ is greater than $I_{MAX}$, in accordance with the "NO" path out of decision block 2570, the control circuitry 2405 will determine whether the magnitude of return current $+I_R$ and the magnitude of return current $-I_R$ are both equal to zero, and whether the supply current $I_S$ is also zero, as illustrated by decision block 2580. If these conditions are true, in accordance with the "YES" path out of decision block 2580, the fault condition will be identified as an amplifier output bond wire open circuit, as illustrated by block 2585.

Finally, if the return current $+I_R$ and $-I_R$ are not zero and/or the supply current $I_S$ is not equal to zero, in accordance with the "NO" path out of decision block 2580, no single point fault conditions will be identified, as illustrated by block 2590. It is important to note, that a similar procedure which varies the order in which steps 2530 through 2585 are executed would be considered within the spirit of the present invention.

Table III summarizes the fault isolation function of the single-phase motor, linear amplifier servo fault isolation capabilities.

TABLE III

| $+I_R$ | $-I_R$ | $I_S$ | FAULT CONDITIONS: |
|---|---|---|---|
| < $I_{EXP}$ | < $I_{EXP}$ | — | MOTOR winding open |
| = $I_{EXP}$ | = $I_{EXP}$ | — | MOTOR winding shorted line-to-line |
| = 0 | = 0 | ≠ 0 | MOTOR winding shorted line-to-ground |
| = $I_{EXP}$ | = 0 | — | AMPLIFIER drive transistor open |
| = 0 | = $I_{EXP}$ | — | |
| = $I_{EXP}$ | > $I_{MAX}$ | — | AMPLIFIER drive transistor shorted |
| > $I_{MAX}$ | = $I_{EXP}$ | — | |
| = 0 | = 0 | = 0 | AMPLIFIER output bond wire open |

In a preferred embodiment of the present invention, the three above-identified servo system circuits, i.e., the dual-phase motor, PWM amplifier servo system circuit 2000, the three-phase motor, PWM amplifier servo system circuit 2200, and the single-phase motor, linear amplifier servo system circuit 2400, are described as transconductance devices. Transconductance devices are current controlled devices, wherein the load current (i.e., the current that flows through the motor windings) is used as a negative feedback signal to control the input voltage command. One skilled in the art will readily understand that the three servo system circuits could be implemented as voltage controlled devices rather than current controlled devices, however, to do so would not affect the corresponding fault isolation processes described above.

Signal Processing

Figure 26:
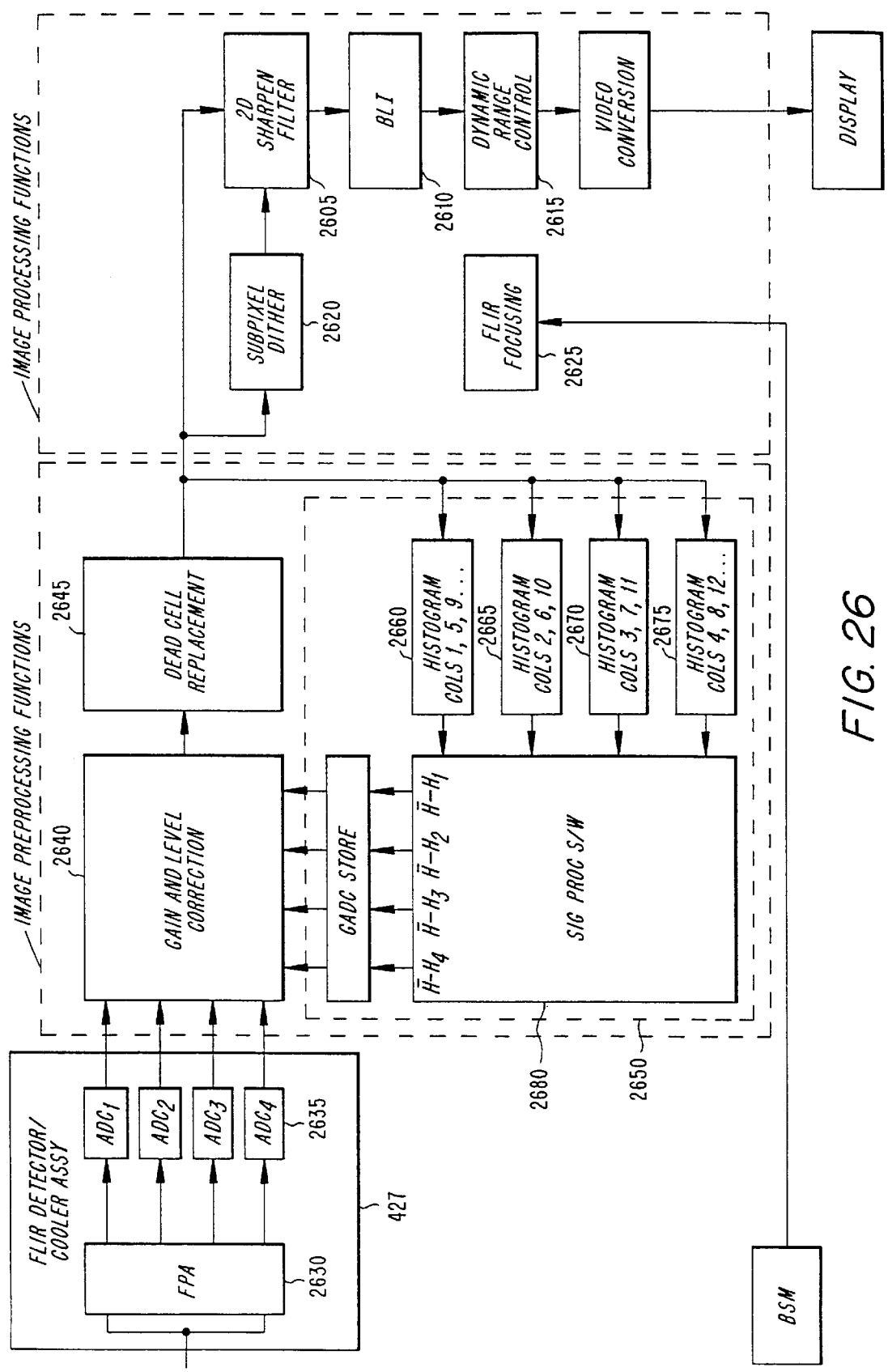
FIG. 26 is a block diagram illustrating the signal processing functions in accordance with a preferred embodiment of the present invention.

The present invention provides a number of signal processing techniques which are designed to enhance the quality of the FLIR image as well as the image display-to-eye interface. By enhancing the quality of the FLIR image and the appearance of that image, the present invention can more accurately image an AOI and intended targets within that AOI, and do so at safer stand-off ranges. As illustrated in FIG. 26, the signal processing techniques include a number of image processing functions such as a 2D contrast filter 2605; a bi-linear interpolation process (BLI) 2610; a dynamic range control filter 2615; a subpixel dithering process 2620; and a FLIR focusing technique 2625, which is used during the FLIR-to-laser boresight process described above. In addition, the signal processing techniques include a number of image preprocessing functions such as a notch filter function 2630; an analog-to-digital conversion function 2635; a pixel or detector element value gain and level correction function 2640; a dead cell replacement function 2645; and an analog-to-digital converter (ADC) offset pattern removal function 2650.

Beginning with the image preprocessing functions, the notch filter 2605 is an optical filter made of glass which has an anti-reflective coating. The notch filter 2605 is designed to remove noise signals from the IR signals before the IR signals come to focus on the FPA 2607. Specifically, the notch filter 2605 is designed to remove noise signals in the mid-wave range (i.e., 4.2 to 5.55 micrometers) which are caused by atmospheric radiation. This range of frequencies is often referred to as the atmospheric absorption band or the $CO_2$ absorption band by those of skill in the art. If not for the notch filter 2605, these atmospheric noise signals would corrupt the IR signals and degrade the IR image.

The notch filter 2605 is located in the FLIR detector/cooler assembly 427. Notch filters are generally well known in the art, and they are typically manufactured along with the FPA cold filter.

Once the IR image comes to focus on the FPA 2607, the analog value of each detector element (i.e., the optical image) is digitized; henceforth, each detector element value is referred to as a pixel or pixel value. The digitization of each detector element is accomplished by one of four analog-to-digital converters (ADCs) 2635; however, one skilled in the art will appreciate that fewer than four, or more than four ADCs could be employed. In a preferred embodiment of the present invention, each detector element is converted into a 12 bit pixel value.

For each frame of image data, the 12 bit pixel values are subject to a number of image preprocessing techniques. The first image preprocessing technique is the gain and offset correction process 2640. The purpose of the gain and offset correction process 2640 is to remove specific noise components from the optical image by calibrating each pixel. The noise components to be removed by calibrating each pixel are caused by variations in the gain and offset from one detector element to the next. These gain and offset variations are then passed to the corresponding pixel values during the digitization process described above. Calibration is accomplished by applying a hot reference and a cold reference to each detector element and by adjusting the gain coefficient and the offset coefficient for each pixel, if necessary, such that each pixel reflects the same value in response to the hot reference and in response to the cold reference. The process of calibrating each pixel value in response to a hot reference and a cold reference is generally well known in the art.

The next image preprocessing technique is the "dead" cell replacement process 2645. The purpose of this process is to maintain a list of "dead" cells (i.e., detector elements that do not properly respond), and to replace the pixel value corresponding to each "dead" cell with a best approximation value. The best approximation value is derived by averaging the values of the pixels which border the pixel corresponding to a "dead" cell. Only neighboring pixels that correspond to properly functioning detector elements are used for the purpose of deriving a best approximation value.

The signal processing subsystem determines which detector elements are "dead" by applying any number of well known criteria. For example, the thermal response of each detector element may be compared to an expected response. If the actual response is far greater or far less than expected, the corresponding detector element is probably not functioning properly. Another criterion that is often used to establish whether a detector element is not properly functioning is whether the digital response of the detector element is steady or whether it appears to flicker. A flickering or jittery response probably indicates that the corresponding detector element is not properly functioning. Yet another criterion is to compare the actual response of a given detector element to the mean value taken from the response of all of the detector elements. A response that is substantially different from the mean response probably indicates that the corresponding detector element is not functioning properly. Also, if the dynamic range of a given detector element is limited, this probably indicates that the detector element is not functioning properly. One skilled in the art will understand that this list of criteria is not exclusive, and that other criteria may similarly be used to identify "dead" detector elements. In general, the procedure for replacing "dead" cells is well known in the art.

The next signal preprocessing technique is the ADC offset pattern removal function 2650. The FPA 2607 has four output lines, as illustrated in FIG. 26. Each of these output lines is connected to a separate ADC 2635. As explained above, the ADCs convert the analog voltage levels associated with the detector elements into 12 bit pixel values. Moreover, each of the four ADCs is specifically responsible for converting the voltage levels for every fourth column of the FPA 3607. For example, the first ADC may convert the analog voltages associated with the detector elements in columns 1, 5, 9, ..., 477; the second ADC may convert the analog voltages associated with the detector elements in columns 2, 6, 10, ..., 478; the third ADC may convert the analog voltages associated with the detector elements in columns 3, 7, 11, ..., 479; and the fourth ADC may convert the analog voltages associated with the detector elements in columns 4, 8, 12, ..., 480. Furthermore, the ADCs are highly sensitive, and they tend to drift over time especially with respect to changes is ambient temperature. However, if any of the ADCs drift, they are likely to do so independent of the other three ADCs. If one ADC drifts relative to the other three, an undesired offset or bias may appear in every fourth column of the digital image. This offset or bias is referred to as an ADC offset pattern.

The purpose of the ADC offset pattern removal function 2650 is to eliminate this offset or bias from the digital image by adjusting the affected pixel values. In a preferred embodiment of the present invention, this process of adjusting the affected pixel values is accomplished as follows. For each frame of image data, four histograms 2660, 2665, 2670 and 2675 are generated. The content of each histogram is based upon the pixel values produced by a corresponding one of the four ADCs. Therefore, each histogram reflects 120 columns of pixel values, wherein each column contains 480 pixel values. For each frame of image data, signal processing software 2680 alternately computes an average pixel value $H_1$, $H_2$, $H_3$ or $H_4$ for one of the histograms, wherein only the pixel values between the 20th percentile pixel value and the 80th percentile pixel value are used to compute the average pixel value. For each frame of image data, the signal processing software also computes a total pixel value average $H_{BAR}$ based on all four individual histogram averages $H_1$, $H_2$, $H_3$ and $H_4$. The difference between $H_{BAR}$ and each of the individual histogram averages $H_{BAR}-H_1$, $H_{BAR}-H_2$, $H_{BAR}-H_3$ and $H_{BAR}-H_4$ is then added to or subtracted from, as the case may be, the existing, corresponding pixel offset coefficients.

As previously mentioned, a number of image processing functions are employed by the present invention to improve the quality and the display-to-eye interface of the digital image. The first of these image processing functions is the 2D sharpen filter 2605. The 2D sharpen filter 2605 is used for edge enhancement (i.e., for enhancing the high frequency image data). In general, edge enhancement is accomplished by performing a low pass filtering operation on the 12 bit per pixel input image, thereby generating a low pass image. By subtracting the low pass image from the input image, a high pass image is generated. Then, the relative gain of the low and high pass images are adjusted before integrating the two images to form an enhanced image.

Figure 27:
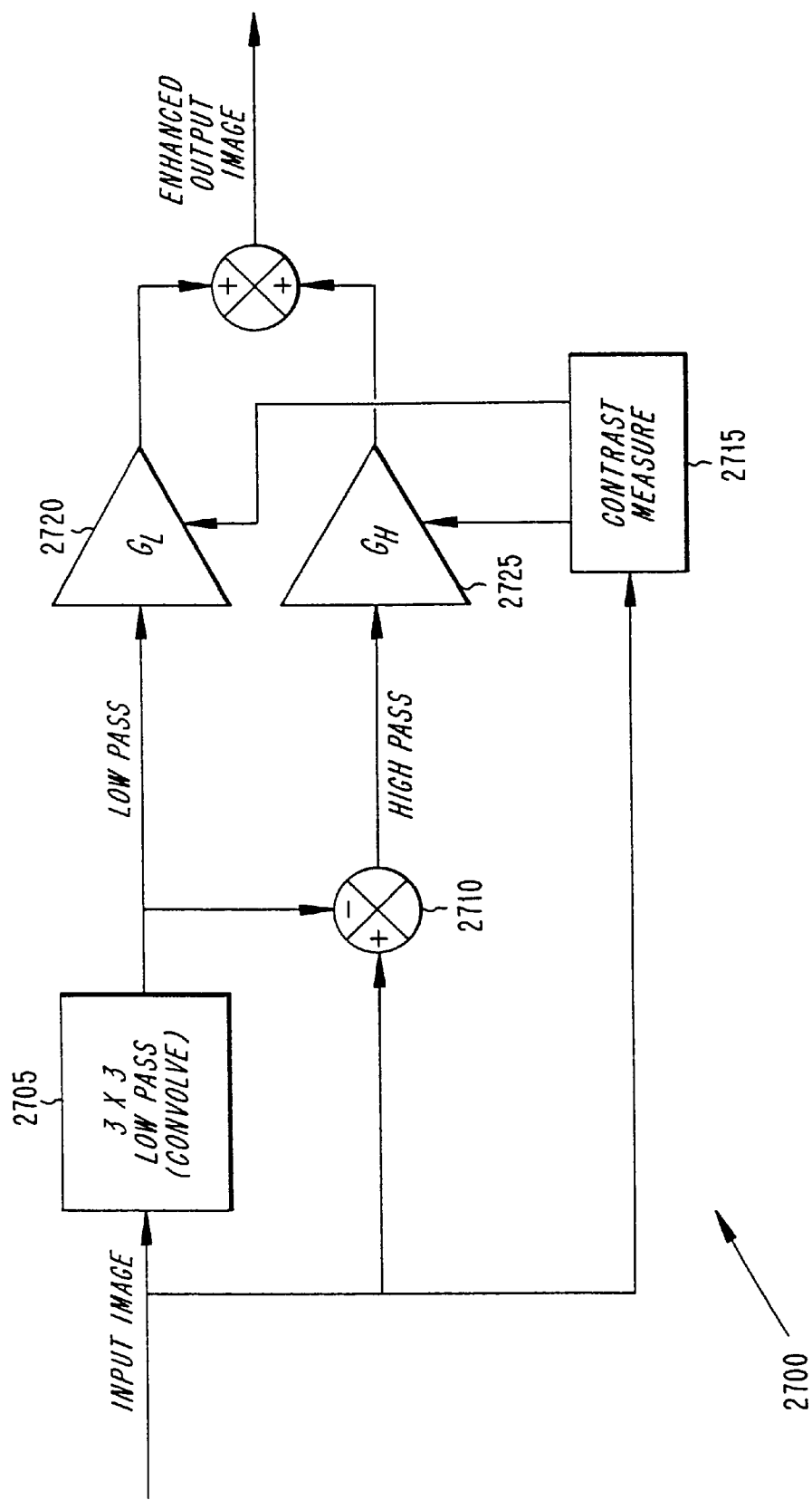
FIG. 27 shows the 2D sharpen filter.

FIG. 27 shows a preferred embodiment of the 2D sharpen filter 2700 which operates as follows. The 2D sharpen filter 2700 generates a low pass image by subjecting each of the pixels in the 480×480 pixel input image to a low pass filtering operation 2705. The low pass image contains the low frequency image data and, therefore, appears somewhat blurred. The low pass filtering operation is a 3×3 convolution process, wherein the value of each pixel in the input image is replaced with an average pixel value. For any given pixel in the input image, the average pixel value for that pixel is computed by summing the value of the pixel with the value of each neighboring pixel, and then dividing the sum by the number of pixels used to derive the sum. For all pixels not located on the outer edge of the input image, each summing operation should involve 9 pixels; the one pixel for which the averaging operation is being performed plus 8 neighboring pixels. This averaging operation is repeated for each and every pixel value in the input image.

The 2D sharpen filter 2700 also generates a high pass image by subtracting each pixel value in the low pass image from each pixel value in the input image. The subtraction operation is represented by adder 2710. The high pass image generated as a result of this subtraction operation contains the high frequency image data from the input image.

In addition, the 2D sharpen filter 2700 generates an image contrast measure 2715. The contrast measure 2715 is generated by first computing the difference between adjacent pixels values along each row of the input image. The contrast measure 2715 is then derived by summing all of the difference values. For example, an all white or an all black input image (i.e., an input image containing almost exclusively low frequency components) will yield a very low contrast measure. Note, there is always some noise content (typically high frequency noise). However, an input image that reflects a checkerboard pattern, wherein every other pixel is alternately black and white (i.e., an input image containing a large high frequency content) will result in a very large contrast measure.

The 2D sharpen filter 2700 then adjusts the gain level $G_L$ of the low pass image 2720 relative to the gain level $G_H$ of the high pass image 2725, or vice versa. Input images with a low contrast measure typically exhibit a relatively low signal-to-noise ratio (SNR). In order to enhance the image details buried in the high frequency noise, the ratio $G_L/G_H$ will be increased. This has the effect of raising the gain level of the signal and lowering the gain level of the noise. The adjusted gain levels $G_L$ and $G_H$ are then applied to each pixel in the low pass image and the high pass image respectively. Input images with a high contrast measure typically exhibit a higher SNR. To further enhance the image quality, the ratio $G_L/G_H$ is decreased. This has the effect of further enhancing the high frequency signals already present in the input image. Again, the adjusted gain levels $G_L$ and $G_H$ are then applied to each pixel in the low pass image and each pixel in the high pass image respectively. For input images that have a contrast measure somewhere between the very low and very high contrast measure extremes, the adjustment of the ratio $G_L/G_H$ is based upon a polynomial curve that establishes the relationship between contrast measure and gain level. In a preferred embodiment of the present invention, the polynomial curve used for adjusting the ratio $G_L/G_H$ is implemented through a look-up table. However, one skilled in the art will readily understand that the polynomial curve could easily be implemented through an equation.

The 2D sharpen filter then produces an enhanced image by adding each pixel in the now adjusted low pass image with a corresponding pixel in the now adjusted high pass image. The adding operation is represented by adder 2730.

A second image processing function employed by the present invention is bi-linear interpolation. Bi-linear interpolation is used for shifting the image horizontally and vertically. It is also used for rotating the image and for providing an electronic zoom. Bi-linear interpolation is generally well known in the art.

A third image processing function employed by the present invention is the dynamic range control function 2615. In prior art systems, such as LANTIRN, adaptive, non-linear mapping is used to enhance IR images. Non-linear mapping schemes use either a gaussian distribution centered at mid-scale, or a flat distribution. However, it has been shown that the most "eye-pleasing" intensity distribution emphasizes black over white, where the human eye is more sensitive to changes in grey levels. Therefore, the flat distribution and the Gaussian distribution, centered at mid-scale, do not generally produce the most "eye-pleasing" image.

Figure 28:
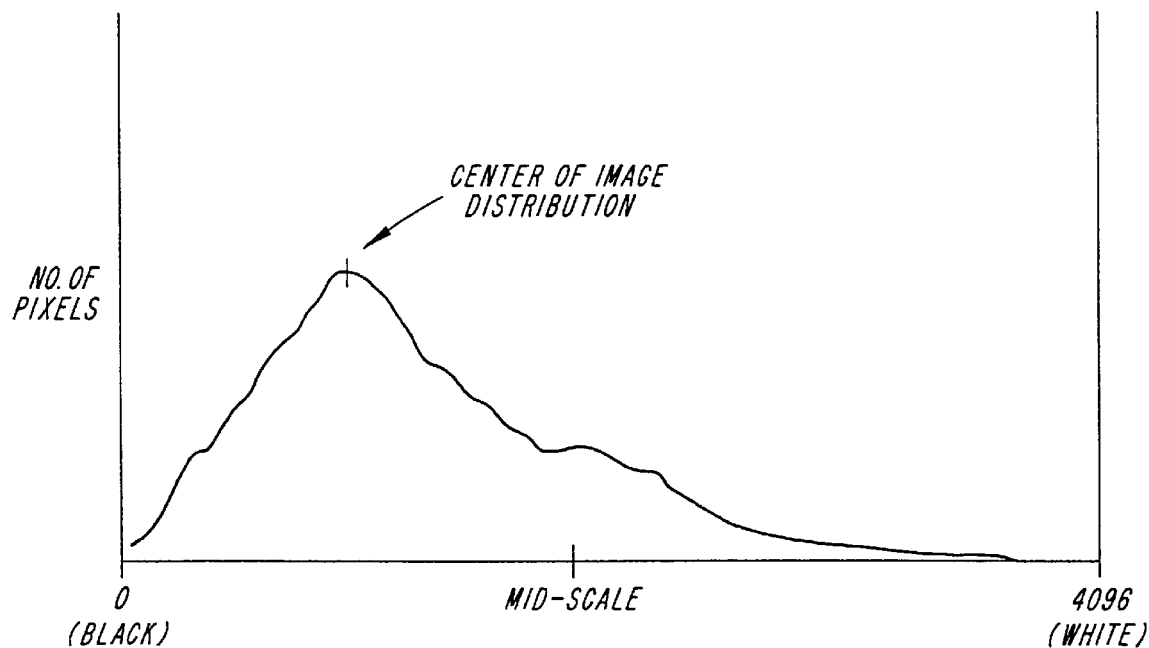
FIG. 28 illustrates the process of remapping the dynamic range of pixel image data to emphasize darker intensities over lighter intensities.

In contrast, the present invention manipulates the 12 bit per pixel image data, so that the center of the histogram distribution is not centered at mid-scale, as illustrated in FIG. 28. Instead, the present invention employs a Rayleigh distribution, the center of which is shifted towards one end of the dynamic range of the histogram so as to emphasize the darker intensities and de-emphasize the lighter intensities (i.e., so as to reduce saturation).

Figure 29:
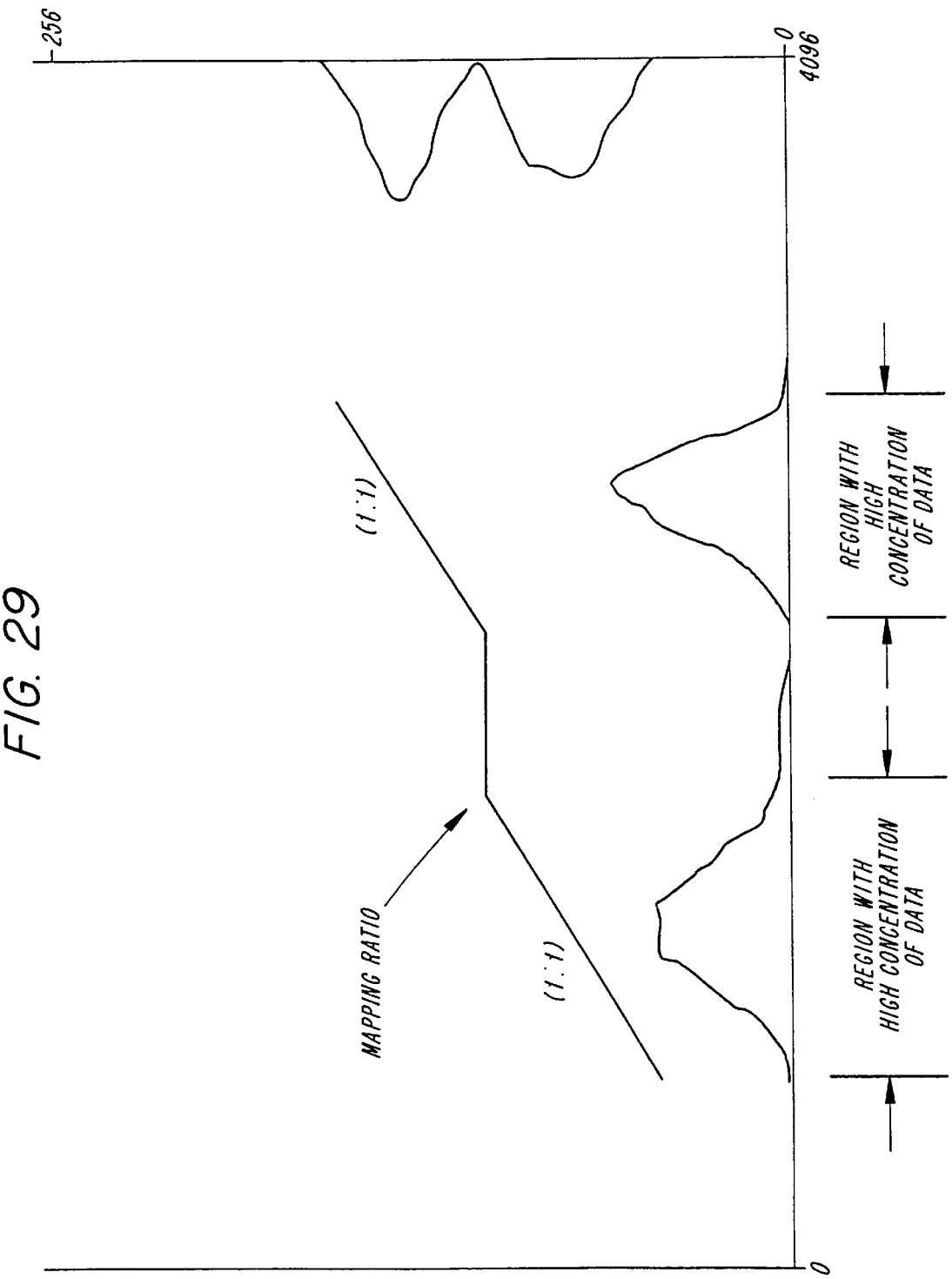
FIG. 29 illustrates a non-uniform, dynamic range remapping scheme.

The present invention then re-maps the 12 bit per pixel IR image (4096 quantized values) into an 8 bit per pixel (256 quantized values) image to accommodate a standard, 8 bit per pixel, RS-170 video display device. To avoid a substantial decrease in image resolution caused by the re-mapping process, the present invention re-maps the 12 bit image into an 8 bit image in a nonuniform manner, using look-up tables. As illustrated in FIG. 29, the present invention maintains a 1:1 mapping scheme, and a high level of image resolution, over certain regions of the 12 bit image distribution, especially in those portions of the dynamic range where there is a high concentration of image data. At the same time, the present invention reduces the image resolution level for other portions of the dynamic range where the image data is less concentrated. This has the effect of maximizing overall image resolution despite the limitations imposed by an 8 bit per pixel display device.

Yet a fourth image processing function is the subpixel dithering function 2620. In the present invention, the FPA 2630 is a 512×512 staring array. However, only a 480×480 portion of the staring array is used to generate the IR image because standard RS-170 display devices are capable of scanning only 480 lines of image data. In any event, the FPA 2630 has a windowing mode that permits an even smaller portion of the array to be read out. For example, a 240×240 image can be read out in about ¼ the amount of time required to read out the 480×480 image. The present invention, taking advantage of the FPA windowing capability and the FSM 415, provides a 2× enhanced image mode.

More specifically, in creating the RS-170 video, the present invention uses the FSM 415 to dither the LOS of the FPA by ½ the center-to-center detector spacing, both across and down, so as to achieve an enhanced 480×480 image based upon the 240×240 image.

Figure 30:
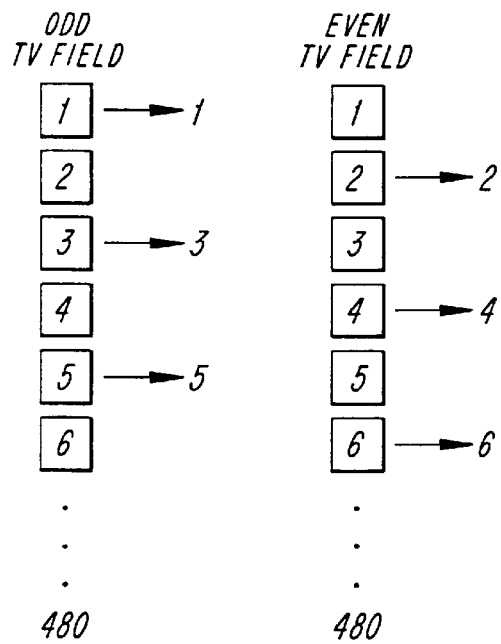
FIG. 30 illustrates a method for creating an even video field and an odd video field in accordance with the prior art.
Figure 31:
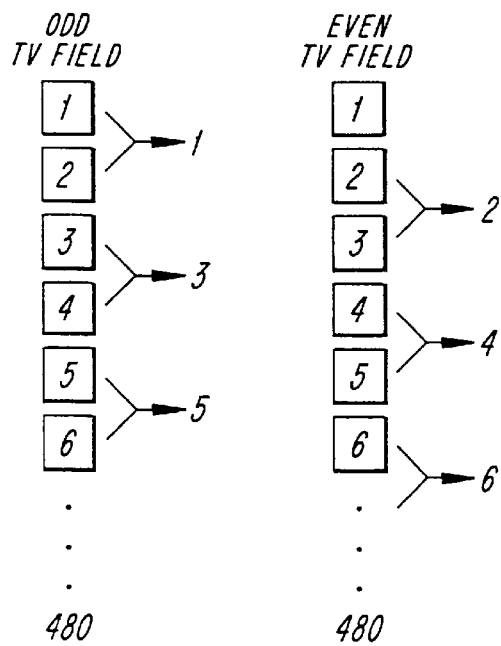
FIG. 31 illustrates a method for creating an even video field and an odd video field in accordance with the prior art.

Prior methods for interlacing image data to create RS-170 video data typically result in a loss of resolution. For example, one such technique, as illustrated in FIG. 30, discards the even numbered detector rows to create an "odd" video field, while the "odd" numbered detector rows are discarded in creating the "even" video field. This technique results in a loss of sensor sensitivity because half of the image data is discarded. Another prior technique involves averaging the rows, as illustrated in FIG. 31, to create the "even" and "odd" video fields. This technique results in a loss of vertical resolution.

Figure 32:
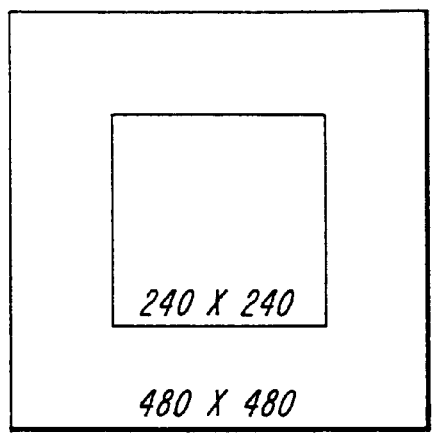
FIG. 32 shows a 240×240 pixel window within the larger digital image.
Figure 33:
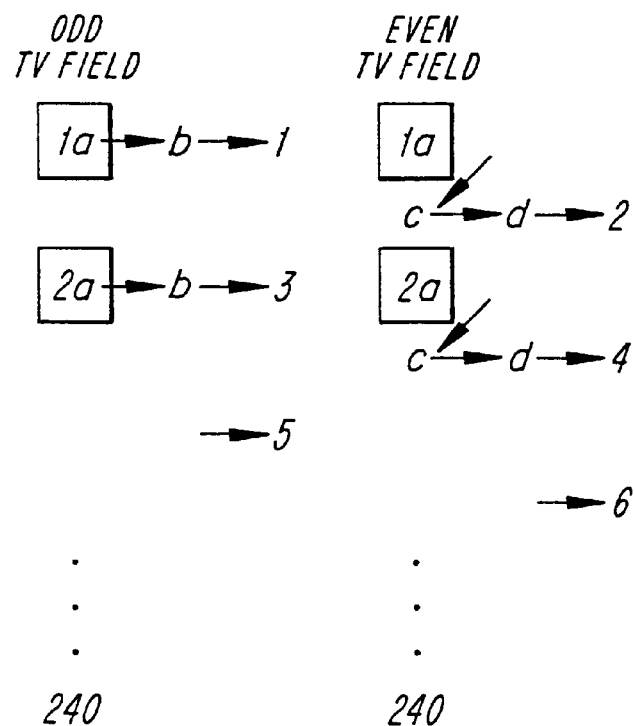
FIG. 33 illustrates a method for creating an even video field and an odd video field in accordance with a preferred embodiment of the present invention.

In the present invention, the FPA 2630 uses the 240×240 image, illustrated in FIG. 32, and integrates the image at a position 1a, 2a, . . . 240a, as illustrated in FIG. 33. A first step command is then added to the existing feedback control commands for the FSM 415. The step command causes the FSM 415 to dither the LOS of the FPA 2630 to the right by ½ the center-to-center detector spacing. This results in a new 240×240 image based on the pixel values at a position 1b, 2b, . . . . 240b, as illustrated in FIG. 33. This image is integrated and the pixel values at positions 1b, 2b, . . . 240b are interleaved with the pixel values at positions 1a, 2a, . . . 240a from the initial 240×240 image, thus yielding a first 240 (vertical)×480 (horizontal) image. This first 240×480 image represents the "odd" video field.

A second step command causes the FSM 415 to dither the LOS of the FPA 2630 to the left by ½ the center-to-center detector spacing and then down by ½ the center-to-center detector spacing, such that the LOS of the FPA is now at a position 1c, 2c, . . . 240c, as illustrated in FIG. 33. After integrating this image, yet another step command causes the FSM 415 to, once again, dither the LOS of the FPA 2630 to the right by ½ the center-to-center detector spacing, such that the LOS of the FPA 2630 is at a position 1d, 2d, . . . 240d, as illustrated in FIG. 33. This image is now integrated and the pixel values at positions 1d, 2d, . . . 240d are interleaved with the pixel values at positions 1c, 2c, . . . 240c, thus yielding a second 240 (vertical)×480 (horizontal) image. This second 240×480 image represents the "even" video field. The "odd" and "even" video fields are then interleaved, thus yielding an 480×480 enhanced image of the original 240×240 image. One skilled in the art will readily understand that the enhanced image is a 2× enhanced image of the original 240×240 window.

Other image processing functions, such as the FLIR focusing process, support such subsystems as the FLIR-to-laser boresight described above. Referring back to FIG. 11, the boresight reticle pattern 1100 contains a number of checkerboard patterns. The three 2085 microradian patterns are associated with the FLIR focusing process for the WFOV, while the four smaller, 700 microradian patterns are associated with the FLIR focusing process for the NFOV. During the WFOV and the NFOV focusing procedures identified in FIG. 12, the IR source 1015 in the BSM illuminates the FPA 2630 with the corresponding checkerboard patterns. It is important to note, that the width of the checks, as illuminated on the FPA 2630, must be smaller than the width of the detector elements (i.e., the checker-to-checker distance must be smaller than the pixel-to-pixel distance) so there is a random phase relationship between the checkerboard pattern and the pixels, as one skilled in the art will readily understand. A number of contrast measurements are taken based on the values of those pixels illuminated by the checkerboard patterns as the FLIR focusing lenses are adjusted. The position of the FLIR focusing lenses that yields the best results will correspond with the peak contrast measurement. The FLIR focusing process will now be described in greater detail hereinbelow.

Figure 34:
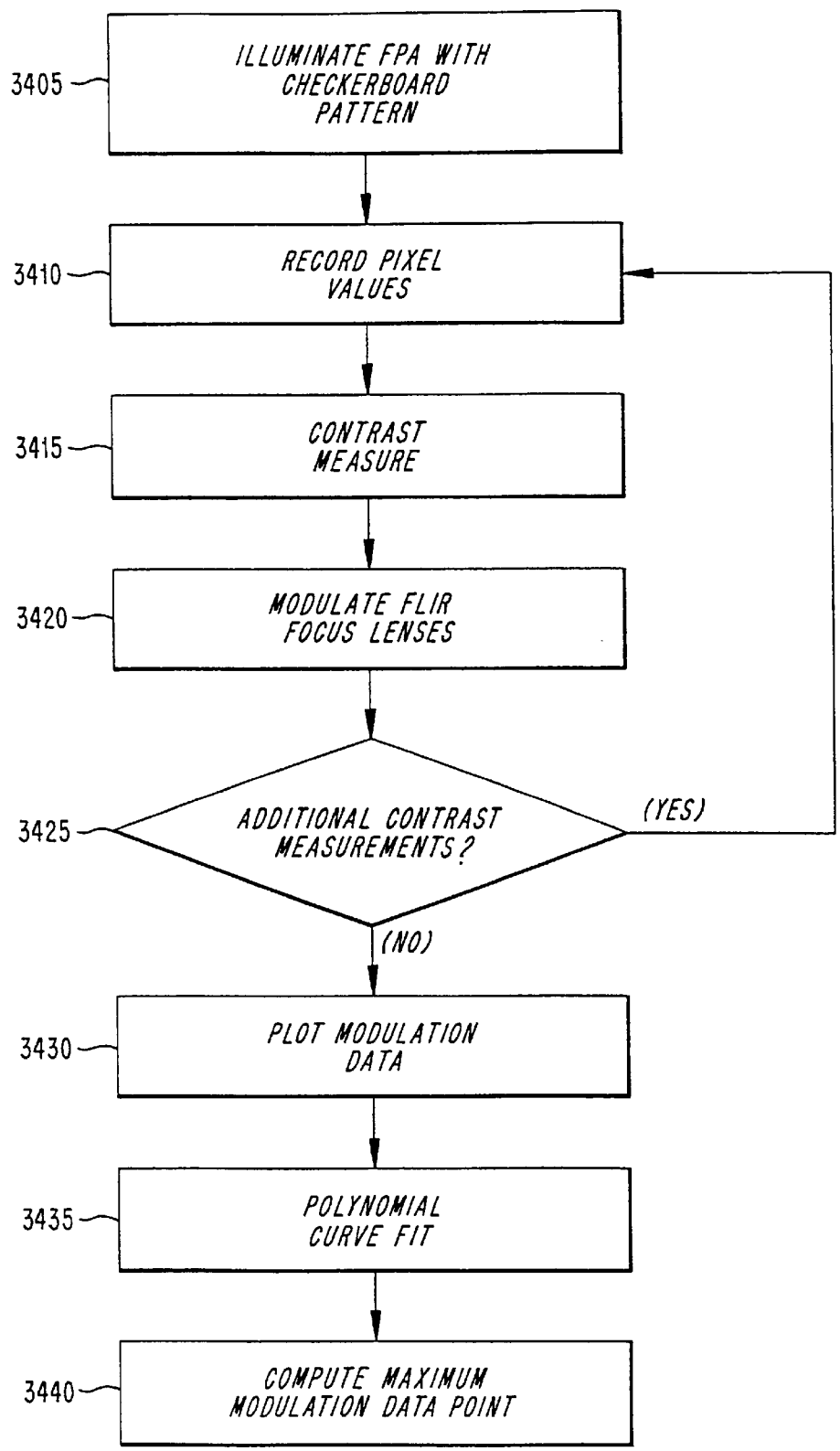
FIG. 34 is a flowchart showing a method of focusing a FLIR image.

FIG. 34 is a flowchart illustrating the detailed steps of the FLIR focusing process. As mentioned the FLIR focusing process (i.e., either the NFOV or the WFOV FLIR focusing process) begins when the IR source 1015 illuminates the FPA 2630 with the corresponding checkerboard patterns, as illustrated in block 3405. The pixel values for those pixels illuminated by the checkerboard patterns are then recorded, as illustrated by block 3410. A contrast measurement is then calculated, as illustrated by block 3415, using the aforementioned pixel values, by computing the difference between the maximum recorded pixel value and the minimum recorded pixel value. The FLIR focusing lenses are incrementally modulated (i.e., translated), as illustrated in block 3420. If additional contrast measurements are required, in accordance with the "YES" path out of decision block 3425, additional pixel values are recorded and additional contrast measurements are computed. If, however, additional contrast measurements are not required, in accordance with the "NO" path out of decision block 3425, the modulation data is plotted (i.e., the contrast measurement versus FLIR focusing lens position), as illustrated by block 3430, and the modulation data points are connected by a best fit polynomial curve, as illustrated by block 3435. The maximum modulation point is then determined (i.e., the peak of the polynomial curve), as illustrated in block 3440, wherein the maximum modulation point represents the FLIR lens position that corresponds to the best FLIR image focus.

This process not only provides a clearer, more visually precise image, it also facilitates a more accurate boresight process and, ultimately, a more accurate FLIR-to-laser LOS. Furthermore, if there is no random phase relationship between the checker patterns and the pixels, as discussed above, the recorded pixel values will reflect a fixed alias relative to the checkerboard pattern, and modulating the FLIR focusing lenses will not affect the contrast level of the recorded pixel values.

The present invention has been described with reference to a preferred embodiment. However, it will be readily apparent to those skilled in the art that it is possible to embody the invention in specific forms other than the that which has been described above, and that this may be done without departing from the spirit of the invention. The preferred embodiment described above is merely illustrative and should not be considered restrictive in any way. The scope of the invention is given by the appended claims, rather than the preceding description, and all variations and equivalents which fall within the range of the claims are intended to be embraced therein.

What is claimed is:

1. A targeting and imaging system comprising:
    a forward-looking infrared (FLIR) optical subsystem for receiving infrared (IR) energy from an area of interest (AOI), and for generating an IR image of the AOI; and
    a laser optical subsystem for generating laser energy for illuminating at least one object in the AOI and for receiving laser energy reflected by said at least one object;
    wherein the laser optical subsystem and the FLIR optical subsystem share a common pitch bearing.

2. A targeting and imaging system in accordance with claim 1, wherein said laser optical subsystem comprises:
    a laser transmitter; and
    a laser receiver which receives said laser energy reflected by said at least one object.

3. A targeting and imaging system in accordance with claim 2, wherein the laser transmitter is a ND:YAG laser transmitter.

4. A targeting and imaging system in accordance with claim 2, wherein the laser receiver comprises;
    a laser range receiver; and
    a laser spot tracker.

5. A targeting and imaging system in accordance with claim 2, wherein the laser transmitter transmits mid-wave IR signals.

6. A targeting and imaging system comprising:
    a forward-looking infrared (FLIR) optical system for receiving infrared (IR) energy from an area of interest (AOI);
    a FLIR optical imager for generating an IR image with the IR energy received from the AOI, wherein said FLIR optical imager is arranged to receive said IR energy from the FLIR optical system;
    a laser transmitter;
    a laser receiver; and
    laser optics for directing laser energy from said laser transmitter to a desired target located in the AOI, and for directing laser energy returning from the desired target in the AOI to said laser receiver,
    wherein said FLIR optical system and said laser optics share a common pitch bearing, such that all optical elements individually subject to pitch rotations are commonly shared by said FLIR optical system and said laser optics.

7. A targeting and imaging system in accordance with claim 6, wherein the optical elements shared by said FLIR optical system and said laser optics means include:
    deroll means for optically stabilizing the optical image about the roll axis in response to FLIR energy line-of-sight, pitch angle perturbations.

8. A targeting and imaging system in accordance with claim 7, wherein the optical elements commonly shared by said FLIR optical system and said laser optics further include:
    a pitch/yaw afocal; and
    a fast steering mirror (FSM).

9. A targeting and imaging system in accordance with claim 7, wherein said deroll means comprises:
    a deroll prism.

10. A targeting and imaging system in accordance with claim 6, wherein said FLIR optical system comprises:
    a pitch/yaw afocal comprising a plurality of lenses which serve as a common aperture for both the laser energy and the IR energy;
    a FLIR field of view (FOV) system which is switchable between a FLIR narrow field of view (NFOV) and a FLIR wide field of view (WFOV), wherein said FLIR FOV system is optically coupled to the pitch/yaw afocal;
    a deroll prism; and
    a fast steering mirror (FSM).

11. A targeting and imaging system in accordance with claim 10, wherein said FLIR FOV system comprises:
    optics which maintains a real entrance pupil and a real exit pupil in an intermediate focal plane.

12. A targeting and imaging system in accordance with claim 6, further comprises:

a FLIR focus assembly for focusing the IR image, said FLIR imager being optically coupled to said FLIR optical system and said FLIR optical imager; and a FLIR detector which generates an electronic representation of the IR image, said FLIR detector being optically coupled to said FLIR imager through a FLIR imager/detector interface.

13. A targeting and imaging system in accordance with claim 12, wherein said FLIR imager and said FLIR detector each contain a collimating lens for collimating the IR energy that passes through the FLIR imager/detector interface.

14. A targeting and imaging system in accordance with claim 12, wherein said FLIR detector comprises:

a staring focal plane array;

a cooling assembly; and an atmospheric absorption band, notch filter.

15. A targeting and imaging system in accordance with claim 6, wherein said laser optics comprise:

a pitch/yaw afocal;

laser focus optics which focuses the laser energy, said laser focus optics being optically coupled to the pitch/yaw afocal;

combined optics for directing the laser energy into said laser receiver, said combined optics being optically coupled to said laser focus optics;

a deroll prism;

a fast steering mirror (FSM); and a compensator which steers the laser energy and adjusts the polarization of the laser energy, said compensator being connected to said combined optics through said deroll prism and said FSM, and connected to said laser transmitter.

16. A targeting and imaging system in accordance with claim 15, wherein said laser receiver comprises:

a laser range receiver (LRR); and a laser spot tracker (LST).

17. A targeting and imaging system in accordance with claim 16, wherein said combined optics means comprises:

means for steering the laser energy inside said combined optics means; and an LST/LRR switch means for directing laser energy into one of the LRR and the LST.

18. A targeting and imaging system in accordance with claim 17, wherein said means for steering the laser energy inside said combined optics means comprises:

a pair of Risley prisms.

19. A targeting and imaging system in accordance with claim 17, wherein said LRR/LST switch means comprises:

an optical waveplate.

20. A targeting and imaging system in accordance with claim 15, wherein said compensator means comprises:

a pair of optical waveplates for adjusting the polarization of the laser energy to ensure that a sufficient amount of laser energy passes through the deroll prism; and a pair of Risley prisms for steering the laser energy.

21. A targeting and imaging system in accordance with claim 6, wherein said laser optics means comprises:

a pitch/yaw afocal;

laser focusing optics which focus the laser energy, said laser focusing optics being optically coupled to the pitch/yaw afocal;

means for reflecting the laser energy into said laser receiver means from said laser focus means;

a deroll prism optically coupled to said means for reflecting laser energy into said laser receiver means;

a fast steering mirror (FSM) optically coupled to said deroll prism; and a compensator which steers the laser energy and adjusts the polarization of the laser energy, said compensator being connected to said FSM and to said laser transmitter.

22. A targeting and imaging system in accordance with claim 21, wherein said laser receiver comprises:

a combined laser range receiver (LRR)/laser spot tracker (LST).

23. A targeting and imaging system in accordance with claim 22, wherein said LRR is a pin diode; wherein said LST is a quad-cell receiver; and wherein said LRR and said LST are combined into a single unit, such that said LRR is located at the center of said LST.

24. A targeting and imaging system in accordance with claim 21, wherein said compensator comprises:

a pair of optical waveplates which adjust the polarization of the laser energy to control an amount of laser energy passes through the deroll prism; and a pair of Risley prisms for steering the laser energy.

25. A targeting and imaging system comprising:

forward-looking infrared (FLIR) optics for steering an infrared (IR) line-of-sight (LOS) towards a desired area of interest (AOI), for receiving IR energy from the AOI, for focusing the IR energy, and for generating an optical image of the AOI;

a laser transmitter;

a laser range receiver (LRR);

a laser spot tracker (LST); and laser optics means for steering a laser LOS, such that the transmitter laser energy illuminates at least a portion of the AOI, for receiving laser energy, and for directing the received laser energy into the LRR and the LST, wherein said FLIR optics means and said laser optics means share a single pitch bearing, and wherein the IR energy and the laser energy pass through a common aperture.

26. A targeting and imaging system in accordance with claim 25, further comprising:

LOS correction means for adjusting the IR LOS and the laser LOS, and for minimizing dynamic LOS alignment errors between the IR LOS and the laser.

27. A targeting and imaging system in accordance with claim 25, wherein said LOS correction means comprises:

optical elements that are shared by said FLIR optics and said laser optics, wherein each of said shared optical elements is individually subject to pitch axis rotations.

28. A targeting and imaging system in accordance with claim 27, wherein the shared optical elements include:

a pitch/yaw afocal;

a deroll prism for optically stabilizing the IR image about the roll axis in response to FLIR LOS pitch angle perturbations; and a fast steering mirror (FSM) that reduces high frequency vibrations in the IR LOS and the laser LOS.

29. A targeting and imaging system in accordance with claim 26, wherein said LOS correction means comprises:

a plurality of gimbal assemblies;

a deroll prism that for optically stabilizing the IR image about the roll axis in response to FLIR LOS pitch angle perturbations;

a fast steering mirror that reduces high frequency vibrations in the IR LOS and the laser LOS; and vibration isolation means for attenuating high frequency vibrations and structural bending forces.

30. A targeting and imaging system in accordance with claim 29, wherein said vibration isolation means is a passive, optical isolation bed.

31. A targeting and imaging system in accordance with claim 25, further comprising fault isolation means for isolating an electrical fault in a servo system comprising a servo motor and an amplifier, said fault isolation means comprises:

first means for driving current in a first direction through a winding in the servo motor;

second means for driving current in a second direction through the winding in the servo motor; and means for isolating a fault between the amplifier and the servo motor as a function of an amount of current flowing into said first and said second means for driving current, and as a function of the current flowing out of said first and said second means for driving current.

32. A targeting and imaging system in accordance with claim 31, wherein said fault isolation means further comprises:

a first and a second means for each winding in the servo motor.

33. A targeting and imaging system in accordance with claim 32, wherein the servo motor is a dual-phase torque motor, and the amplifier is a pulse-width modulated amplifier.

34. A targeting and imaging system in accordance with claim 32, wherein the servo motor is a three-phase torque motor, and the amplifier is a pulse-width modulated amplifier.

35. A targeting and imaging system in accordance with claim 32, wherein the servo motor is a single phase torque motor, and the amplifier is a linear amplifier.

36. A targeting and imaging system in accordance with claim 31, wherein said means for isolating a fault between the amplifier and the servo motor as a function of the amount of current flowing into said first and second means, and as a function of the current flowing out of said first and second means comprises:

a first input resistor connected between a voltage source and said first means;

a second input resistor connected between the voltage source and said second means; and an output resistor connected between said first and second means and ground.

37. A targeting and imaging system in accordance with claim 36, wherein said fault isolation means further comprises:

a first and a second means for each winding in the servo motor.

38. A targeting and imaging system in accordance with claim 31, wherein:

said first means for driving current in a first direction through the winding in the servo motor comprises:

a first linear amplifier connected to a first end of the winding, a first return current sensing resistor connected between said first linear amplifier and ground, a second linear amplifier connected to a second end of the winding, a second return current sensing resistor connected between second linear amplifier and ground, a shunt resistor connected in parallel with the winding, a voltage source connected to the input of the first and the second linear amplifiers through a supply current sensing resistor, and control circuit means for biasing the first linear amplifier and the second linear amplifier such that the first linear amplifier produces a differential voltage output with respect to the second linear amplifier.

39. A targeting and imaging system in accordance with claim 31, wherein:

said second means for driving current in a second direction through the winding in the servo motor comprises:

the first linear amplifier connected to the first end of the winding, the first return current sensing resistor between said first linear amplifier and ground, the second linear amplifier connected to a second end of the winding, the second return current sensing resistor between said second linear amplifier and ground, the voltage source connected to the input of the first and the second linear amplifiers through the supply current sensing resistor, and control circuit means for biasing the first linear amplifier and the second linear amplifier such that the second linear amplifier produces a higher voltage output than the first linear amplifier.

40. A targeting and imaging system in accordance with claim 31, wherein:

said means for isolating a fault between the amplifier and the servo motor as a function of the amount of current flowing into said first and second means, and as a function of the current flowing out of said first and second means comprises:

supply current sensing means for determining a voltage proportional to the amount of current flowing through the supply current sensing resistor, and return current sensing means for determining a voltage proportional to the amount of current flowing through the first and the second return current resistors.

41. A targeting and imaging system in accordance with claim 38, wherein said supply current sensing means comprises:

a current sensing amplifier.

42. A targeting and imaging system in accordance with claim 38, wherein said return current sensing means comprises:

a current sensing amplifier.

43. A targeting and imaging system in accordance with claim 25, further comprising a boresight subsystem that includes:

means for projecting IR energy through a reticle pattern onto a focal plane array;

means for aligning the IR LOS with a plurality of IR openings in the reticle pattern;

means for receiving laser energy passing into the boresight subsystem through a laser opening in the reticle pattern, wherein the laser opening has lateral edges that project radially inward toward the centrally located opening;

means for translating the laser LOS toward the centrally located opening along a lateral edge;

means for translating the laser LOS in accordance with a number of grid positions; and means for aligning the laser LOS in accordance with the grid position that corresponds with a peak laser energy detection by said means for receiving laser energy.

44. A targeting and imaging system in accordance with claim 25, further comprising a signal processing subsystem that includes an analog-to-digital converter for converting the optical image into a digital image.

45. A targeting and imaging system in accordance with claim 44, wherein said signal processing subsystem includes a two-dimensional (2D) sharpen filter comprising:
   means for extracting a low frequency digital image from the digital image;
   means for extracting a high frequency digital image from the digital image;
   means for adjusting a relative gain between the low frequency digital image and the high frequency digital image to produce an adjusted low frequency digital image and an adjusted high frequency digital image; and
   means for combining the adjusted low frequency digital image and the adjusted high frequency digital image.

46. A targeting and imaging system in accordance with claim 45, wherein said 2D sharpen filter further comprises:
   means for measuring a contrast value for the digital image, wherein the relative gain is adjusted as a function of said contrast value.

47. A targeting and imaging system in accordance with claim 46, wherein said means for measuring a contrast value comprises:
   means for determining a difference between digital values corresponding to neighboring pixels in the digital image; and
   means for summing the difference values.

48. A targeting and imaging system in accordance with claim 45, wherein said means for extracting a low frequency digital image comprises:
   means for averaging each pixel value in the digital image with a plurality of pixel values for neighboring pixels.

49. A targeting and imaging system in accordance with claim 44, wherein said analog-to-digital conversion means comprises a number "n" of analog-to-digital converters (ADCs), and wherein said signal processing subsystem includes an ADC offset pattern removal means comprising:
   means for generating "n" histograms, wherein each of said n histograms reflects a dynamic range of pixel values produced by a corresponding one of said "n" ADCs;
   means for adjusting a pixel offset coefficient for each pixel associated with the corresponding one of said "n" ADCs as a function of the dynamic range of the corresponding histogram; and
   means for removing ADC offset pattern differences by adjusting the value of each pixel associated with the corresponding one of said "n" ADCs as a function of the corresponding, adjusted pixel offset coefficient.

50. A targeting and imaging system in accordance with claim 44, wherein said signal processing subsystem includes a subpixel dither means comprising:
   means for horizontally shifting a portion of the IR image by an amount equal to a fraction of a pixel size;
   means for generating a first video field by integrating the portion of the IR image with the horizontally shifted portion of the IR image;
   means for vertically shifting the desired portion of the IR image by the same fraction of a pixel size;
   means for horizontally shifting the vertically shifted portion of the IR image by the same fraction of a pixel size;
   means for generating a second video field by integrating the vertically shifted portion of the IR image with the vertically and horizontally shifted portion of the IR image; and
   means for electronically interleaving the first image field and the second image field.

51. A targeting and imaging system in accordance with claim 50, wherein said means for horizontally and vertically shifting the desired portion of the IR image comprises a fast steering mirror.

52. A targeting and imaging system in accordance with claim 44, wherein said signal processing subsystem includes means for focusing an IR image comprising:
   means for adjusting an optical focusing element a plurality of times;
   an array of IR detector elements;
   optics means for illuminating the array of IR detector elements with a high frequency test pattern after each adjustment of the optical focusing element, wherein a random phase relationship exists between said test pattern and said array of IR detector elements, and wherein said analog-to-digital converter converts an analog value associated with each of said detector elements to a corresponding digital word;
   means for generating a peak contrast measure based on the digital words after each adjustment of the optical focusing element; and
   control means for generating a control signal which controls said means for focusing the optical focusing element, said control means being responsive to said means for generating a peak contrast measure.

53. A targeting and imaging system in accordance with claim 52, wherein said means for illuminating illuminates said array of IR detector elements high frequency test pattern which is a checkerboard pattern comprising an array of alternatively dark and light squares.

54. A targeting and imaging system in accordance with claim 52, wherein said means for generating a peak contrast measure comprises:
   means for generating a best fit polynomial curve connecting the contrast measures.

55. A targeting and imaging system in accordance with claim 25, further comprising:
   a housing assembly; and
   a window associated with said housing assembly, through which IR energy and laser energy pass.

56. A targeting and imaging system in accordance with claim 55, wherein said window comprises a plurality of window panels angularly offset from one another.

57. A targeting and imaging system in accordance with claim 56, wherein each of said window panels comprises:
   an electromagnetic interference coating.

58. A targeting and imaging system in accordance with claim 56, wherein each of said window panels comprises:
   a rain erosion protection coating.

59. A targeting and imaging system in accordance with claim 56, wherein each of said window panels comprises:
   a durable antireflection (DAR) coating.

60. A targeting and imaging system in accordance with claim 56, wherein each of said window panels comprises:
   an interior anti-reflection coating.

61. A targeting and imaging system in accordance with claim 55, wherein said window comprises:
   is an electro-magnetic interference (EMI) grid.

62. A targeting and imaging system in accordance with claim 61, wherein said EMI grid comprises:

an array of circular grid elements, and wherein said circular elements are aligned in rows and columns such that on-axis electro-magnetic radiation is permitted to pass through the grid, and off-axis electro-magnetic radiation is radially diffracted.

63. A method of isolating an electrical fault in a servo system comprising a servo motor, said method comprising the steps of:
(a) generating a first current activation signal;
(b) activating a first current control means for conducting current in a first direction through a winding in the servo motor in response to the first current activation signal independent of servo motor shaft position;
(c) generating a second current activation signal;
(d) activating a second current control means for conducting current in a second direction through the winding in the servo motor in response to the second current activation signal independent of servo motor shaft position; and
(e) determining whether a fault exists as a function of an amount of current flowing into and out of the first and the second current control means.

64. A method in accordance with claim 63, wherein the servo motor is a dual-phase motor, and the first and the second current control means are pulse-width modulated amplifiers.

65. A method in accordance with claim 63, wherein the servo motor is a three-phase motor, and the first and the second current control means are pulse-width modulated amplifiers.

66. A method in accordance with claim 63, wherein the servo motor is a single-phase motor, and the first and second current control means are linear amplifiers.

67. A method in accordance with claim 63, wherein step (e) it is determined whether one of a motor winding short circuit, a motor winding short-to-ground, a motor winding open circuit, an amplifier short circuit, or an amplifier open circuit exists.

68. A method of isolating an electrical fault in a servo system comprising a servo motor and an amplifier, said method comprises the steps of:
(a) generating a first current command;
(b) activating a current control means for conducting current in a first direction through a motor winding in response to the first current command independent of servo motor shaft position;
(c) determining whether an amount of current flowing into the first current control means is greater than a predefined threshold;
(d) determining whether the amount of current flowing out of the first current control means is zero;
(e) generating a second current command;
(f) activating a second current control means for conducting current in a second direction through the motor winding in response to the second current command independent of servo motor shaft position;
(g) determining whether an amount of current flowing into the second current control means is greater than the predefined threshold;
(h) determining whether the amount of current flowing out of the second current control means is zero;
(i) determining whether an electrical fault has occurred in the amplifier or whether an electrical fault has occurred in the motor winding as a function of the amount of current flowing into and out of the first and the second current control means.

69. A method in accordance with claim 68, wherein said step of determining whether an electrical fault has occurred comprises:
determining the fault to be a motor winding short circuit fault if:
the amount of current flowing into said means for conducting first current is greater than the predefined threshold, and
the amount of current flowing into said means for conducting second current is greater than the predefined threshold.

70. A method in accordance with claim 68, wherein said step of determining whether an electrical fault has occurred comprises:
determining the fault to be a motor winding short-to-ground fault if:
the amount of current flowing into said means for conducting first current is greater than the predefined threshold, and
the amount of current flowing into said means for conducting second current is zero.

71. A method in accordance with claim 68, wherein said step of determining whether an electrical fault has occurred comprises:
determining the fault to be an amplifier short circuit fault if:
the amount of current flowing into said means for conducting first current is greater than the predefined threshold, or
the amount of current flowing into said means for conducting second current is greater than the predefined threshold,
but not if both are greater than the predefined threshold.

72. A method in accordance with claim 68, wherein said steps of determining whether an electrical fault has occurred comprises:
determining the fault to be a motor winding open circuit fault if:
the amount of current flowing into said means for conducting first current is not greater than the predefined threshold, and
the amount of current flowing into said means for conducting second current is not greater than the predefined threshold, and
the amount of current flowing out of said means for conducting first current and said means for conducting second current is zero.

73. A method in accordance with claim 68, wherein said step of determining whether an electrical fault has occurred comprises:
determining the fault to be an amplifier open circuit fault if:
the amount of current flowing into said means for conducting first current is not greater than the predefined threshold, and
the amount of current flowing into said means for conducting second current is not greater than the predefined threshold, and
the amount of current flowing out of said means for conducting first current or said means for conducting second current is not zero, but not both.

74. A method in accordance with claim 68, wherein said step of determining whether an electrical fault has occurred comprises:
identifying a no fault condition if:
the amount of current flowing into said means for conducting a first current is not greater than the predefined threshold, and the amount of current flowing into said means for conducting a second current is not greater than the predefined threshold, and the amount of current flowing out of said means for conducting a first current and the amount of current flowing out of said means for conducting a second current are both not zero.

75. A method of isolating an electrical fault in a servo system comprising a servo motor and an amplifier, said method comprising the steps of:
(a) generating an activation signal for a pair of drive transistors which controls current flow in a first direction through a winding in the multi-phase motor, said pair of drive transistors comprising an upper drive transistor and a lower drive transistor;
(b) determining whether an amount of current flowing through the upper drive transistor is greater than a predefined threshold;
(c) determining whether an amount of current flowing through the lower drive transistor is zero;
(d) generating an activation signal for a second pair of drive transistors which controls current flow in a second direction through the winding in the multi-phase motor, said second pair of drive transistors comprising a second upper drive transistor and a second lower drive transistor;
(e) determining whether an amount of current flowing through the second upper drive transistor is greater than a predefined threshold;
(f) determining whether an amount of current flowing through the second lower drive transistor is zero; and
(h) determining the electrical fault condition as a function of the amount of current flowing through the upper drive transistor and lower drive transistor for each drive transistor pair.

76. A method of isolating an electrical fault in accordance with claim 75, wherein step (h) it is determined whether one of an amplifier short circuit, a motor winding short circuit, a motor winding-to-ground short circuit, an amplifier open circuit, or a motor winding open circuit exists.

77. A method of determining a fault to be an electrical fault in a servo system comprising a servo motor and a linear amplifier, said method comprising the steps of:
(a) determining an amount of source current applied to a first linear amplifier and a second linear amplifier, wherein said first and said second linear amplifiers are connected to opposing ends of a single motor winding;
(b) generating a first voltage command such that the first linear amplifier generates more voltage than the second linear amplifier;
(c) determining an amount of current flowing out of the second linear amplifier;
(d) generating a second voltage command such that the second linear amplifier generates more voltage than the first amplifier;
(e) determining an amount of current flowing out of the first linear amplifier; and
(f) isolating the electrical fault as a function of said amount of current flowing out of the first linear amplifier, the amount of current flowing out the second linear amplifier, and the amount of source current.

78. A method of isolating an electrical fault in accordance with claim 77, wherein step (f) it is determined whether one of a motor winding open circuit, a motor winding line-to-line short circuit, a motor winding line-to-ground short circuit, a linear amplifier transistor open circuit, a linear amplifier transistor short circuit, or a linear amplifier output bond wire open circuit exists.

79. A method of isolating an electrical fault in accordance with claim 77, wherein the step of isolating the electrical fault comprises the step of:
determining the fault to be a motor winding open circuit fault if:
the amount of current flowing out of the first linear amplifier is equal to a shunt current,
the amount of current flowing out of the second linear amplifier is equal to the shunt current, and
the amount of source current is equal to the shunt current.

80. A method of isolating a fault to be an electrical fault in accordance with claim 77, wherein the step of isolating the electrical fault comprises the step of:
determining the fault to be a motor winding line-to-line short circuit fault if:
the amount of current flowing out of the first linear amplifier is equal to an expected amount of current, and
the amount of current flowing out of the second linear amplifier is equal to the expected amount of current and there is erratic motion or no motion of the motor shaft.

81. A method of isolating an electrical fault in accordance with claim 77, wherein the step of isolating the electrical fault comprises the step of:
determining the fault to be a motor winding line-to-ground short circuit fault if:
the amount of current flowing out of the first linear amplifier is equal to zero, and
the amount of current flowing out of the second linear amplifier is equal to zero, and
the amount of source current is not equal to zero.

82. A method of isolating an electrical fault in accordance with claim 77, wherein the step of isolating the electrical fault comprises the step of:
determining the fault to be a linear amplifier transistor open circuit fault if:
the amount of current flowing out of the first linear amplifier equals an expected amount of current and the amount of current flowing out of the second linear amplifier equals zero, or
the amount of current flowing out of the first linear amplifier equals zero and the amount of current flowing out of the second linear amplifier equals the expected amount of current.

83. A method of isolating an electrical fault in accordance with claim 77, wherein the step of isolating the electrical fault comprises the step of:
determining the fault to be a linear amplifier short circuit fault if:
the amount of current flowing out of the first linear amplifier equals an expected amount of current and the amount of current flowing out of the second linear amplifier is greater than a maximum allowable amount of current, or
the amount of current flowing out of the first linear amplifier is greater than the maximum allowable amount of current and the amount of current flowing out of the second linear amplifier equals the expected amount of current.

84. A method of isolating an electrical fault in accordance with claim 77, wherein the step of isolating the electrical fault comprises the step of:

determining the fault to be an amplifier output bond wire open circuit fault if:
the amount of current flowing out of the first linear amplifier is equal to zero, and
the amount of current flowing out of the second linear amplifier is equal to zero, and
the amount of source current is equal to zero.

85. An apparatus for isolating an electrical fault in a servo system comprising a servo motor, said apparatus comprising:
first control means for generating a first current activation signal;
means for driving current in a first direction through a winding in the servo motor, responsive to said first current activation signal;
second control means for generating a second current activation signal;
means for driving current in a second direction through the winding in the servo motor, responsive to said means for generating a second current activation signal;
means for determining whether a fault exists as a function of an amount of current flowing into and out of said means for driving the first current and said means for driving the second current.

86. An apparatus in accordance with claim 85, wherein the servo motor is a dual-phase motor, and said means for driving the first current and said means for driving the second current are pulse-width modulated amplifiers.

87. An apparatus in accordance with claim 85, wherein the servo motor is a three-phase motor, and said means for driving the first current and said means for driving the second current are pulse-width modulated amplifiers.

88. An apparatus in accordance with claim 85, wherein the servo motor is a single-phase motor, and said means for driving the first current and said means for driving the second current are linear amplifiers.

89. An apparatus in accordance with claim 85, wherein said fault comprises a motor winding short circuit, a motor winding open circuit, an amplifier short circuit, or an amplifier open circuit.

90. An apparatus for isolating an electrical fault in a servo system comprising a servo motor and an amplifier, said apparatus comprising:
means for generating a first current command;
means for conducting current in a first direction through a motor winding, wherein said means for conducting a first current is responsive to the first current command;
means for determining whether an amount of current flowing into said means for conducting the first current is greater than a predefined threshold;
means for determining whether the amount of current flowing out of said means for conducting the first current is zero;
means for generating a second current command;
means for conducting current in a second direction through the motor winding, wherein said means for conducting the second current is responsive to the second current command;
means for determining whether an amount of current flowing into said means for conducting the second current is greater than the predefined threshold;
means for determining whether the amount of current flowing out of said means for conducting the second current is zero;
means for determining whether an electrical fault has occurred in the amplifier or whether an electrical fault has occurred in the motor winding as a function of the amount of current flowing into and out of said means for conducting the first current and said means for conducting the second current.

91. An apparatus for isolating an electrical fault in accordance with claim 90, wherein said means for determining whether an electrical fault has occurred comprises:
logic means for determining the fault to be a motor winding short circuit fault if:
the amount of current flowing into said means for conducting the first current is greater than the predefined threshold, and
the amount of current flowing into said means for conducting the second current is greater than the predefined threshold.

92. An apparatus for isolating an electrical fault in accordance with claim 90, wherein said means for determining whether an electrical fault has occurred comprises:
logic means for determining the fault to be an amplifier short circuit fault if:
the amount of current flowing into said means for conducting the first current is greater than the predefined threshold, or
the amount of current flowing into said means for conducting the second current is greater than the predefined threshold,
but not if both are greater than the predefined threshold.

93. An apparatus for isolating an electrical fault in accordance with claim 90, wherein said means for determining whether an electrical fault has occurred comprises:
logic means for determining the fault to be a motor winding open circuit fault if:
the amount of current flowing into said means for conducting the first current is not greater than the predefined threshold, and
the amount of current flowing into said means for conducting the second current is not greater than the predefined threshold, and
the amount of current flowing out of said means for conducting the first current and said means for conducting the second current is zero.

94. An apparatus for isolating an electrical fault in accordance with claim 90, wherein said means for determining whether an electrical fault has occurred comprises:
logic means for determining the fault to be an amplifier open circuit fault if:
the amount of current flowing into said means for conducting the first current is not greater than the predefined threshold, and
the amount of current flowing into said means for conducting the second current is not greater than the predefined threshold, and
the amount of current flowing out of said means for conducting the first current or said means for conducting the second current is not zero, but not both.

95. An apparatus for isolating an electrical fault in accordance with claim 90, wherein said means for determining whether an electrical fault has occurred comprises:
logic means for determining that a no fault condition exists if:
the amount of current flowing into said means for conducting the first current is not greater than the predefined threshold, and
the amount of current flowing into said means for conducting the second current is not greater than the predefined threshold, and the amount of current flowing out of said means for conducting the first current and the amount of current flowing out of said means for conducting the second current are both not zero.

96. An apparatus for isolating an electrical fault in a servo system comprising a servo motor and an amplifier, said apparatus comprising:

control logic means for generating an activation signal for a pair of drive transistors which control current flow in a positive direction through a motor winding, said pair of drive transistors comprising an upper drive transistor and a lower drive transistor;

means for determining whether an amount of current flowing into the upper drive transistor is greater than a predefined threshold;

means for determining whether an amount of current flowing into the lower drive transistor is zero;

control logic means for generating an activation signal for a second pair of drive transistors which control current flow in a negative direction through the motor winding, said second pair of drive transistors comprising a second upper drive transistor and a second lower drive transistor;

means for determining whether an amount of current flowing into the second upper drive transistor is greater than a predefined threshold;

means for determining whether an amount of current flowing into the second lower drive transistor is zero; and means for determining the electrical fault condition as a function of the amount of current flowing into the upper drive transistor and lower drive transistor for each drive transistor pair.

97. An apparatus for isolating an electrical fault in accordance with claim 96, wherein said electrical fault comprises an amplifier short circuit, a motor winding short circuit, a motor winding-to-ground short circuit, an amplifier open circuit, or a motor winding open circuit.

98. An apparatus for isolating an electrical fault in a servo system comprising a servo motor and a linear amplifier, said apparatus comprising:

supply current sensing means for determining an amount of supply current applied to a first linear amplifier and a second linear amplifier, wherein said first and said second linear amplifiers are connected to opposing ends of a motor winding;

control means for generating a first voltage command such that the first linear amplifier generates more voltage than the second linear amplifier;

current sensing means for determining an amount of current flowing out of the second linear amplifier;

control means for generating a second voltage command such that the second linear amplifier generates more voltage than the first amplifier;

current sensing means for determining an amount of current flowing out of the first linear amplifier; and logic means for determining the electrical fault, without a test load and a test load relay, as a function of the amount of current flowing out of the first linear amplifier, the amount of current flowing out the second linear amplifier, and the amount of source current.

99. An apparatus for isolating an electrical fault in accordance with claim 98, wherein the electrical fault comprises a motor winding open circuit, a motor winding line-to-line short circuit, a motor winding line-to-ground short circuit, a linear amplifier transistor open circuit, a linear amplifier transistor short circuit, or a linear amplifier output bond wire open circuit.

100. An apparatus for isolating an electrical fault in accordance with claim 98, wherein said logic means for isolating the electrical fault comprises:

logic means for determining the fault to be a motor winding open circuit fault if:
the amount of current flowing out of the first linear amplifier is equal to a shunt current,
the amount of current flowing out of the second linear amplifier is equal to the shunt current, and
the amount of source current is equal to the shunt current.

101. An apparatus for isolating an electrical fault in accordance with claim 98, wherein said logic means for isolating the electrical fault comprises:

logic means for determining the fault to be a motor winding line-to-line short circuit fault if:
the amount of current flowing out of the first linear amplifier is equal to an expected amount of current, and
the amount of current flowing out of the second linear amplifier is equal to the expected amount of current and there is erratic motion or no motion of the motor shaft.

102. An apparatus for isolating an electrical fault in accordance with claim 98, wherein said logic means for isolating the electrical fault comprises:

logic means for determining the fault to be a motor winding line-to-ground short circuit fault if:
the amount of current flowing out of the first linear amplifier is equal to zero, and
the amount of current flowing out of the second linear amplifier is equal to zero, and
the amount of source current is not equal to zero.

103. An apparatus for isolating an electrical fault in accordance with claim 98, wherein said logic means for isolating the electrical fault comprises:

logic means for determining the fault to be a linear amplifier transistor open circuit fault if:
the amount of current flowing out of the first linear amplifier equals an expected amount of current and the amount of current flowing out of the second linear amplifier equals zero, or
the amount of current flowing out of the first linear amplifier equals zero and the amount of current flowing out of the second linear amplifier equals the expected amount of current.

104. An apparatus for isolating an electrical fault in accordance with claim 98, wherein said logic means for isolating the electrical fault comprises:

logic means for determining the fault to be a linear amplifier short circuit fault if:
the amount of current flowing out of the first linear amplifier equals an expected amount of current and the amount of current flowing out of the second linear amplifier is greater than a maximum allowable amount of current, or
the amount of current flowing out of the first linear amplifier is greater than the maximum allowable amount of current and the amount of current flowing out of the second linear amplifier equals the expected amount of current.

105. An apparatus for isolating an electrical fault in accordance with claim 98, wherein said logic means for isolating the electrical fault comprises:

logic means for determining the fault to be an amplifier output bond wire open circuit fault if:
the amount of current flowing out of the first linear amplifier is equal to zero, and
the amount of current flowing out of the second linear amplifier is equal to zero, and
the amount of source current is equal to zero.

106. A method comprising the steps of:
converting an array of analog image data values into a digital image comprising an array of pixel values,
sharpening the contrast of the digital image data with a two-dimensional (2D) sharpening filter.

107. A method in accordance with claim 106, wherein said step of sharpening the contrast of the digital image data comprises the steps of:
extracting a low frequency digital image from the digital image;
extracting a high frequency digital image from the digital image;
adjusting a low frequency digital image gain to high frequency digital image gain ratio; and
combining the low frequency digital image and the high frequency digital image.

108. A method in accordance with claim 107, wherein said step of sharpening the contrast of the digital image further comprises the step of:
measuring a contrast value for the digital image, wherein said low frequency digital image gain to high frequency digital image gain ratio is adjusted as a function of said contrast value.

109. A method in accordance with claim 108, wherein said step of measuring a contrast value comprises the steps of:
generating a difference value for adjacent pixel values; and
summing the difference values.

110. A method in accordance with claim 107, wherein said step of extracting a low frequency digital image comprises the step of:
averaging each pixel value in the digital image with each neighboring pixel value.

111. A method of sharpening the contrast of an input digital image comprising an array of pixel values, said method comprising the steps of:
extracting a low frequency digital image from the input digital image, said low frequency digital image comprising an array of pixel values;
extracting a high frequency digital image from the input digital image, said high frequency digital image comprising an array of pixel values;
determining a difference value between adjacent pixels along each row of the input digital image;
determining a contrast measure for the input digital image by summing the difference values;
adjusting a low frequency digital image gain to high frequency digital image gain ratio as a function of said contrast measure; and
combining each pixel value in the low frequency digital image with a corresponding pixel value in the high frequency digital image.

112. A method in accordance with claim 111, wherein said step of extracting a low frequency digital image comprises the step of:
replacing each pixel value in the input digital image with a low pass value based on each pixel value and a plurality of neighboring pixel value.

113. A method in accordance with claim 111, wherein said step of extracting a high frequency digital image comprises the step of:
generating a difference value between each pixel value in the input digital image and a corresponding pixel value in the low frequency digital image.

114. A method in accordance with claim 111, wherein said step of combining the low frequency digital image with the high frequency digital image comprises the step of:
summing each pixel value in the low frequency digital image with a corresponding pixel value in the high frequency digital image.

115. In an imaging system comprising a number "n" of analog-to-digital converters (ADCs), wherein each of the "n" ADCs converts every nth row or nth column of analog image data into digital image data, a method of removing ADC offset pattern differences from a digital image comprising the steps of:
generating "n" histograms, wherein each of the "n" histograms reflects a dynamic range of pixel values produced by a corresponding one of said "n" ADCs;
adjusting a pixel offset coefficient for each pixel associated with one of said "n" ADCs as a function of the dynamic range of the corresponding histogram; and
removing ADC offset pattern differences by adjusting each pixel value associated with said one of said "n" ADCs as a function of the corresponding, adjusted pixel offset coefficient.

116. A method in accordance with claim 115, wherein said step of adjusting a pixel offset coefficient comprises the steps of:
determining an average pixel value ($H_n$) for the corresponding histogram;
determining an average pixel value (H) based on the pixel values in each of the "n" number of histograms; and
adjusting a pixel offset coefficient as a function of the difference between the average pixel value ($H_n$) for the corresponding histogram and the average pixel value (H) based on the pixel values in each of the "n" histograms.

117. A method of enhancing a portion of a digital image comprising an array of pixel values, said method comprising the steps of:
extracting a desired portion of the digital image;
horizontally shifting the desired portion of the digital image by an amount equal to a fraction of a pixel width;
integrating the desired portion of the digital image with the horizontally shifted portion of the digital image to produce a first image field;
vertically shifting the desired portion of the digital image by a fraction of a pixel height,
horizontally shifting the vertically shifted portion of the digital image by the same fraction of a pixel width;
integrating the vertically shifted portion of the digital image with the vertically and horizontally shifted portion of the digital image to produce a second image field; and
interleaving the first image field and the second image field.

118. A method of focusing an image in an optical imaging system comprising a focus target, an optical focusing element and an array of detector elements, said method comprising the steps of:

adjusting the optical focusing element a plurality of times;

illuminating the array of detector elements with a high frequency test pattern after adjusting the optical focusing element, such that a random phase relationship exists between the test pattern and the array of detector elements;

converting the value associated with each detector element to a corresponding digital word;

generating a contrast measure after adjusting the optical focusing element based on the digital words; and generating an optical focusing element control signal for controlling the adjustment of the optical focusing element as a function of a peak contrast measure.

119. A method in accordance with claim 118, wherein the high frequency test pattern is a checkerboard pattern comprising an array of alternatively light and dark squares.

120. A method in accordance with claim 118, wherein said step of generating a contrast measure comprises the steps of:

measuring a maximum intensity value from among the corresponding digital words;

measuring a minimum intensity value from among the corresponding digital words; and determining the contrast measure as a function of the difference between said maximum intensity value and said minimum intensity value.

121. An apparatus for processing an image comprising:

analog-to-digital conversion means for converting an array of analog image data values into an array of digital image data; and two-dimensional sharpen filter means for sharpening the contrast of the digital image data.

122. An apparatus in accordance with claim 121, wherein said 2D sharpen filter means comprises:

means for extracting a low frequency digital image from the digital image;

means for extracting a high frequency digital image from the digital image;

means for adjusting a low frequency image gain to high frequency image gain ratio; and means for combining the low frequency digital image and the high frequency digital image.

123. An apparatus in accordance with claim 122, wherein said 2D sharpen filter means further comprises:

means for measuring a contrast value for the digital image, wherein said low frequency image gain to high frequency image gain ratio is adjusted as a function of said contrast value.

124. An apparatus method in accordance with claim 123, wherein said means for measuring a contrast value comprises:

means for summing pixel-to-pixel difference values.

125. An apparatus in accordance with claim 122, wherein said means for extracting a low frequency digital image comprises:

means for averaging each pixel value in the digital image with each neighboring pixel value.

126. An apparatus for sharpening the contrast of an input digital image comprising an array of pixel values, said apparatus comprising:

means for extracting a low frequency digital image from the input digital image;

means for extracting a high frequency digital image from the input digital image;

means for determining a difference value between adjacent pixels along each row of the input digital image;

means for determining a contrast measure for the input digital image by summing the difference values;

means for adjusting a low frequency digital image gain to high frequency digital image gain ratio as a function of said contrast measure; and means for combining the low frequency digital image with the high frequency digital image.

127. An apparatus in accordance with claim 126, wherein said means for extracting a low frequency digital image comprising:

low pass filter convolution means for replacing each pixel value in the input digital image with a low pass pixel value, wherein each low pass pixel value is a function of each pixel value and a plurality of neighboring pixel values.

128. An apparatus in accordance with claim 126, wherein said means for extracting a high frequency digital image comprises:

means for removing the low frequency image from the input digital image.

129. An apparatus in accordance with claim 126, wherein said means for combining the low frequency digital image with the high frequency digital image comprises:

means for summing each pixel in the low frequency digital image with each pixel in the high frequency digital image.

130. In an imaging system comprising a number "n" of analog-to-digital converters (ADCs), wherein each of the "n" ADC converts every nth row or nth column of analog image data into digital image data, an apparatus for removing ADC offset pattern differences from a digital image comprising:

means for generating "n" histograms, wherein each of the "n" histograms reflects a dynamic range of pixel values produced by a corresponding one of said "n" ADCs;

means for adjusting a pixel offset coefficient for each pixel associated with one of said "n" ADCs as a function of the dynamic range of the corresponding histogram; and means for removing ADC offset pattern differences by adjusting each pixel associated with said one of said "n" ADCs as a function of the corresponding adjusted pixel offset coefficient.

131. An apparatus in accordance with claim 130, wherein said means for adjusting the pixel offset coefficients comprises:

means for determining an average pixel value ($H_n$) for each of the "n" histograms;

means for determining an average pixel value (H) based on the pixel values in each of the "n" histograms; and means for adjusting the pixel offset coefficients as a function of the difference between the average pixel value ($H_n$) for the corresponding histogram and the average pixel value (H) based on the pixel values in each of the n histograms.

132. An apparatus for enhancing a portion of a digital image comprising:

windowing means for extracting a desired portion of an input digital image;

means for horizontally shifting the desired portion of the input image by an amount equal to a fraction of a pixel width, and means for generating a first image field by integrating the desired portion of the input image with the horizontally shifted portion of the input image;

means for vertically shifting the desired portion of the input image by the same fraction of a pixel height, means for horizontally shifting the vertically shifted portion of the input image by the same fraction of a pixel height, and means for generating a second image field by integrating the vertically shifted portion of the input image with the vertically and horizontally shifted portion of the input image; and means for interleaving the first image field and the second image field.

133. An apparatus in accordance with claim 132, wherein said means for horizontally and vertically shifting the desired portion of the input image includes a fast steering mirror.

134. An apparatus for focusing an image in an optical imaging system comprising an optical focusing element and an array of detector elements, said apparatus comprising:

means for adjusting the optical focusing element a plurality of times;

means for illuminating the array of detector elements with a high frequency test pattern after adjusting the optical focusing element, wherein a random phase relationship exists between the test pattern and the array of detector elements;

analog-to-digital conversion means for converting the value associated with each detector element to a corresponding digital word;

means for generating a peak contrast measure after adjusting the optical focusing element based on the digital words; and means for generating an optical focusing element control signal which controls said means for adjusting the optical focusing element as a function of a peak contrast measure.

135. An apparatus in accordance with claim 134, wherein the high frequency test pattern is a checkerboard pattern comprising an array of alternatively dark and light squares.

136. An apparatus in accordance with claim 134, wherein said means for generating a contrast measure comprising:

means for measuring a maximum intensity value from among the corresponding digital words;

means for measuring a minimum intensity value from among the corresponding digital words; and means for determining the contrast measure as a function of the difference between said maximum intensity value and said minimum intensity value.

137. An optical image system comprising:

a housing assembly;

a window associated with said housing assembly, through which optical energy passes; and an electromagnetic interference grid for transmitting on-axis optical energy through the window and for radially diffracting off-axis electromagnetic interference, wherein said electromagnetic interference grid is integrated into said window, and wherein said electromagnetic interference grid comprises an array of circular grid elements aligned in rows and columns.

138. A method of aligning first radiation from a first source with second radiation from a second source, said method comprising the steps of:

aligning the first radiation with a plurality of openings in a reticle pattern, said plurality of openings being spaced away from a centrally located opening;

projecting said second radiation through an opening in the reticle pattern, wherein the opening has lateral edges that project radially inward toward the centrally located opening;

translating a path of said second radiation until it is coincident with a lateral edge; and translating said path toward the centrally located opening along the lateral edge toward the centrally located opening.

139. A method in accordance with claim 138, further comprising the step of:

translating a path of said second radiation along the lateral edge of the opening until the energy is coincident with an inner edge of the opening;

translating said path in accordance with a number of grid positions; and aligning the path in accordance with the grid position that results in a peak energy detection through the centrally located opening.

140. A method in accordance with claim 138, wherein the first radiation is infrared radiation.

141. A method in accordance with claim 138, wherein the second radiation is laser radiation.

142. A method in accordance with claim 138, wherein said plurality of openings, through which said first radiation passes, are of equal distance from the centrally located opening.

143. In a forward-looking infrared (FLIR)/laser based optical imaging system, a method of aligning IR line-of-sight (LOS) and laser LOS comprising the steps of:

projecting infrared (IR) energy from an IR energy source through a reticle pattern onto a focal plane array;

aligning the IR LOS such that a maximum amount of IR energy passes through a plurality of peripheral openings in the reticle pattern, wherein the peripheral openings are of equal distance from a centrally located opening;

projecting laser energy from a laser transmitter through one of a plurality of wedge-shaped openings in the reticle pattern, wherein each of the wedge-shaped openings has lateral edges that project radially inward toward the centrally located opening;

translating the laser LOS until it is coincident with a lateral edge; and translating the laser LOS toward the centrally located opening along the lateral edge.

144. A method in accordance with claim 143, further comprising the steps of:

translating the laser LOS along the lateral edge until the laser LOS is coincident with an inner edge of the one wedge-shaped opening;

translating the laser LOS in accordance with a number of grid positions; and aligning the laser LOS in accordance with the grid position that results in a peak laser energy detection through the centrally located opening.

145. A method in accordance with claim 143, further comprising the step of:

focusing the IR energy.

146. A method in accordance with claim 145, wherein said step of focusing the IR energy comprises the steps of:

projecting IR energy through an array of square openings in the reticle pattern, such that a high frequency test pattern appears on the focal plane array;

adjusting an IR energy optical focusing element a plurality of times;

generating a contrast measure for the high frequency test pattern after each adjustment of the optical focusing element; and focusing the IR energy as a function of a peak contrast measure.

147. A method in accordance with claim 146, wherein the high frequency test pattern is a checkerboard pattern comprising an array of alternatively dark and light squares.

148. In an optical system that employs at least two energy sources, an apparatus for aligning a first energy source with a second energy source, said apparatus comprising:

means for aligning the first energy source with a plurality of openings in a reticle pattern such that said plurality of openings in the reticle pattern are of equal distance from a centrally located opening;

means for projecting energy from the second energy source through an opening in the reticle pattern, wherein the opening has lateral edges that project radially inward toward the centrally located opening;

means for translating the energy from the second energy source until it is coincident with a lateral edge; and means for translating said energy toward the centrally located opening along the lateral edge.

149. An apparatus in accordance with claim 148, further comprising:

means for translating a path of said second radiation along the lateral edge of the opening until the energy is coincident with an inner edge of the opening;

means for translating said path in accordance with a number of grid positions; and means for aligning said path in accordance with the grid position that results in a peak energy detection through the centrally located opening.

150. An apparatus in accordance with claim 148, wherein the first energy source is an infrared energy source.

151. An apparatus in accordance with claim 148, wherein the second energy source is a laser transmitter.

152. In a forward-looking infrared (FLIR)/laser based optical imaging system, an apparatus for boresighting IR line-of-sight (LOS) and laser LOS comprises:

IR energy source means for projecting infrared (IR) energy through a reticle pattern onto a focal plane array;

IR optics means for aligning the IR LOS such that a maximum amount of IR energy passes through a plurality of peripheral openings in the reticle pattern, wherein the peripheral openings are of equal distance from a centrally located opening;

laser transmitter means for projecting laser energy through one of a plurality of wedge-shaped openings in the reticle pattern, wherein each of the wedge-shaped openings has lateral edges that project radially inward toward the centrally located opening;

laser optics means for translating the laser LOS until it is coincident with a lateral edge; and laser optics means for translating the laser LOS toward the centrally located opening along the lateral edge.

153. An apparatus in accordance with claim 152, further comprises:

first laser optics for translating the laser LOS along the lateral edge until the laser LOS is coincident with an inner edge of the one wedge-shaped opening;

second laser optics for translating the laser LOS in accordance with a number of grid positions; and means for aligning the laser LOS in accordance with the grid position that results in a peak laser energy detection through the centrally located opening.

154. An apparatus in accordance with claim 153, wherein the laser optics means for translating the laser LOS comprises a pair of Risley prisms.

155. An apparatus in accordance with claim 152, further comprises:

means for focusing the IR energy.

156. An apparatus in accordance with claim 154, wherein said means for focusing the IR energy comprises:

IR energy source means for projecting IR energy through an array of square openings in the reticle pattern, such that a high frequency test pattern appears on the focal plane array;

means for adjusting an IR energy optical focusing element a plurality of times;

means for generating a contrast measure for the high frequency test pattern after each adjustment of the optical focusing element; and means for focusing the IR energy as a function of a peak contrast measure.

157. An apparatus in accordance with claim 156, wherein the high frequency test pattern is a checkerboard pattern comprising an array of alternatively dark and light squares.

* * * * *

UNITED STATES PATENT AND TRADEMARK OFFICE
CERTIFICATE OF CORRECTION

PATENT NO.     : 6,359,681 B1
DATED          : March 19, 2002
INVENTOR(S)    : Brien J. Housand et al.

It is certified that error appears in the above-identified patent and that said Letters Patent is hereby corrected as shown below:

<u>Title page,</u>
Item [75], Inventors, replace "John J. Donahue" with -- John C. Donohue --;
replace "Barbra Weaver, leagal representative" with -- Barbara Weaver, legal representative --; and
replace "Bhikhubbai L. Patel" with -- Bhikhabhai L. Patel --.

Signed and Sealed this

Twentieth Day of May, 2003

JAMES E. ROGAN
*Director of the United States Patent and Trademark Office*